United States Patent [19]

Joslow et al.

[11] 4,087,643

[45] May 2, 1978

[54] TIME DIVISION MULTIPLEXED PABX COMMUNICATION SWITCHING SYSTEM

[75] Inventors: David L. Joslow, Chester, Conn.; Alan Bloch, New York, N.Y.; Lincoln Henthorn; Harold M. Straube, both of Chester, Conn.

[73] Assignee: Chestel, Inc., Chester, Conn.

[21] Appl. No.: 806,083

[22] Filed: Jun. 13, 1977

Related U.S. Application Data

[63] Continuation of Ser. No. 665,551, Mar. 10, 1976, abandoned.

[51] Int. Cl.² .............................................. H04J 3/12
[52] U.S. Cl. ........................... 179/15 AL; 179/15 BY
[58] Field of Search ........ 179/15 AL, 15 BV, 15 BA, 179/15 BS, 15 BY, 84 VF, 18 FC

[56] References Cited

U.S. PATENT DOCUMENTS

| | | | |
|---|---|---|---|
| 3,529,089 | 9/1970 | Davis | 179/15 AL |
| 3,732,374 | 5/1973 | Rocher | 179/15 AL |
| 3,863,030 | 1/1975 | Mills | 179/84 UF |
| 3,921,137 | 11/1975 | McClearn | 179/15 AL |
| 3,924,077 | 12/1975 | Blakeslee | 179/18 FC |
| 3,937,892 | 2/1976 | Bloch | 179/15 AL |
| 3,959,594 | 5/1976 | Srivastava | 179/15 BA |
| 3,961,139 | 6/1976 | Bowman | 179/15 AL |

Primary Examiner—David L. Stewart
Attorney, Agent, or Firm—McCormick, Paulding & Huber

[57] ABSTRACT

A processor controlled communication switching system or PABX uses time division multiplexing with pulse width modulation of audio signals. Switching to establish communication paths between peripheral devices serviced by the system is distributed among the peripheral devices and controlled by command signals issued to the peripheral devices by a processor implemented common control. All peripheral devices transmit to the common control on a communication send line and receive signals from the common control on a communication receive line. The particular illustrated system services up to fifty two-way peripheral device ports and is inherently nonblocking.

18 Claims, 53 Drawing Figures

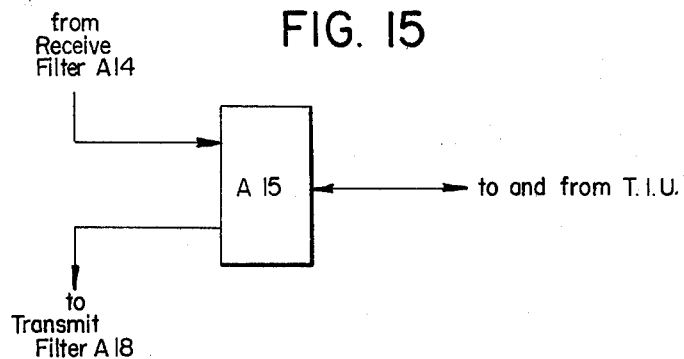
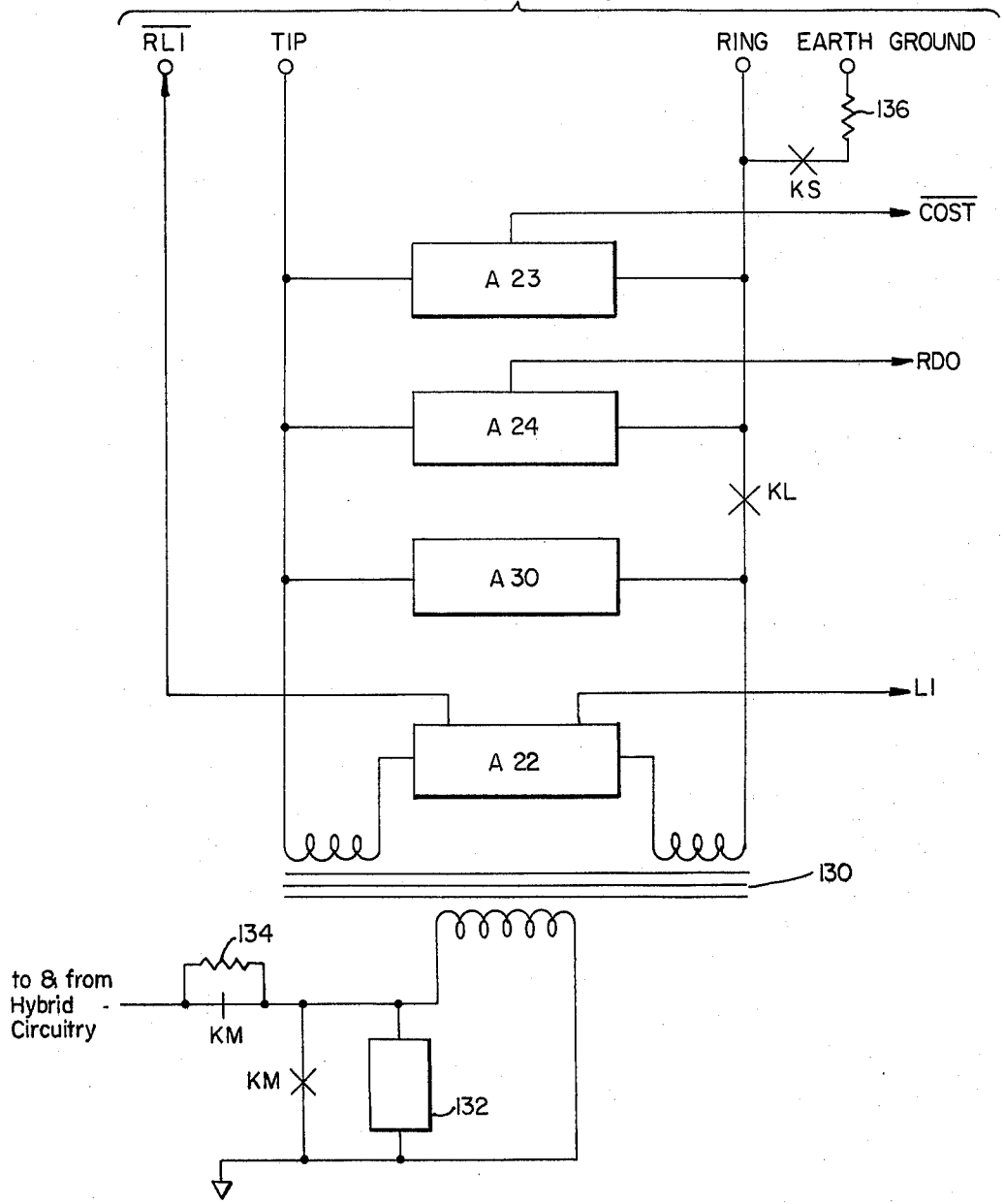

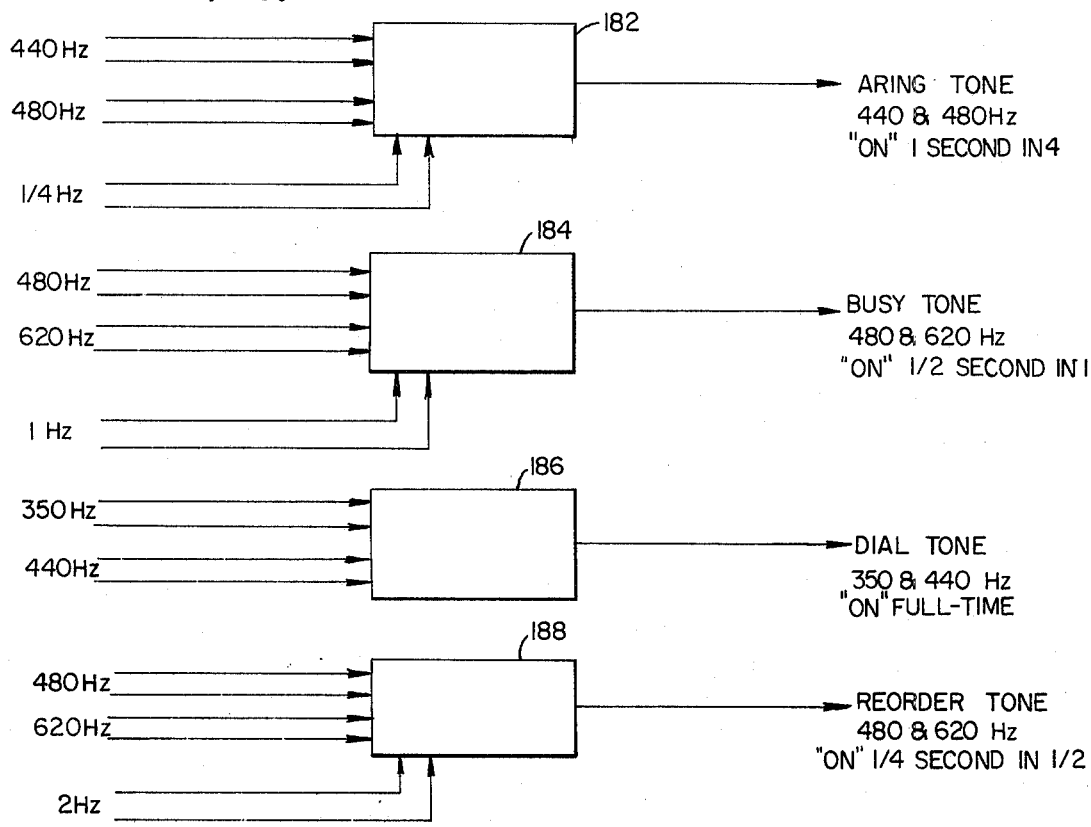
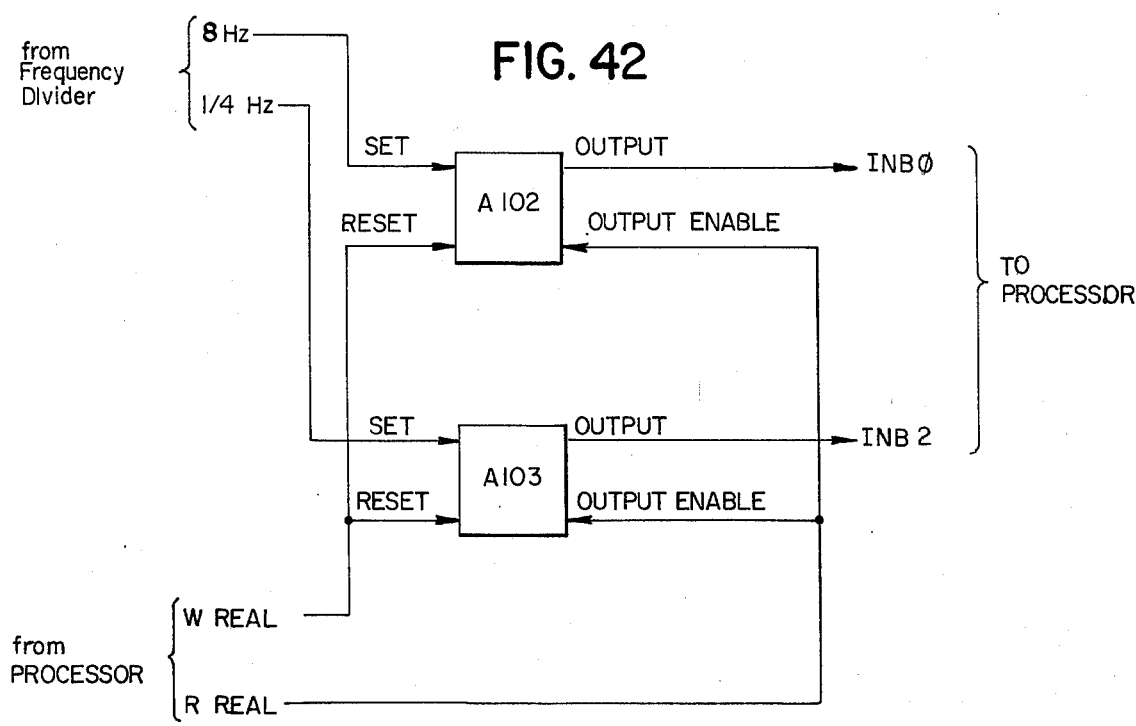

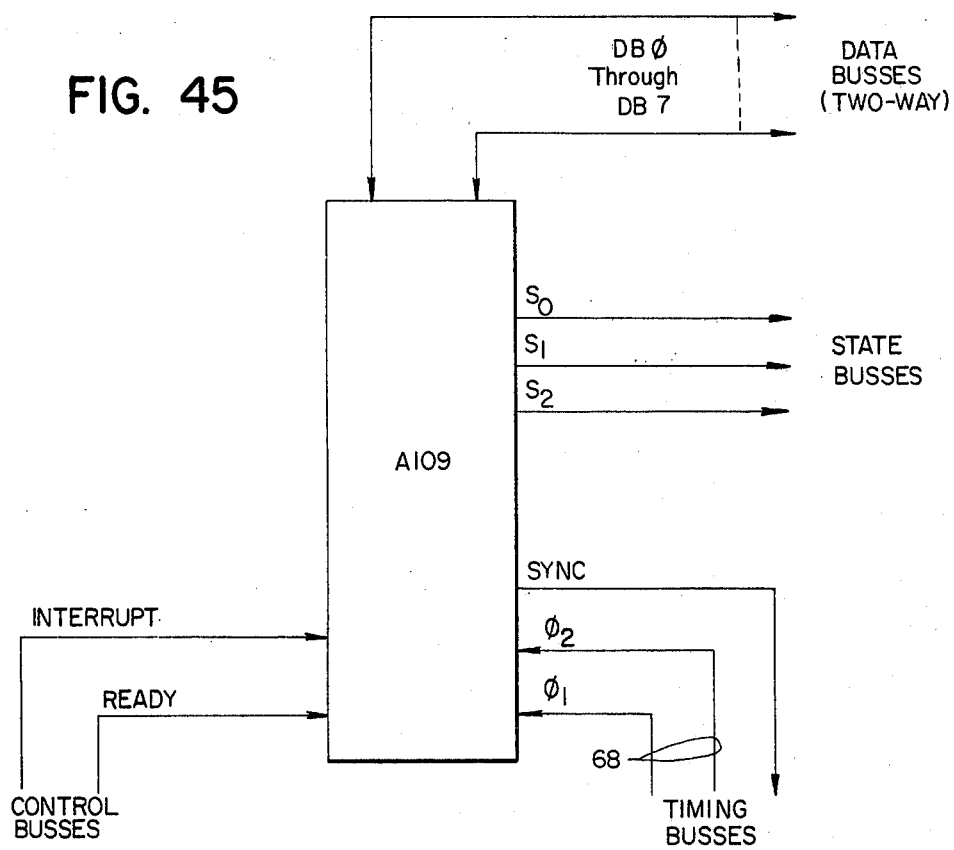

TIME DIVISION MULTIPLEXED PABX COMMUNICATION SWITCHING SYSTEM

This is a continuation, of application Ser. No. 665,551 filed Mar. 10, 1976, now abandoned.

BACKGROUND OF THE INVENTION

This invention relates to communication switching systems for selectively establishing two-way communication paths between desired ones of a set of telephone instruments or other two-way communication peripheral devices, and deals more particularly with such a switching system of the type commonly referred to as a private automatic branch exchange (PABX) for servicing a relatively small number of telephone instruments or the like such as, for example, those used in a given office, factory, government agency or similar business establishment.

The communication system of this invention may be an isolated one used only to interconnect a fixed group of telephones or similar peripheral devices to one another. Or, it may be connected to other outside telephones or devices through one or more trunk lines, or other connecting lines, as in the embodiment hereinafter illustrated and described in detail.

In either event, the general object of this invention is to provide a communication switching system or PABX which is an improvement in various different ways over similar systems currently available. Among these improvements are, a low per station cost for the system, ease in installing and maintaining the system, speedy operation in setting up and disconnecting communication paths and handling other service requests, and the ability to provide various different system features, such as camp-on, call forwarding, call conferencing, call hold, etc. largely through programming of the processor memory and without the need for keys on the telephone instruments.

Other objects and advantages of the invention will be apparent from the drawings and from the following detailed discussion and claims.

SUMMARY OF THE INVENTION

The invention resides in a communication system for establishing two-way communication paths between a plurality of telephones or similar two-way communication peripheral devices, with the switching required for establishing such communication paths being carried out in the peripheral devices in response to command messages transmitted to the devices by a common control. All of the peripheral devices send time division multiplexed communication signals to the common control on a communication send line and receive time division multiplexed signals from the common control from a communication receive line. The format of the time divided usage of both the send and receive communication lines consists of repetitive frames each having a fixed plurality of time slots, with a fixed group of time slots of each frame being used to transmit command messages from the common control to the peripheral devices and another fixed group of time slots of each frame being used to transmit audio signals from the peripheral devices to the common control on the communication send line and from the common control to the peripheral devices on the communication receive line.

Each peripheral device includes an associated applique having a listening order register, updated by command messages from the common control, telling it on which time slot or slots of the communication receive line to receive. Each applique, when it transmits, transmits on a permanently assigned or dedicated time slot of the communication send line. The pattern of the frame-by-frame transmission of an applique on its dedicated time slot of the communication send line (no transmission, every frame transmission or alternate frame transmission) is controlled in response to its on-hook or off-hook condition and the condition of its listening order register to provide a status signal. By investigating the transmission pattern for each time slot of the communication send line, the common control determines the status of every peripheral device and assigns or releases other components of the common control as needed to handle a service request. Dial entries are transmitted from a peripheral device to the common control as coded tone modulated signals injected into its dedicated time slot, and are intercepted by, decoded and acted upon by the common control.

BRIEF DESCRIPTION OF THE DRAWINGS

FIGS. 13 to 19 are block diagrams illustrating respectively various ones of the components of the trunk applique and trunk interface unit of FIG. 12.

FIGS. 36 to 38 and FIGS. 40 to 44 are block diagrams showing in more detail the construction of various components of the supervisory tone generator of FIG. 35.

FIG. 45 is a block diagram illustrating the microprocessor device contained in the processor of FIG. 4 and its various busses.

FIG. 46 is a diagram illustrating the different types of instruction executions performed by the processor of FIG. 4.

DETAILED DESCRIPTION OF THE PREFERRED EMBODIMENT

General Organization

FIGS. 1 to 4

Figure 1:
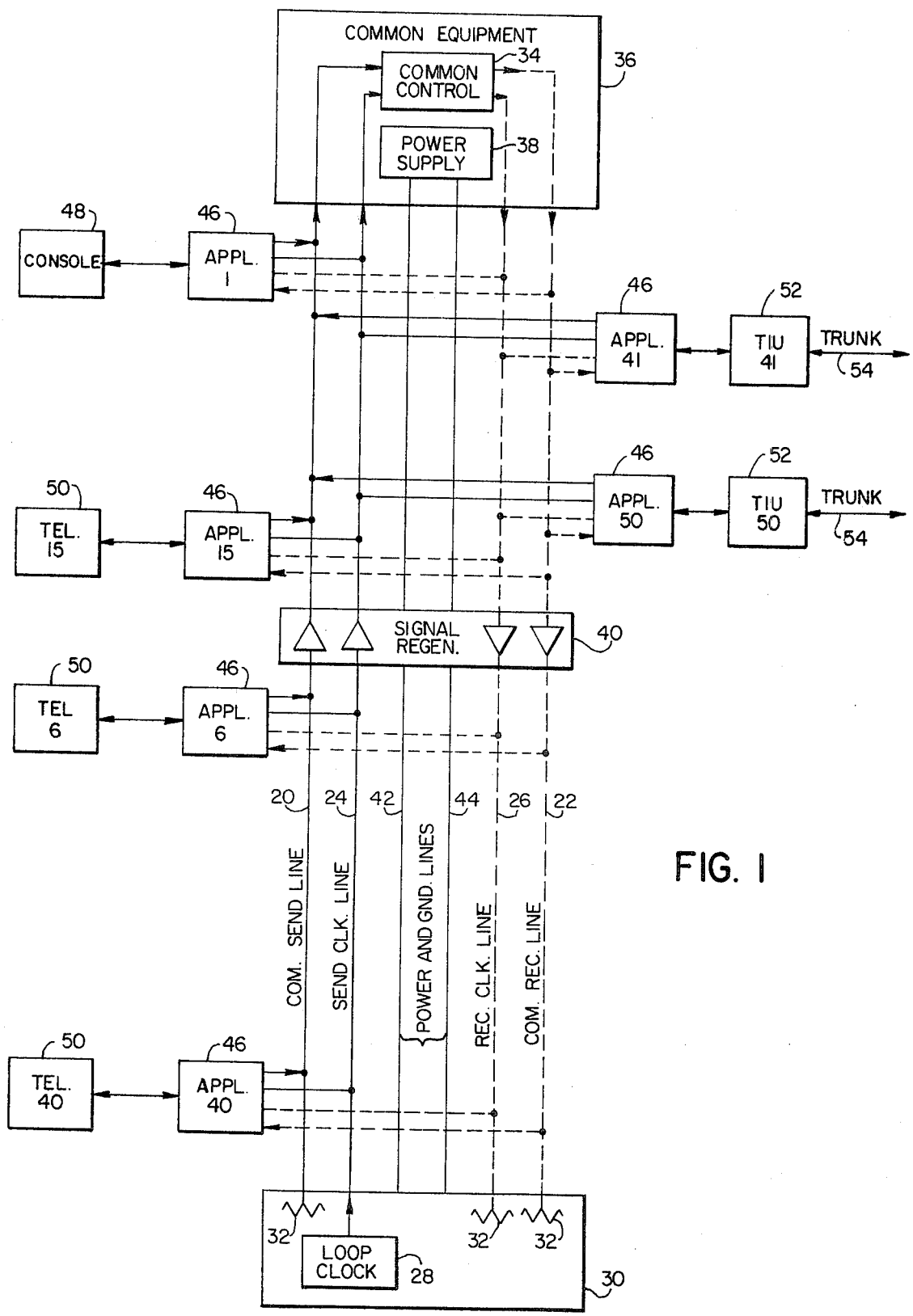
FIG. 1 is a schematic block diagram of a complete communication system embodying this invention.

In the drawings, a specific design of the switching system embodying the invention is illustrated and is hereinafter described in detail as exemplary of the invention. It should be understood, however, that various design features, such as the number of ports, the number of time slots per frame, type of audio modulation, clock pulse format, command message format and the like may vary from those disclosed herein without departing from the invention.

The basic organization of the system is shown in FIG. 1. All communication between ports is by way of a transmission line divided into two parts: a communication send line 20 and a communication receive line 22, all signals transmitted from a port being injected onto the communication send line and all signals received by a port being extracted from the communication receive line. The transmission of data on the communication send line and communication receive line is by time division multiplexing. Clock pulses for the timing of this multiplexing function are transmitted on a clock line comprising two parts: a send clock line 24 running parallel to the communication send line 20 and a receive clock line 26 running parallel to the communication receive line 22.

The timing clock pulses are generated by a loop clock 28 forming part of a loop clock and termination unit 30. The loop clock 28 applies clock pulses to what is referred to as the outer end of the send clock line 24. The unit 30 also provides suitable terminations 32, 32 for the outer ends of the other three lines 20, 22 and 26. Although in FIG. 1, the lines 20, 22, 24 and 26 are shown by single drawn lines, the system actually utilizes balanced signals so that each of these lines is in reality a two-conductor line.

At what is referred to as the inner ends of the lines 20, 22, 24 and 26 is a common control unit 34 which in the illustrated case is contained in a common equipment rack or cabinet 36 along with other common equipment such as a power supply 38. Signals on the communication send line 20 and the send clock line 24 are transmitted towards the common control 34 and on the communication receive line 22 and receive clock line 26 are transmitted away from the common control. Such unidirectional signal propagation is assured by one or more signal regenerators 40 located at intervals along the length of the lines, each signal regenerator 40 including an amplifier for each line adapted to reshape and otherwise regenerate each signal appearing at its input and to launch the regenerated signal from its output.

In the signal transmission circuitry described above, the communication signals on the communication send line 20 move in unison with the timing signals on the send clock line 24 and likewise the communication signals on the communication receive line 22 move in unison with timing signals on the receive clock line 26, thereby avoiding propagation delay errors. This general form of transmission is similar to that described in U.S. Pat. No. 3,937,892 to which reference may be had for a more detailed discussion of it.

The power supply 38 supplies power and ground signals to power and ground lines 42 and 44, respectively, which run parallel to the lines 20, 22, 24 and 26 and supply power and ground signals to the loop clock and termination unit 30, the signal regenerators 40 and the various peripheral devices defining the system ports, the connections with the power and ground lines 42 and 44 being omitted for clarity.

Peripheral devices, which provide interfaces between the system as so far described and the outside world define the system ports, the illustrated system having the capability of servicing up to fifty ports. Each peripheral device includes an applique 46 and an associated end or input/output device, the applique serving as an interface between its end device and the remainder of the system. In FIG. 1, one end device is shown to be a telephone equipped console 48, three are shown to be telephones 50, 50 and two are shown to be trunk interface units 52, 52 connected in turn to trunks 54, 54. The mix of end devices may vary depending on the needs of the system user. However, as an example, a typical system may include one console, four trunk interface units servicing four trunk lines and forty-five or less telephones. Each applique in turn contains basically all of the electrical components required to interface its associated end device with the remainder of the system. As shown in FIG. 1, each applique has assigned to it a distinctive number which serves as its identifying station number.

The fifty ports described above are two-way ports through which signals are both injected into and extracted from the system. In addition to these two-way ports, the system may also service other one-way ports for universal paging, zone paging, and addressable zone ringing. It also may include a number of virtual ports, or parking orbits, provided by the common control memory as hereinafter described, to which a call may be directed and temporarily stored for subsequent retrieval.

Figure 2:
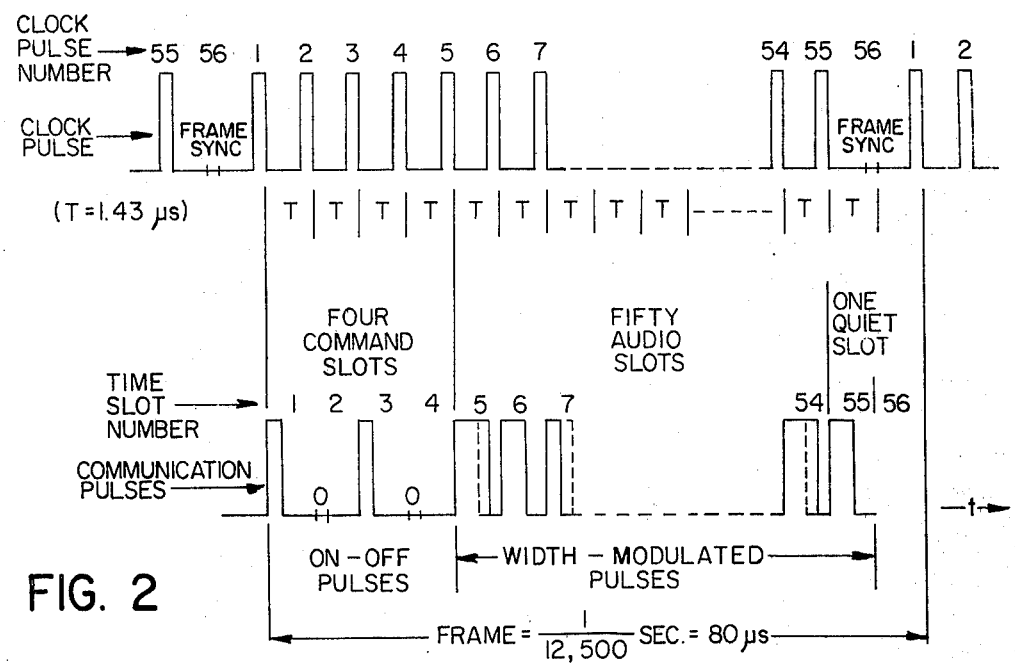
FIG. 2 is a diagram illustrating the timing format of the clock signals appearing on the clock lines of the system of FIG. 1 and the communication format of the communication signals appearing on the communication send and receive lines of FIG. 1.
Figure 3:
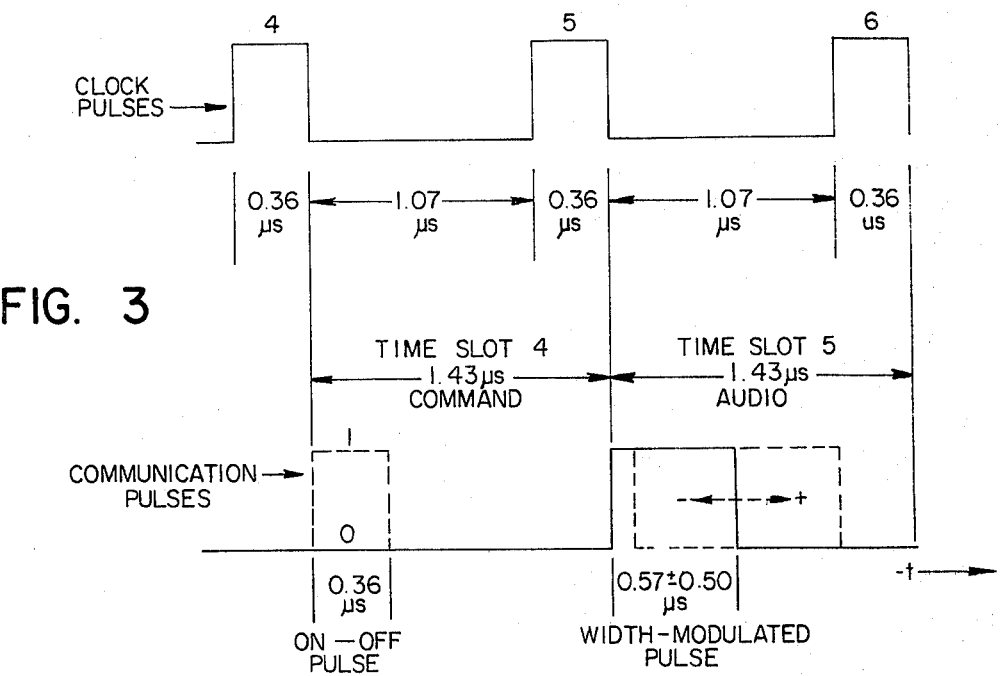
FIG. 3 is a diagram illustrating the modulation formats of the clock signals and communication signals.

The time sharing and signal modulation formats of the clock and communication signals appearing on the transmission lines of the system are shown in FIGS. 2 and 3. The time sharing format involves a fifty-six slot commutation frame and a frame rate of 12.5 KHz. Timing is controlled by clock pulses, originating from the loop clock 28 and appearing on the send clock and receive clock lines 24 and 26, at a repetition rate of 0.7 MHz. Every fifty-sixth clock pulse is omitted to provide frame synchronization information. The fifty-six clock pulses per frame time divide usage of the communication lines 20 and 22 into 56 time slots in each frame. One of these time slots, the sync slot (56), is unused. Another one, the quiet slot (55) is used when a call is put on hold and contains an unmodulated audio pulse. Four slots (1, 2, 3 and 4) are command slots which are reserved for digital signals which originate in a processor forming part of the common control 34 and are injected on the communication receive line by the common control. The remaining fifty time slots, the audio or voice-band slots (5 to 54), are permanently assigned on a one-to-one basis to the fifty potential two-way ports serviced by the system. FIG. 3 shows in more detail the nature of the clock pulses defining the time slots and the nature of the communication pulses, command and audio, appearing in the command and audio time slots. In particular, each command pulse is an ON or OFF pulse starting at the beginning of each time slot and persisting for 0.36 $\mu$s. Each audio pulse begins at the beginning of its time slot and has a duration of 0.57 ± 0.50 $\mu$s.

All of the switching necessary to establish communication paths is done in the peripheral devices in order to minimize the complexity of the common control. Each two-way peripheral device has the capability of transmitting on the communication send line 20 during its assigned time slot. It also has the capability of receiving during any desired number of voice-band or audio time slots during each commutation frame. In a two party call, each party transmits during his assigned time slot and receives during the time slot assigned to the other party. In a conference call, each party transmits during his assigned time slot and receives during the several time slots assigned to the other parties involved in the call. The system is inherently nonblocking for all calls.

Figure 4:
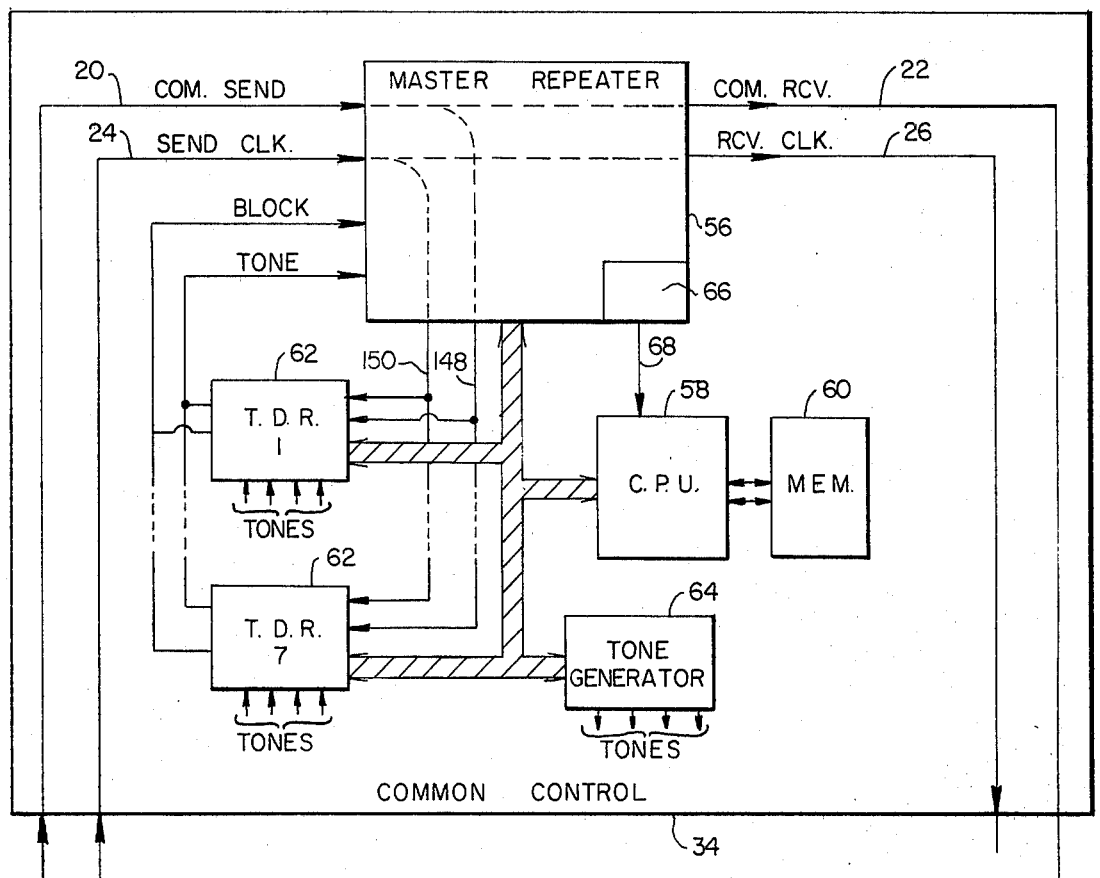
FIG. 4 is a diagram illustrating in more detail the construction of the common control of the system of FIG. 1.

The switching performed by the peripheral devices is controlled by information received by the peripheral devices from the common control 34. Communication from the common control to the peripheral device is by way of command messages transmitted on the communication send line 22. A command message, as shown at the bottom of FIG. 4, consists of seventeen four-bit words, it being transmitted during the four command slots of seventeen consecutive commutation frames. The first two words are sync words, each consisting of four one's. The next two words are the double-hex address of the port to which the message is directed. The remaining thirteen words make up a fifty-one bit listening order and a one-bit ring order. The peripheral device at a port is directed to receive during one or more of the audio slots, or during the quiet slot, by ones at appropriate positions in the listening order. The ring order controls ringing at a telephone equipped port, and controls trunk seizure at a trunk port.

The receiving circuitry of a peripheral device, contained in its applique 46, is controlled by clock pulses extracted from the receive clock line 26. The receiving circuitry samples the communication receive line during each command time slot to determine the presence or absence of a pulse. During selected ones of the fifty-one time slots comprising the fifty audio slots and the quiet slot, a demodulator in the receiving circuitry is enabled to sample and demodulate the modulated pulse or pulses appearing in the selected time slots. The demodulator is controlled by data stored in a fifty-five bit recirculating shift register, the listening order register, forming part of the applique, which is advanced by clock pulses extracted from the receive clock line. A high output from the shift register during any time slot enables the demodulator during the following time slot. The four bits which control demodulation during the four command slots of each commutation frame are always low so the demodulator is not enabled during the appearance of these four bits. These four command bits of each commutation frame are, however, sampled and used by each applique. That is, these command bits, as above mentioned, make up command messages each consisting of seventeen four-bit words transmitted during the four command slots of seventeen consecutive commutation frames. And the fifty-one variable bits of the applique listening order register which selectively control demodulation during the audio slots and the quiet slot are periodically updated by the command messages addressed to the applique by the common control.

As to the reception of command messages by the appliques, each applique is sensitive to the four bits of the word appearing in the four command slots during each commutation frame. Each applique further includes a logic circuitry which examines each such word received during each commutation frame. If two sync words are received during successive frames, the next two words are checked against the applique's stored identifying double-hex address. If both address words match, subsequent words of the message are received by the applique, stored for appropriate periods, and then run into the applique's listening order register to update the latter. In the absence of an address match following sync words, the inspection circuitry of the applique does not accept the remaining portion (thirteen words) of the command message and resumes its search for sync words.

As to the sending function of each peripheral device, each applique contains a pair of counters which are advanced by clock pulses extracted from the send clock line 24. The two counters are reset once each commutation frame by a reset pulse generated in response to the absence of a clock signal on the send clock line. Both counters are based on recirculating shift registers, one having seven states, the other having eight. Together, they make up a single 56 state counter with an eight bit output. During one time slot in each commutation frame, the 56 state counter output matches the stored double-hex address of the peripheral device. Provided as associated transmission gate circuit is enabled, transmission from the applique to the communication send line occurs during the following time slot.

Enabling of the transmission gate circuitry of an applique is controlled by the hook status of a telephone connected to a line applique or by the seizure of a trunk line connected to a trunk applique. For conciseness in language, the term "on hook" when related to a trunk applique is sometimes used herein to refer to the trunk applique being in a state of nonseizure of a trunk line and the term "off hook" to refer to the applique being in a state of trunk line seizure. The enabling of the transmission gate circuitry is also controlled by whether or not the applique's 55 bit listening order register, which controls reception by the applique, is empty. An applique in off-hook status with a nonempty listening order register (applique receiving) transmits during every commutation frame. An applique in on-hook status with an empty listening order register (applique not receiving) does not transmit. In off-hook status with an empty register, or in on-hook status with a nonempty register, the applique transmits during every other commutation frame. Alternate frame transmission is detected by the common control and interpreted and acted upon as a request for attention.

Referring to FIG. 4, the top portion of this figure shows in general the construction of the common control 34 of the system. It includes a master repeater 56 to which signals are transmitted by the communication send line 20 and the send clock line 24 and from which signals are transmitted to the communication receive line 22 and the receive clock line 26. Essentially, the master repeater 56 functions, under the control of a processor (CPU) 58, and instructions and data stored in an associated memory 60, to conditionally direct signals from the communication send line to the communication receive line 22 or to other components of the common control and to conditionally direct signals from other components of the common control to the communication receive line 22. Other major components of the common control include a plurality, up to seven, of tone decoder-receivers 62, 62 and a supervisory tone generator 64. The master repeater 56 also includes a clock circuit 66 responsive to clock signals received on the send clock line 24 for generating a two-phase processor clock signal, appearing on the line 68, for timing operation of the CPU 58 in synchronism with the received send clock signal. The tone generator 64 generates a plurality of supervisory tones transmitted simultaneously to all of the tone decoder-receivers 62, 62.

The master repeater 56 includes an inspection circuitry which periodically inspects the type of transmission (none, alternate frame or every frame) occurring in each time slot and transmits such detected transmission information to the CPU 58. As mentioned, detection of alternate frame transmission from a given applique is interpreted as a request for attention or service by the applique. If the applique at the time of said alternate frame detection is receiving, that is has a nonempty listening order register, the request for service is more specifically interpreted as a request for disconnect and the processor 58 thereupon functions to fulfill the disconnect request. Alternatively, if the alternate frame detection occurred when the applique is not receiving, that is has an empty listening order register, the request for service is more particularly interpreted as a dial tone or dialing capability request. Upon the receipt of a service request, the CPU 58 assigns one of the tone decoder receivers 62, 62 to the requesting applique with the assigned tone decoder-receiver remaining functionally associated with the applique until the requested service is performed.

The dial signals used in a dialing procedure are coded two-tone dial signals of the type generated by conventional touch dial pads, each of the telephones 50, 50 having such a touch dial pad. During a dialing procedure, the assigned tone decoder-receiver 62 provides a one-way path, for the two-tone dial signals, from the associated dialing applique to the processor, the tone decoder-receiver also decoding the two-tone dial signals into digital signals compatible with the processor. The assigned tone decoder-receiver also provides a one-way processor controlled path for supervisory tones from the supervisory tone generator 64 to the applique to which it is assigned, it also in this case further converting a tone selected for transmission to a pulse width modulated signal suitable for transmission through the applique's audio time slot of the communication receive line. Finally, the assigned tone decoder-receiver provides a one-way path through which the processor 58 may control out-pulsing by an applique associated with a rotary dial trunk line.

LOOP CLOCK

Figure 5:
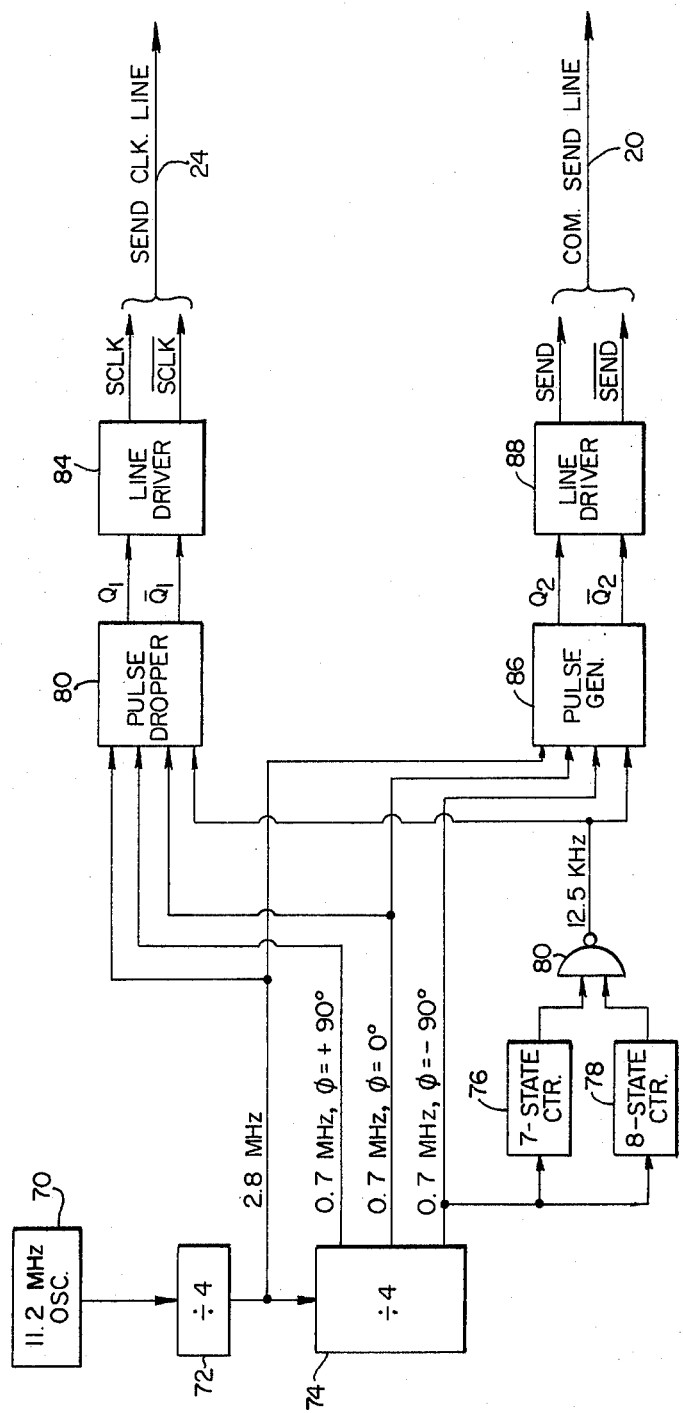
FIG. 5 is a block diagram illustrating in more detail and construction of the loop clock of FIG. 1.
Figure 6:
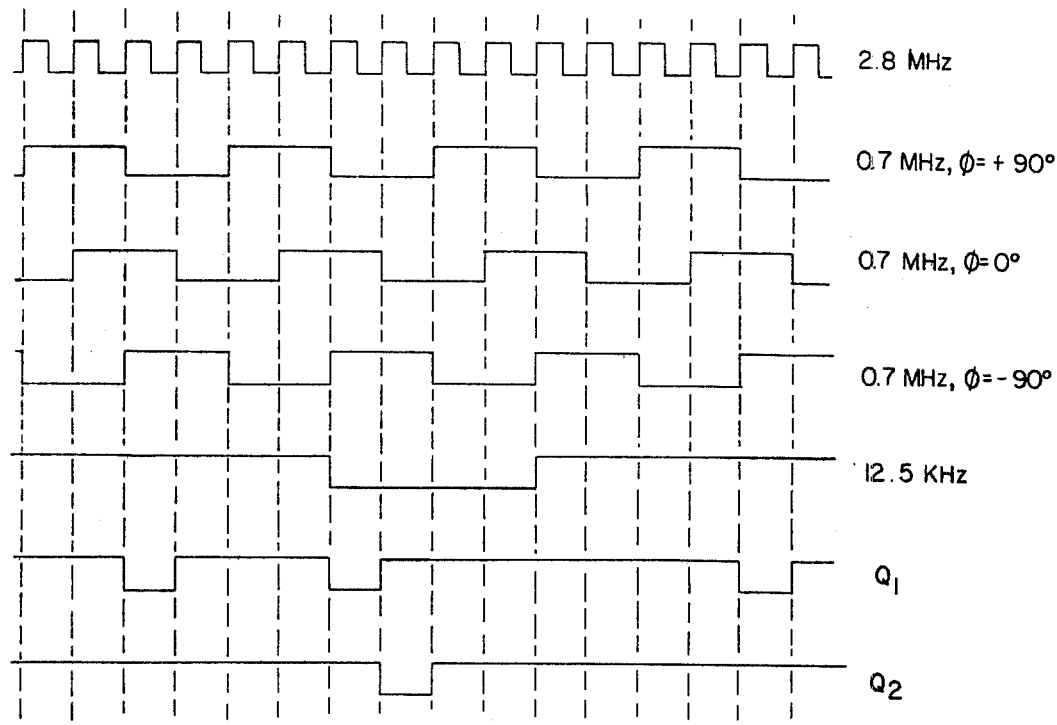
FIG. 6 is a diagram showing the nature and phase relationship between various signals generated within the loop clock of FIG. 5.

FIGS. 5 and 6

The loop clock 28 provides the timing or clock signals which control operation of the communication system. It also provides an unmodulated signal pulse which appears during the quiet slot (55) of each commutation frame. A schematic diagram of the loop clock is shown in FIG. 5. Referring to this figure, a 11.2 MHz square wave oscillator feeds a divide-by-16 circuitry consisting of two divide-by-four dividers 72 and 74. The output of the first divider 72 is a square-wave signal, with a duty-cycle ratio of 50%, at 2.8 MHz. This serves as an input to the second divider 74 which in turn delivers three square-wave outputs at 0.7MHz, all having duty-cycle ratios of 50% and phase relations as shown in FIG. 6.

A divide-by-56 circuitry is also included in the loop clock and is implemented by a seven state counter 76 and an eight state counter 78. The eight-state counter 78 is driven by one of the 0.7MHz signals from the divider 74. Its output is high during one cycle in every eight of that signal. The seven-state counter 76 is driven by the same signal that drives the eight-state counter. Its output is high during one cycle out of every seven of that signal. The outputs of the two counters are supplied to a NAND gate 80. The two inputs to the gate 80 are simultaneously high during one cycle out of every 56 cycles of the 0.7MHz signal which drives the counters, and the output of the gate is, therefore, a 12.5KHz negative-going square wave with a duty cycle ratio of 1/56. The phase relation between the 12.5KHz square wave and the 0.7MHz square wave ($\phi = -90°$) which drives the counters is shown in FIG. 6.

Further components of the loop clock involved in the production of clock signals include a pulse dropper 82 and a line driver 84. The pulse dropper 82 is driven by the 2.8MHz signal from the divider 72, by two of the 0.7MHz signals from the divider 74, and by the 12.5KHz signal from the NAND gate 80. It delivers a push-pull output, $Q_1$ and $\overline{Q_1}$, to the line driver 84. $Q_1$ goes low (and $\overline{Q_1}$ goes high) for one cycle out of every four cycles of the 2.8MHz signal. One time in 56, generation of the pulse at the $Q_1$ and $\overline{Q_1}$ outputs of the pulse dropper is suppressed following the negative pulse on the 12.5 KHz input. The pulse dropper, therefore, generates a push-pull square-wave output at 0.7MHz, with a duty-cycle ratio of ¼ and with every 56th cycle omitted. The phase relationships of the signals are shown in FIG. 6.

The line driver 84 accepts the push-pull signals $Q_1$ and $\overline{Q_1}$, and delivers a balanced output to the send clock line 24. In the quiescent state, with $Q_1$ high and $\overline{Q_1}$ low, the line driver draws current from SCLK, the "high" side of the line (on which the signal appears as a positive-going pulse), and establishes a voltage level of $-0.5$ volts. No current is drawn from $\overline{SCLK}$, the "low" side of the line, which is therefore at ground potential. When $Q_1$ goes low and $\overline{Q_1}$ goes high, the current drain is switched from SCLK to $\overline{SCLK}$. SCLK, therefore, rises to ground potential during the clock pulse, and $\overline{SCLK}$ drops to $-0.5$ volts.

A quiet-slot signal circuitry is also included in the loop clock and consists of a pulse generator 86 and a line driver 88. The pulse generator 86 is driven by the 2.8MHz signal from the divider 72 by two of the 0.7MHz signals from the divider 74, and by the 12.5KHz signal from the NAND gate 80. It delivers a push-pull output, $Q_2$ and $\overline{Q_2}$, to the line driver 88. $Q_2$ goes low and ($\overline{Q_2}$ goes high) for one cycle of the 2.8MHz signal every time the 12.5KHz signal goes low. The high-to-low transition of $Q_2$ follows that of the 12.5KHz signal by one cycle of the 2.8MHz signal. The phase relationships between these various signals are shown in FIG. 6. The signal at $Q_2$, therefore, follows the last of the clock pulses $Q_1$ in each burst of fifty-five clock pulses.

The line driver 88 is identical with the line driver 84 used in the clock signal circuitry. In the absence of a signal SEND, the high side of the line, is held at $-0.5$ volts by current drawn by the line driver 88 and $\overline{\text{SEND}}$ is at ground potential. A signal is injected on the communication send line 20 by the line driver 88, by switching the current drain from SEND to $\overline{\text{SEND}}$.

LINE APPLIQUE
FIGS. 7 to 11

As previously mentioned, the appliques 46, 46 of FIG. 1 provide interfaces between various input/output devices of the remainder of the system, and they vary slightly in construction depending on the type of input/output device with which they are used. A "line" applique is one which serves as an interface between the remainder of the system and a single non-key telephone instrument such as used with the console 48 of FIG. 1 or as indicated at 50, 50 in FIG. 1. In the telephones used with the system, the conventional electromechanical ringers in the instruments are replaced by electronic ringers, but in all other respects the instruments are standard ones equipped with two-tone touch dial pads.

Figure 7:
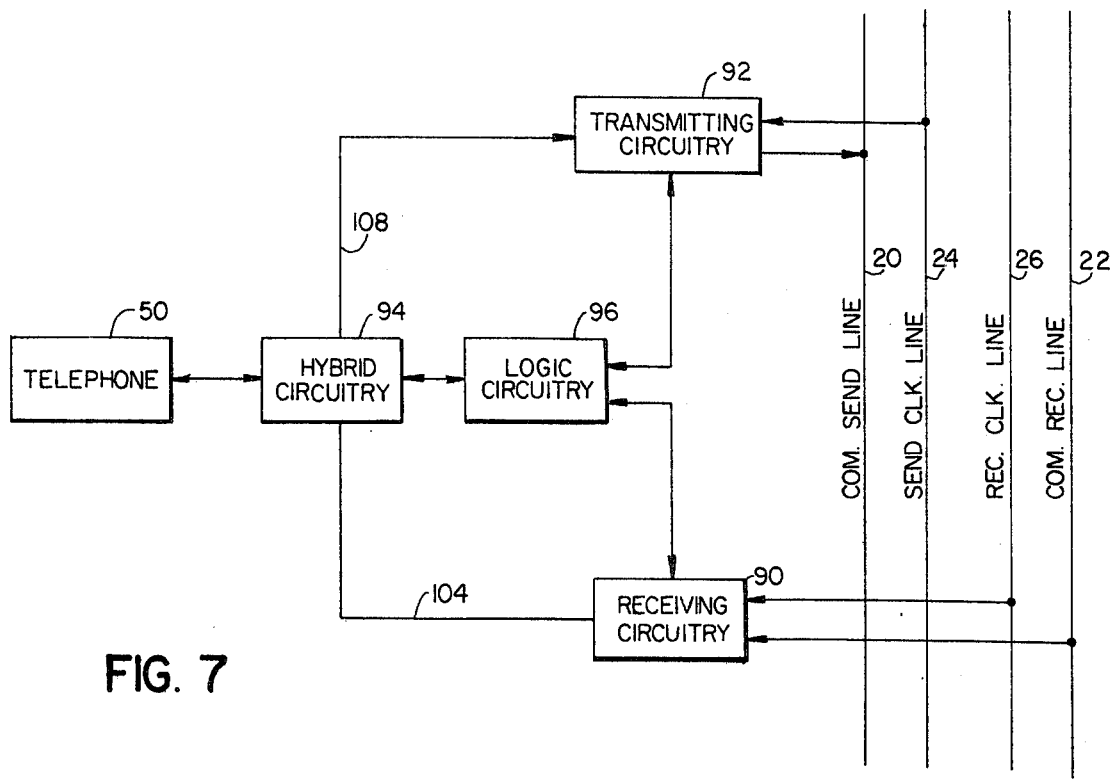
FIG. 7 is a block diagram illustrating in general the construction of one of the line appliques of FIG. 1.

A generalized block diagram of a line applique is shown in FIG. 7. As shown there a line applique broadly consists of a receiving circuitry 90, a transmitting circuitry 92, a hybrid circuitry 94 and a logic circuitry 96. All of these units are preferably contained on a single printed circuit board or card and are made up at least in part of a number of integrated circuit chips or other unitized assemblies of individual circuit devices. In FIGS. 8 to 11, these units are designated A1 to A14 and each is designed to perform the functions described below.

Figure 8:
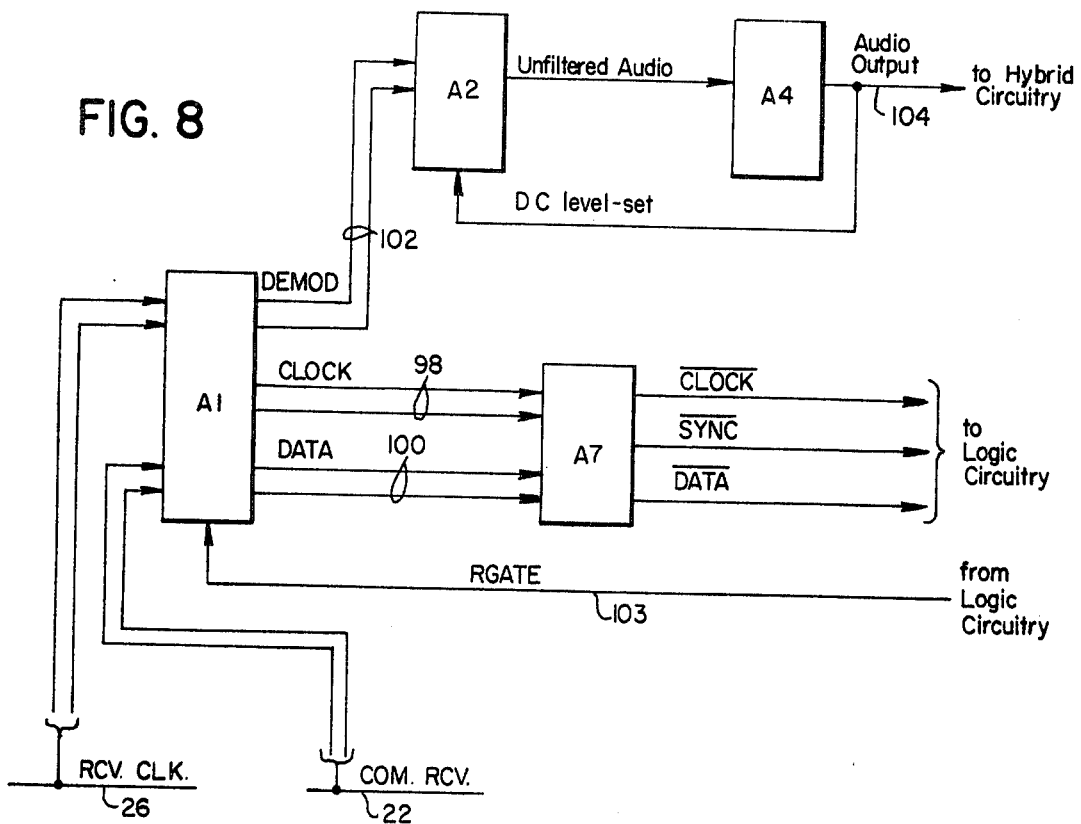
FIGS. 8 to 11 are block diagrams illustrating in more detail the various components of the line applique of FIG. 7.

The receiving circuitry 90 of FIG. 7 is shown in more detail in FIG. 8. Referring to the latter figure, receive clock pulses taken, by way of a balanced bridging connection, from the receive clock line 26, are fed to A1, a bipolar chip. They are buffered there and passed, as balanced clock signals, on balanced line 98, to A7, a bipoler to MOS interface chip. In A7, a single-ended negative-going $\overline{\text{clock}}$ signal is recovered and conditioned for use by the logic circuitry (both the pulse amplitude and the DC base level are adjusted). In addition, in A7 a negative-going $\overline{\text{SYNC}}$ signal is generated (once during each commutation frame, in response to the absence of a clock pulse) and is passed to the logic circuitry 96.

Receive signal pulses taken, by way of a balanced bridging connection, from the communication receive line 22 are also fed to A1. They are buffered and stretched there and passed, as balanced DATA signals, on balanced line 100, to A7. That is, if there is no pulse in a particular time-slot, no DATA signal appears at the output of A1; if there is a pulse, a balanced DATA signal pulse of standard amplitude and duration appears. In A7, a single-ended negative-going $\overline{\text{DATA}}$ signal is recovered and conditioned for use by the logic circuitry 96.

An RGATE signal is supplied to A1 on line 103 from the logic circuitry 96. If RGATE is high at the trailing edge of a particular clock pulse, a ramp voltage (in A1) is initiated at that time and reset at the trailing edge of the following receive signal pulse from the communication receive line 22. If RGATE is low, the ramp is not initiated. A balanced version of the ramp voltage appears at the output of A1, on the balanced line 102, as the indicated DEMOD signal. This signal is passed to the chip A2, basically a pulse width demodulator, where it is buffered and conditioned. After conditioning, a single-ended version of the signal is passed to A4 which is an active multi-pole filter. The output of A4 is the incoming voice-band signal which is sent to the hybrid circuitry 94 over the line 104. A portion of the output of A4 is returned to A2 for automatic adjustment of the operating point of circuitry in that component.

Figure 9:
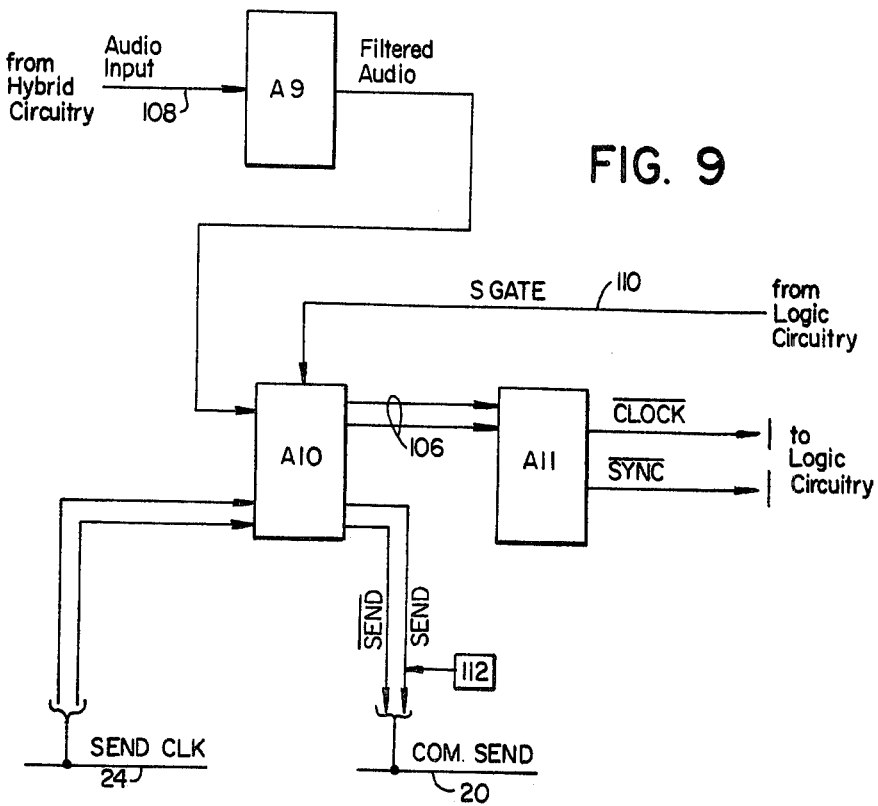
Figure 10:
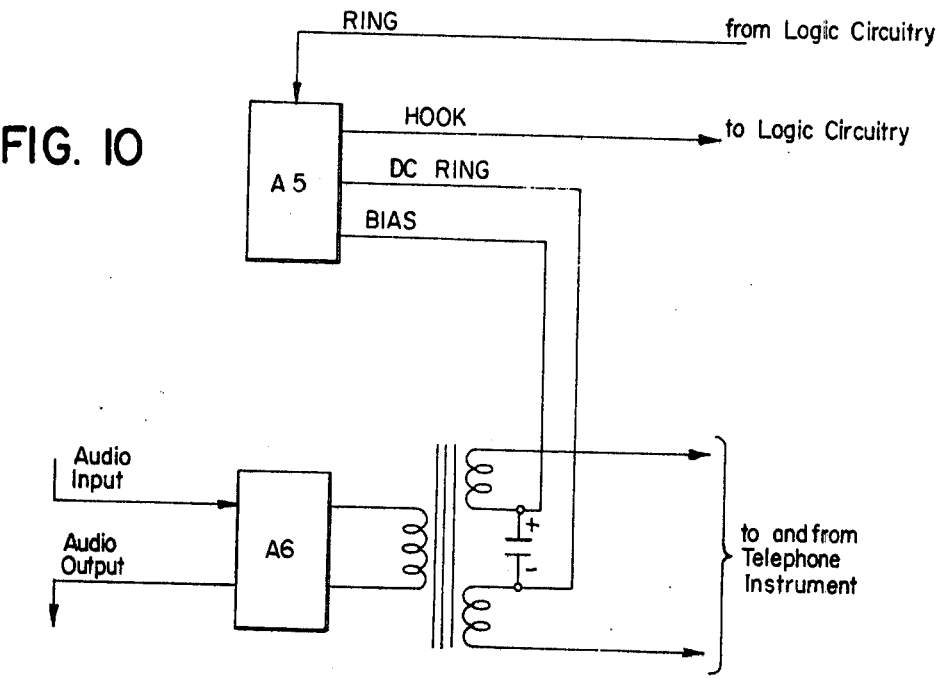

The transmitting circuitry 92 of FIG. 7 is shown in more detail in FIG. 9. Referring to this figure, send clock pulses, taken by way of a balanced bridging connection, from the send clock line 24 are fed to a bipolar chip A10. They are buffered there and passed, as balanced CLOCK signals on balanced line 106, to A11, a bipolar to MOS interface chip. In A11, a single-ended negative going $\overline{\text{CLOCK}}$ signal is recovered and conditioned for use by the logic circuitry 96. In addition, in A11 a negative-going $\overline{\text{SYNC}}$ signal is generated and passed to the logic circuitry. Here it may be well to note that the $\overline{\text{CLOCK}}$ and $\overline{\text{SYNC}}$ signals developed by A11 are derived from clock pulses which appear on the send clock line 24, while those developed by A7 of FIG. 8 are derived from clock pulses which appear on the receive clock line 26. These two sets of clock pulses may or may not be time-coincident.

Outgoing voice band signals from the hybrid circuitry 94, and appearing on the line 108, are passed through an active multi-pole filter A9 and presented as an audio input to A10. An SGATE signal is supplied to A10 by the logic circuitry 96 on line 110. If SGATE is high at the trailing edge of a particular clock pulse, a ramp voltage (in A10) is initiated at that time and reset when the ramp voltage coincides with the voltage of the audio presented to A10. If SGATE is low, the ramp is not initiated. If the ramp is initiated, a balanced pulse is transmitted to the communication send line 20. The start of the pulse coincides with ramp initiation, the end of the pulse coincides with ramp reset. The outgoing pulse is, therefore, width modulated by the audio input to A10.

The outgoing signal from A10 is injected on the (balanced) communication send line 20 as a balanced current pulse rather than as a voltage pulse. In the quiescent state, the SEND side of the send line is low and the $\overline{\text{SEND}}$ side is high. A signal pulse is put on the send line by drawing current from the $\overline{\text{SEND}}$ side (which produces a negative-going voltage pulse) and supplying current to the SEND side (which produces a positive-going voltage pulse). When A10 is quiescent, it draws current from the SEND side and draws no current from the $\overline{\text{SEND}}$ side of the send line. The current drawn from the SEND side is balanced by an equal current supplied by a constant current source 112. When A10 is quiescent, then there is no net current flow to or from either the SEND or the $\overline{\text{SEND}}$ side of the send line. During transmission of a pulse (by A10), current is drawn from the $\overline{\text{SEND}}$ side of the send line and current drain from the SEND side is interrupted. The constant current source 112 then supplies the desired current (which is no longer drawn by A10) to the SEND side of the SEND line The hybrid circuitry 94 of FIG. 7 is shown in more detail in FIG. 10. Referring to this figure, the component A6 is an active hybrid. Incoming audio from the receiving circuitry filter A4 is passed to the associated telephone 50 but not to the transmit filter A9 of the transmitting circuitry. Outgoing audio (originated by the telephone) is passed to the transmit filter A9. Bias current is supplied to the telephone by the component A5, which also includes a current sensor so that it can determine whether the telephone is on-hook or off-hook. A digital HOOK signal produced by A5 indicates the status of the instrument (on-hook or off-hook) to the logic circuitry 96, going high when the instrument is on-hook.

The electronic ringer in the associated telephone instrument is controlled by a DC RING output signal produced by A5 in response to the level of a digital RING signal from the logic circuitry 96. The digital RING signal is normally low. DC RING is normally at ground, but it goes negative when the instrument is to ring (when the digital RING signal goes high) causing the electronic ringer to be activated. An interlock in A5 forces DC RING to ground when HOOK is low.

Figure 11:
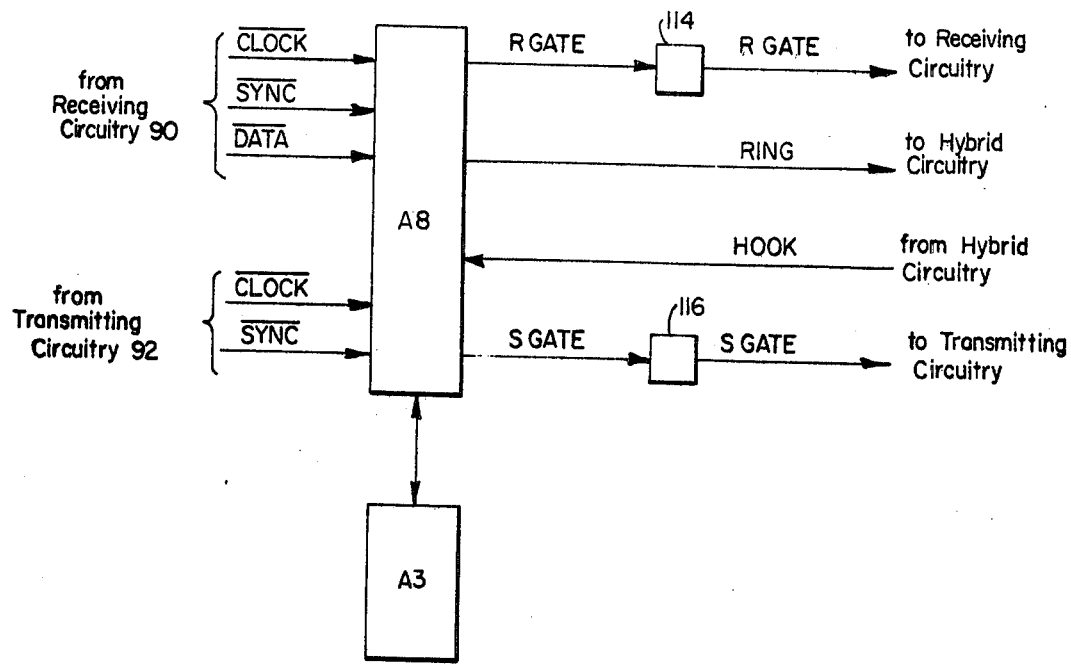

The logic circuitry 96 of FIG. 7 is shown in more detail in FIG. 11. As shown there, 114 and 116 are level-shifting circuits which condition the positive-going RGATE and SGATE signals (generated by A8) for use by A1 of FIG. 8 and A10 of FIG. 9. A3 is a memory unit which stores the double-hex address of the applique in hard-wired form, and makes this information available to A8. The remainder of the logic circuitry is contained in A8 which may be a single MOS integrated circuit chip. The unit A8 contains a fifty-five bit recirculating shift (listening order) register, advanced by the $\overline{CLOCK}$ signals from the receiving circuitry 90. The bits stored in the register control the generation of the RGATE signals. When a "1" appears at the output of the shift register during any time slot, an RGATE signal is generated during the following clock pulse appearing on the receive clock line 26 and the applique receives from the communication receive line 22 during the time slot which follows. The contents of the listening order register are updated periodically by command messages, which appear at A8 as $\overline{DATA}$ signals during the first four time slots of each commutation frame. Each block of four bits is a word which may or may not be part of a command message. A command message consists of two address words and thirteen register words.

Each incoming word is tested by A8 to see whether or not it is a sync word (any word of the form "1111" is a sync word). Every command message is preceded by two consecutive sync words. Accordingly, when two consecutive sync words are detected, the next two incoming words (which must be address words) are checked against the address stored in A3. If there is no match, the remainder of the message is disregarded and A8 resumes its search for sync words. If there is a match, the remaining 13 words (the register words) of the message are entered in the listening order register where they displace fifty-two stored bits. Entry is accomplished by storing each word, holding it until the proper point in the shift-register recirculation cycle, and then clocking in the four bits of the new words instead of recirculating the previously stored four corresponding bits.

The RING output of A8 is controlled by the last of the 52 bits contained in the thirteen register words of the listening order register. This bit is called the ring bit. RING is high, which activates the electronic ringer, if the ring bit is "1", otherwise RING is low.

The unit A8 contains two counters, an eight-state counter and a seven-state counter. These are advanced by the $\overline{CLOCK}$ signal from the transmitting circuitry 92 and reset by the $\overline{SYNC}$ signal received from that circuitry. Once during each commutation frame, the contents of the counters match the double-hex address stored in A3. When the match occurs, an SGATE signal may or may not be generated by the following clock pulse appearing on the send clock line 24. If SGATE is generated, the applique transmits (on the communication send line 20) during the time slot which follows. Generation of SGATE is controlled by the status of the HOOK signal and by the contents of the listening order register. When the register stores no "1's", or stores only a single "1" at the ring-bit position, it is said to be empty; otherwise it is non-empty. The SGATE signal is generated according to the following scheme:

(a) If HOOK Is high (the telephone is on-hook) and the listening order register is empty, no SGATE signal is generated.

(b) If HOOK is low (the telephone is off-hook) and the listening order register is non-empty, SGATE is generated during every commutation frame.

(c) In all other cases (HOOK high and register non-empty, HOOK low and register empty), SGATE is generated during alternate commutation frames (one signal in every other frame).

TRUNK APPLIQUE AND TRUNK INTERFACE UNIT

FIGS. 12 to 19

A "trunk" applique is one which serves as an interface between the remainder of the system and a trunk interface unit, such as shown at 52 in FIG. 1 servicing a single two-wire trunk which may be either a loop-start or a ground-start trunk. Preferably, both the trunk applique and the trunk interface unit associated with a given trunk line are both contained on a single printed circuit board or card and are, therefore, herein described together. Among other things, a trunk applique and its associated trunk interface unit provide pulsed out-dialing signals in standard rotary dial format, even though the telephone instruments associated with the system are equipped with two-tone touch dial pads.

Figure 12:
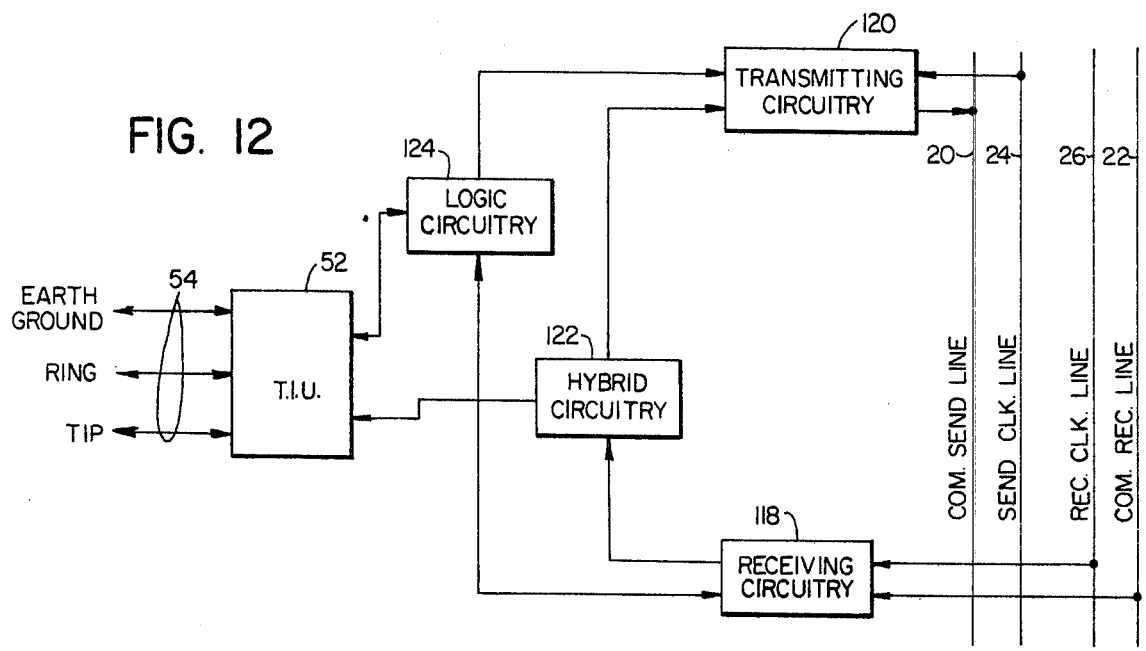
FIG. 12 is a block diagram illustrating one of the trunk appliques and associated trunk interface unit of FIG. 1.

A generalized block diagram of a trunk applique and of its associated trunk interface unit is shown in FIG. 12. Referring to this figure, the trunk interface unit is indicated at 52 and the trunk applique is comprised of a receiving circuitry 118, an transmitting circuitry 120, a hybrid circuitry 122 and a logic circuitry 124. All of these components of FIG. 12 are preferably made up at least in part of a number of integrated circuit chips or other utilized assemblies of individual circuit components, and in FIGS. 13 to 19 these units are designated A12 to A26 and each is designed to perform the functions described below.

Figure 13:
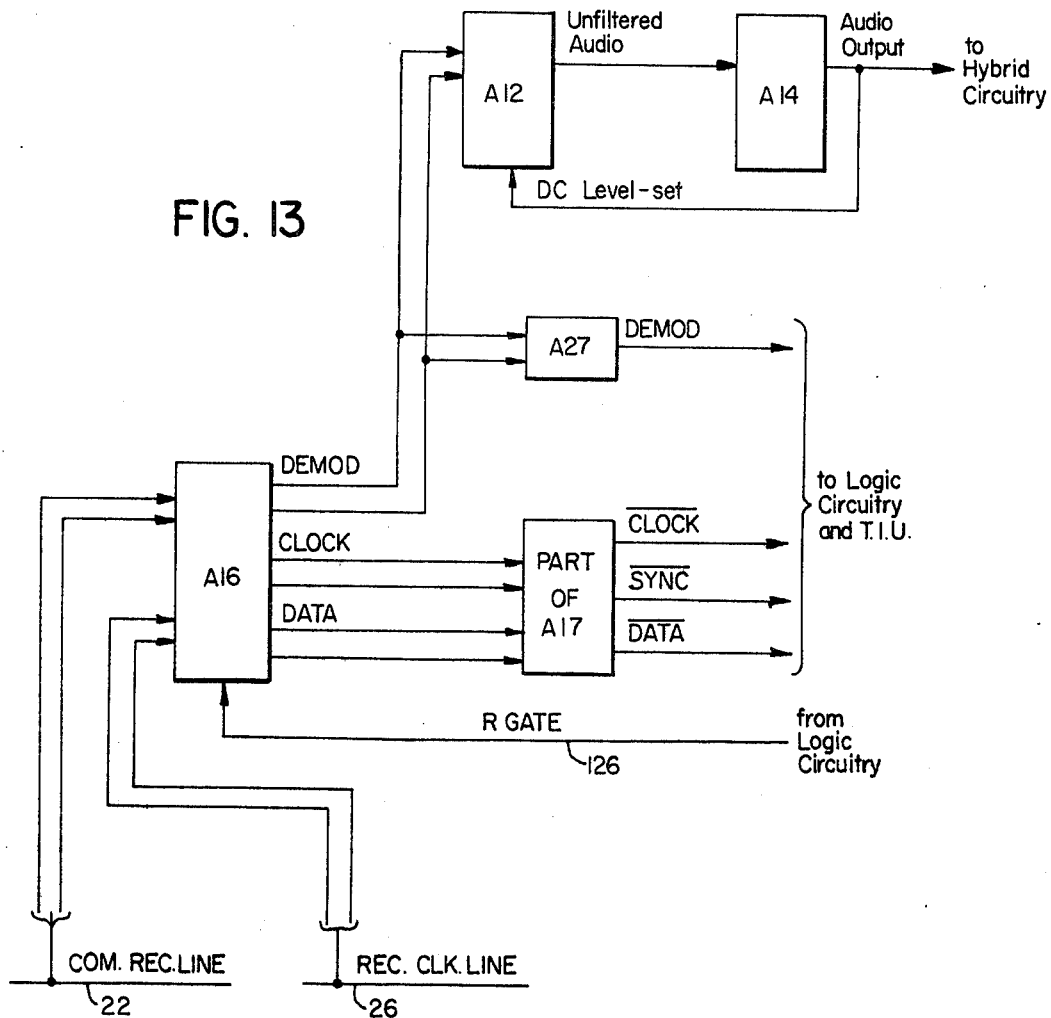

The receiving circuitry 118 of FIG. 12 is shown in more detail in FIG. 13. Referring to FIG. 13, receive clock pulses taken, by way of a balanced bridging connection, from the receive clock line 26 are fed to A16.

They are buffered there and passed to A17. In A17, a single-ended, negative-going $\overline{\text{CLOCK}}$ signal is recovered and conditioned for use by the logic circuitry. In addition, in A17 a negative-going $\overline{\text{SYNC}}$ signal is generated, once during each commutation frame, in response to the absence of a receive clock pulse, and passed to the logic circuitry 124.

Receive signal pulses taken, by way of a balanced bridging connection, from the communication receive line 22 are also fed to A16. They are buffered and stretched there and passed, as balanced DATA signals, to A17. If there is no pulse in a particular time slot, no DATA signal appears at the output of A17; if there is a pulse, a balanced DATA signal pulse of standard amplitude and duration appears. In A17, a single-ended, negative-going $\overline{\text{DATA}}$ signal is recovered and conditioned for use by the logic circuitry 124 and the trunk interface unit 52.

An RGATE signal is supplied to A16 on line 126 from the logic circuitry 124. If RGATE is high at the trailing edge of a particular receive clock pulse, a ramp voltage (in A16) is initiated at that time and reset at the trailing edge of the following receive pulse. If RGATE is low, the ramp voltage is not initiated. A balanced version of the ramp voltage appears at the output of A16 as the DEMOD signal. The balanced DEMOD signal from A16 is passed to A12, where it is buffered conditioned. After conditioning, a single-ended version of the signal is passed to an active multi-pole filter A14, whose output is the incoming voice band signal sent to the hybrid circuitry 122. A portion of the output of A14 is fed back to A12 for automatic adjustment of the operating point of circuitry in that component. The balanced DEMOD signal is also sent to A27 where a single-ended, positive-going DEMOD signal is recovered and conditioned for use by the trunk interface unit 52.

Figure 14:
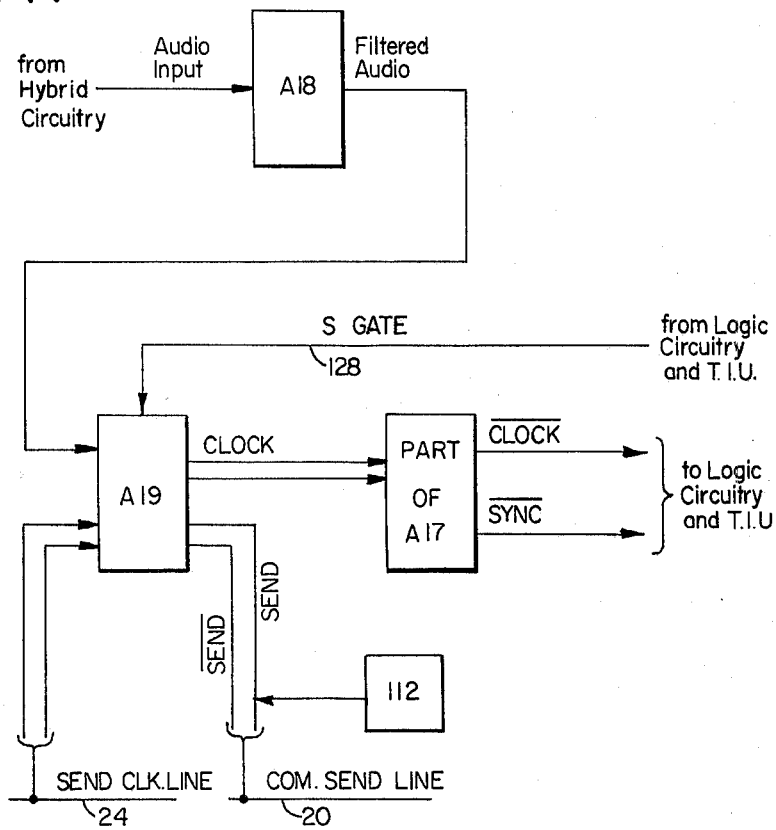

The transmitting circuitry 120 of FIG. 12 is shown in more detail in FIG. 14 to which reference is now made. Send clock pulses taken, by way of a balanced bridging connection, from the send clock line 24 are fed to A10. They are buffered there and passed, as balanced CLOCK signals to A17. In A17 a single-ended, negative-going $\overline{\text{CLOCK}}$ signal is recovered and conditioned for use by the logic circuitry 124 and the trunk interface unit 52. In addition, in A17 a single-ended, negative-going $\overline{\text{SYNC}}$ signal is generated and passed to the logic circuitry and to the trunk interface unit. At this point, it may be noted that A17 produces two sets of $\overline{\text{CLOCK}}$ signals and two sets of $\overline{\text{SYNC}}$ signals. One set of each type is derived from receive clock pulses appearing on the receive clock line 26 and the other is derived from send clock pulses appearing on the send clock line 24. The two sets may or may not be time-coincident.

Outgoing voice band signals from the hybrid circuitry 122 are passed through an active multi-pole filter A18 and delivered to A19 as an audio input.

An SGATE signal is supplied to A19 from the logic circuitry 124 and trunk interface unit 52 on the line 128. If SGATE is high at the end of a particular send clock pulse, a ramp voltage (in A19) is initiated at that time and reset when the ramp voltage coincides with the voltage of the audio signal presented to A19. If SGATE is low, the ramp is not initiated. If the ramp is initiated, a balanced pulse is transmitted on the communication send line 20. The start of the pulse coincides with ramp initiation, the end of the pulse coincides with ramp reset. The outgoing pulse is, therefore, width modulated by the audio input to A19. The outgoing signal is injected on the balanced communication send line as a balanced current pulse rather than as a voltage pulse in the same manner as discussed above with the corresponding transmitting circuitry of the line applique shown in FIG. 9, the illustrated component 112 being a constant current source.

The hybrid circuitry 122 is shown in more detail in FIG. 15. It consists of a conventional active hybrid unit A15. Incoming audio from the receive filter A14 of the receiving circuitry is passed to the trunk line, by way of the trunk interface unit, but not to the transmit filter A18 of the transmitting circuitry 120. Outgoing audio originated by the trunk line is passed to the transmit filter A18.

Figure 16:
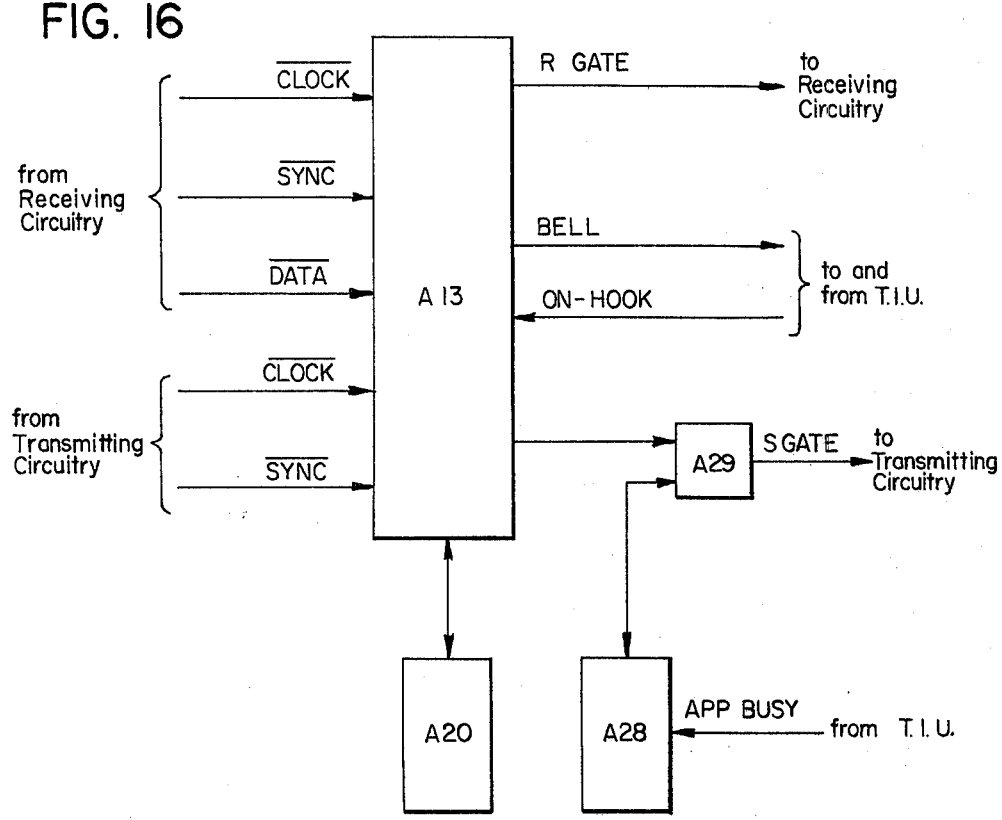

The logic circuitry 124 is shown in more detail in FIG. 16. In the circuitry of this figure, A13 is a memory device which stores the double-hex address of the trunk card in hard-wired form, and makes this information available to the main logic unit A13. A28 contains an indicating LED which shows whether or not the trunk applique is busy, as explained below. A29 is a level shifting circuit.

The main logic unit or chip A13 contains a 55 bit recirculating shift (listening order) register, advanced by $\overline{\text{CLOCK}}$ signals from the receiving circuitry 118. The bits stored in the listening order register control the generation of RGATE signals. When a "1" appears at the output of the listening order register during any time slot, an RGATE signal is generated during the following clock pulse on the receive clock line 26; and the trunk applique receives, from the communication receive line 22, during the time slot which follows. The contents of the listening order register are updated periodically by command messages which appear at A13 as $\overline{\text{DATA}}$ signals during the first four time slots of each commutation frame. As previously mentioned, each block of four bits is a word which may or may not be part of a command message. A command message consists of two address words and thirteen register words.

Each incoming word is tested to see whether or not it is a sync word (any word in the form of "1111" is a sync word). Every command message is preceded by two consecutive sync words. Accordingly, when two consecutive sync words are detected, the next two incoming words (which must be address words) are checked against the address stored in A20. If there is no match, the remainder of the message is disregarded and A13 resumes its search for sync words. If there is a match, the remaining 13 words, the register words, of the message are entered in the listening order register where they displace 52 stored bits. Entry is accomplished by storing each word, holding it until the proper point of the shift register recirculating cycle and then clocking in the four bits of the new words instead of recirculating the four corresponding previously stored bits.

The illustrated BELL output of A13 is controlled by the last of the 52 bits contained in the register words of the listening order register. This bit is called the "ring" bit. BELL is high if the ring bit stored in the listening order register is "1".

The logic unit A13 also contains two counters, an eight-state counter and a seven-state counter. Once during each commutation frame, the contents of the counters match the double-hex address stored in A20. When the match occurs, an SGATE signal may or may not be generated by the following clock pulse appearing on the send clock line 24. If an SGATE signal is generated, and if the level shifting circuit A29 is not disabled by a signal from A28, as discussed hereinafter, the trunk applique transmits on the communication send line 20 during the following time slot.

Generation of an SGATE signal, which is passed to the transmitting circuitry 120 unless the level shifting circuit A19 is disabled, is controlled by the status of the ON HOOK signal and by the contents of the listening order register. When the listening order register stores no "1"', or stores only a single "1" at the ring-bit position, it is said to be "empty"; otherwise it is "non-empty". SGATE signals are generated according to the following scheme:

(a) If ON HOOK is high and the listening order register is empty, no SGATE signals are generated.

(b) If ON HOOK is low and the listening order register is non-empty, an SGATE signal is generated during each commutation frame.

(c) In all other cases (ON HOOK high and register non-empty, ON HOOK low and register empty) SGATE signals are generated during alternate commutation frames (one signal during every other frame).

A busy/normal switch is included in A28. With this switch in the "busy" position, A29 is disabled. No SGATE signals reach the transmitting circuitry, and the trunk applique therefore transmits no signals to the communication receive line of the system. That is, from the stand point of the system, the trunk applique is essentially nonexistent when the busy/normal switch is in the "busy" position. When the busy/normal switch is in the "normal" position, A28 has no effect on the operation of the trunk applique and serves only to drive the indicating LED, associated with it. The indicating LED goes on when the busy/normal switch is in the "busy" position. When the switch is in its "normal" position, the LED goes on when the illustrated busy signal is high.

Reference may now be made to FIG. 17 which shows in more detail the construction of the trunk interface unit 52.

The hybrid circuitry is connected to the system side of a trunk coupling transformer 130, and a diode limiter circuit 132 limits the voltage appearing at that point. A muting relay KM, which is actuated during outpulsing, shorts the system side of the coupling transformer and inserts (instead) a resistor 134 between the hybrid circuitry and ground. The coupling transformer 130 may be strapped to match the trunk applique to either a 900 ohm trunk or a 600 ohm trunk, such strapping being omitted in FIG. 17.

The tip side of the trunk line is connected to one end of the trunk side of the coupling transformer 130. The ring side of the trunk line is connected to the other end of the trunk side of the coupling transformer 130 when the illustrated loop relay KL is actuated. The ring side of the trunk line is connected to earth ground, through a resistor 136, when the illustrated start relay KS is actuated.

The trunk applique may be conditioned for operation in either ground start mode or loop start mode in accordance with the setting of an associated selector switch (not shown). In the ground start mode there is a high impedance DC path from the tip side of the trunk line to the system ground, but this path is broken when either the loop relay KL or the muting relay KM is actuated. There are no other DC paths from the trunk line to the system in the ground start mode, and no DC paths at any time in the loop start mode.

Still referring to FIG. 17, A22 is a loop current detector which senses DC current in the trunk side of the coupling transformer 130 (there being, of course, no current when the loop relay KL is not actuated). The output LI is high when there is loop current in either direction through the trunk side of the coupling transformer, and is low when there is none. The output $\overline{RLI}$ goes low when there is reverse loop current (that is, when tip is negative with respect to ring, and KL is actuated) and is otherwise high.

A30 is an automatically adjusted DC shunt which prevents the DC current in the trunk side of the coupling transformer 130 from exceeding an acceptable nonsaturating level. It compensates, automatically, for variation in the loop resistance of the trunk.

The unit A24 is a ring detector, it having an output RDO which goes high when ringing voltage appears between tip and ring, the output RDO being otherwise low.

Finally, the unit A23 is a polarity detector. In the ground start mode (but not in the loop start mode), $\overline{COST}$ goes low when tip is positive with respect to ring and neither the loop relay KL nor the muting relay KM is actuated. In either mode, $\overline{COST}$ goes low when tip is negative with respect to ring. With no voltage between tip and ring, $\overline{COST}$ is high. That is, with tip positive with respect to ring, $\overline{COST}$ is always high in the loop start mode, and is high in the ground start mode when the loop relay or the muting relay is actuated, or when both relays are actuated.

Figure 18:
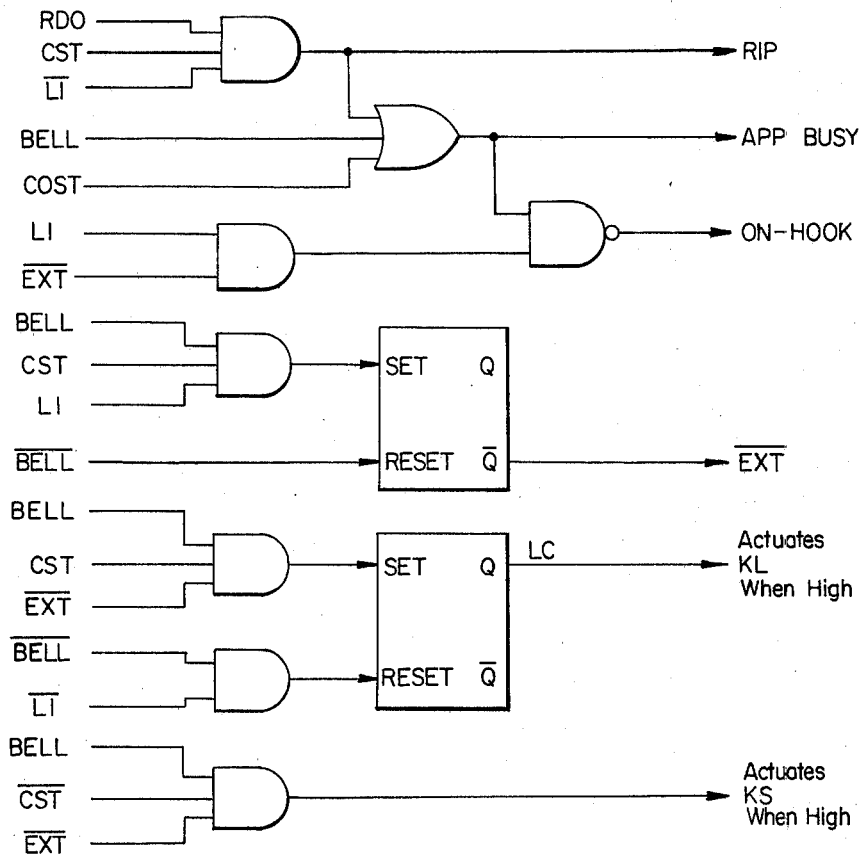
Figure 19:
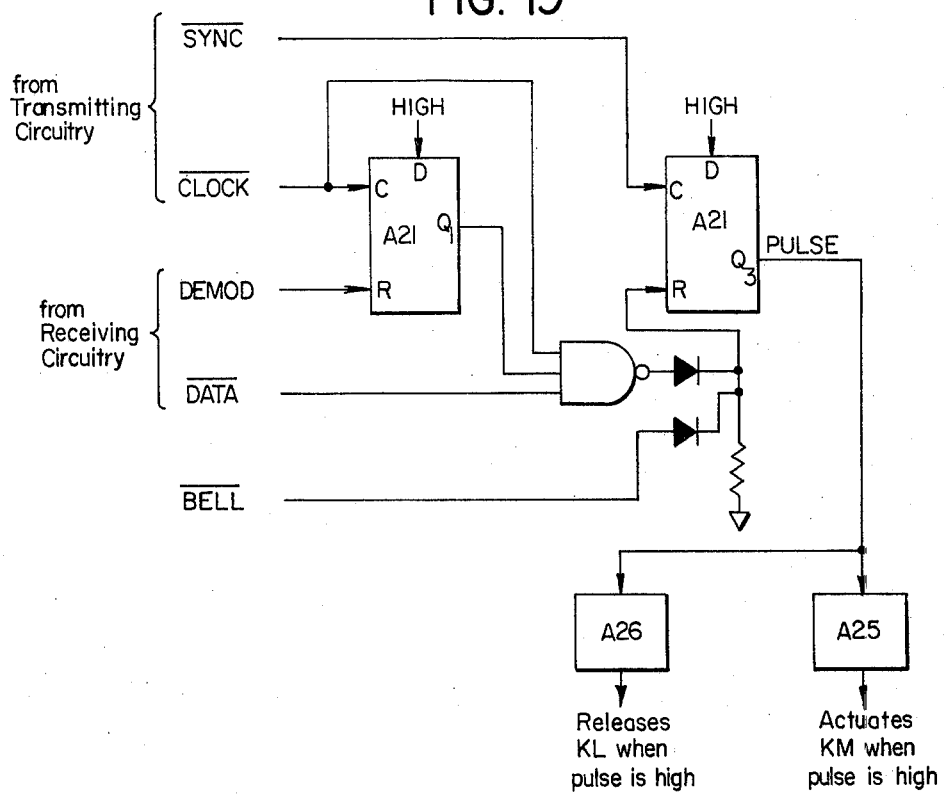

The trunk interface unit 52, in addition to the parts shown in FIG. 17, also includes additional logic circuitry shown in FIGS. 18 and 19. Referring first to FIG. 18, $\overline{CST}$ is a signal which is identical with $\overline{COST}$ when the trunk applique is operated in the ground start mode, and which is always low when the trunk applique is operated in the loop start mode. The muting relay KM is involved only in outpulsing, and the logic which controls that relay (which also controls the loop relay KL during outpulsing) is not shown in FIG. 18.

When the trunk line is not in use, and when there is no request for service, either by the switching system or by the central office, BELL, RDO (ring detector output), and COST (central office start) are low. Accordingly, RIP (ring in progress) and APP BUSY (applique busy) are low and ON HOOK is high. $\overline{EXT}$ (no external seizure) is high, and neither KS nor KL is actuated.

A request for service from the central office may be initiated by the system by setting BELL high. At this point, APP BUSY goes high and (since $\overline{EXT}$ is high) ON HOOK goes low. The system detects the new status of ON HOOK (low), and interprets it as an acknowledgement, by the trunk applique, of the service request.

In the ground start mode, KS is actuated when BELL goes high (since both $\overline{CST}$ and $\overline{EXT}$ are high), which connects the ring side of the trunk to earth ground. The central office responds by making tip positive with respect to ring, which makes COST and CST high (and makes $\overline{CST}$ low, releasing KS). With BELL and CST high, and $\overline{EXT}$ high, LC goes high which actuates KL. LI then goes high. The polarity detector is disconnected when KL is actuated. There is, however, a delay before $\overline{COST}$ goes high (and CST goes low). During this period $\overline{EXT}$ is set low, which completes the connection.

In the loop start mode, CST is always high and $\overline{CST}$ is always low. KS is, therefore, disabled. LC goes high as soon as BELL goes high, and $\overline{\text{EXT}}$ goes low as soon as LI goes high (following actuation of KL).

A request for service initiated by the central office is made by applying a voltage between tip and ring. This may be of either polarity in the ground start mode, but tip must be negative with respect to ring in the loop start mode. In addition, a ringing signal may be sent by the central office. In either case, APP BUSY goes high, and, since $\overline{\text{EXT}}$ is high, ON HOOK goes low. The switch responds by setting BELL high, which actuates KL if $\overline{\text{COST}}$ is low and then sets $\overline{\text{EXT}}$ low. $\overline{\text{COST}}$ returns to its normal high level after KL is actuated.

A disconnect procedure is initiated by the central office by interrupting the loop current. With $\overline{\text{EXT}}$ low, this makes ON HOOK go high. At the same time, KL is released. When ON HOOK goes high, the switch responds by making BELL low, which sets $\overline{\text{EXT}}$ high completing the disconnect.

A disconnect procedure is initiated by the system by making BELL low. This sets $\overline{\text{EXT}}$ high and also releases KL. ON HOOK then goes high, completing the disconnect.

The remainder of the trunk interface unit circuitry, which is associated with outpulsing is shown in FIG. 19. Referring to this figure, A21 consists of two four-bit shift registers, the data inputs of both of which are wired high. One of these shift registers, shown at the left in FIG. 19, is advanced by a $\overline{\text{CLOCK}}$ signal, from the transmitting circuitry 120, and is reset (clear) by a DEMOD signal from the receiving circuitry 118. The $Q_1$ output of this register is, accordingly, high except during a time slot (other than a command time slot) when the trunk applique is receiving. The other shift register, shown at the right in FIG. 19, is advanced once in each commutation frame by a $\overline{\text{SYNC}}$ signal from the transmitting circuitry 120. If BELL is low, this shift register is continuously reset and pulsed, its $Q_3$ output is always low. When BELL is high, this shift register is reset if $\overline{\text{DATA}}$ goes low during the time slot when $Q_1$ is low.

If the trunk applique receives during a single time slot (other than a command time slot) and if the signal pulse in that time slot is absent for two or more consecutive commutation frames, PULSE goes high and remains high until the signal pulse reappears. Outpulsing is accordingly accomplished by periodically interrupting the signal pulse in a time slot during which the trunk applique receives. For the duration of each interruption, the loop relay KL is released, interrupting the loop current in the trunk in exactly the same fashion as a rotary dial. The muting relay KM is actuated when the loop relay is first released at the start of a single digit outpulsing sequence. The muting relay control incorporates a time delay, and the muting relay is not released until after the single digit outpulsing sequence is completed.

MASTER REPEATER

FIGS. 20 to 26

As discussed previously in connection with FIG. 4, the master repeater 56 is part of the common control 34. It serves as a common interface between the peripheral devices of the system and the processor 58 and tone decoder/receivers 62, 62 of the common control.

Figure 20:
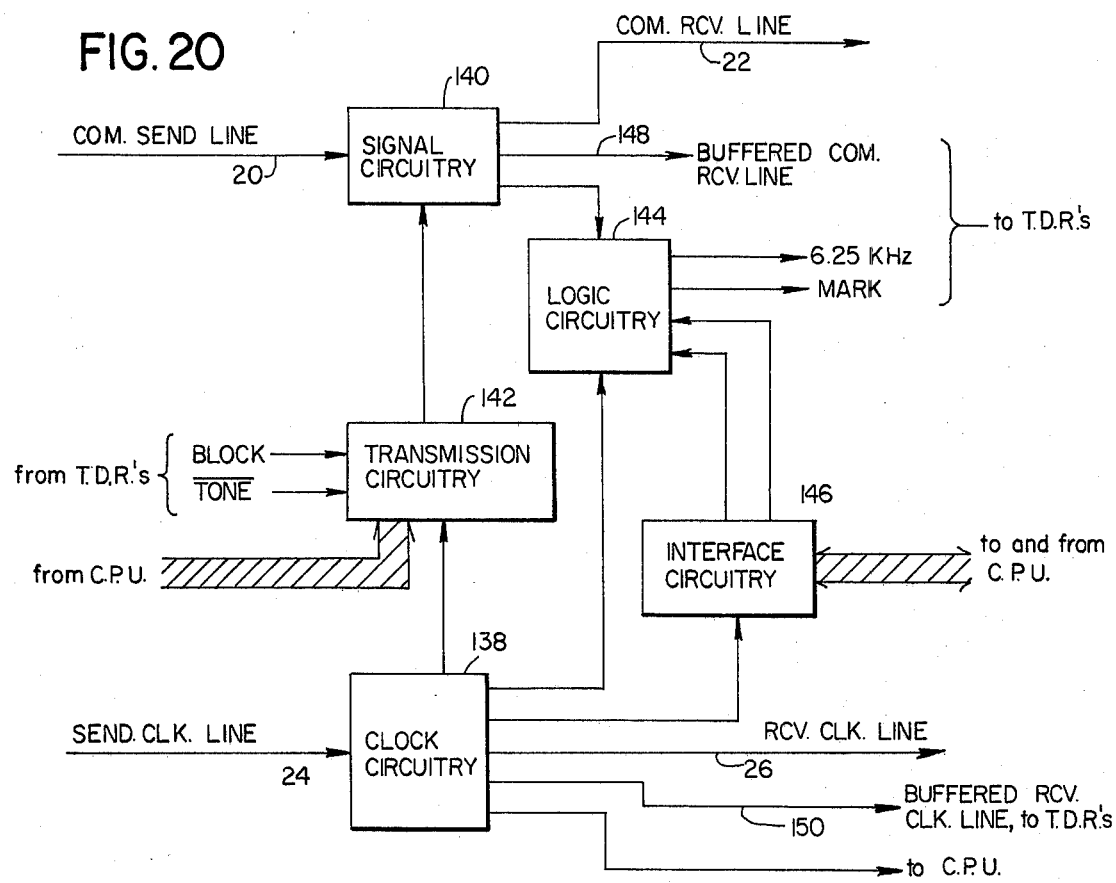
FIG. 20 is a block diagram illustrating in more detail the construction of the master repeater of FIG. 4.

A functional block diagram of the master repeater is shown in FIG. 20. The functional components of the repeater as shown in FIG. 20 are a clock circuitry 138, a signal circuitry 140, a transmission circuitry 142, a logic circuitry 144 and an interface circuitry 146. The nature of each of these circuitries is shown in more detail in FIGS. 21 to 26. At this time, however, it may be well to note that the basic function of the repeater is to control through the signal circuitry 140 the routing of incoming signals received on the communication send line 20 and the source of the outgoing signals injected onto the communication receive line 22. That is, as to incoming signals appearing in any given time slot, the signal circuitry 140 may route them either to the communication receive line 22, which conveys them to the receive terminals of the peripheral devices, or to a buffered communication receive line 148, which transmits them to the tone decoder/receivers. When, for any given time slot, the signal circuitry 140 blocks transmission of signals from the communication send line 20 to the communication receive line 22, supervisory tone signals may be injected in that time slot on the communication receive line 22 by the signal circuitry. Clock pulses received by the clock circuitry 138 from the send clock line 24 are regenerated to provide two corresponding trains of clock pulses, one injected onto the receive clock line 26 to time the receive function of the peripheral devices and one injected onto a buffered receive clock line 150 to time the receive function of the tone decoder/receivers.

Figure 21:
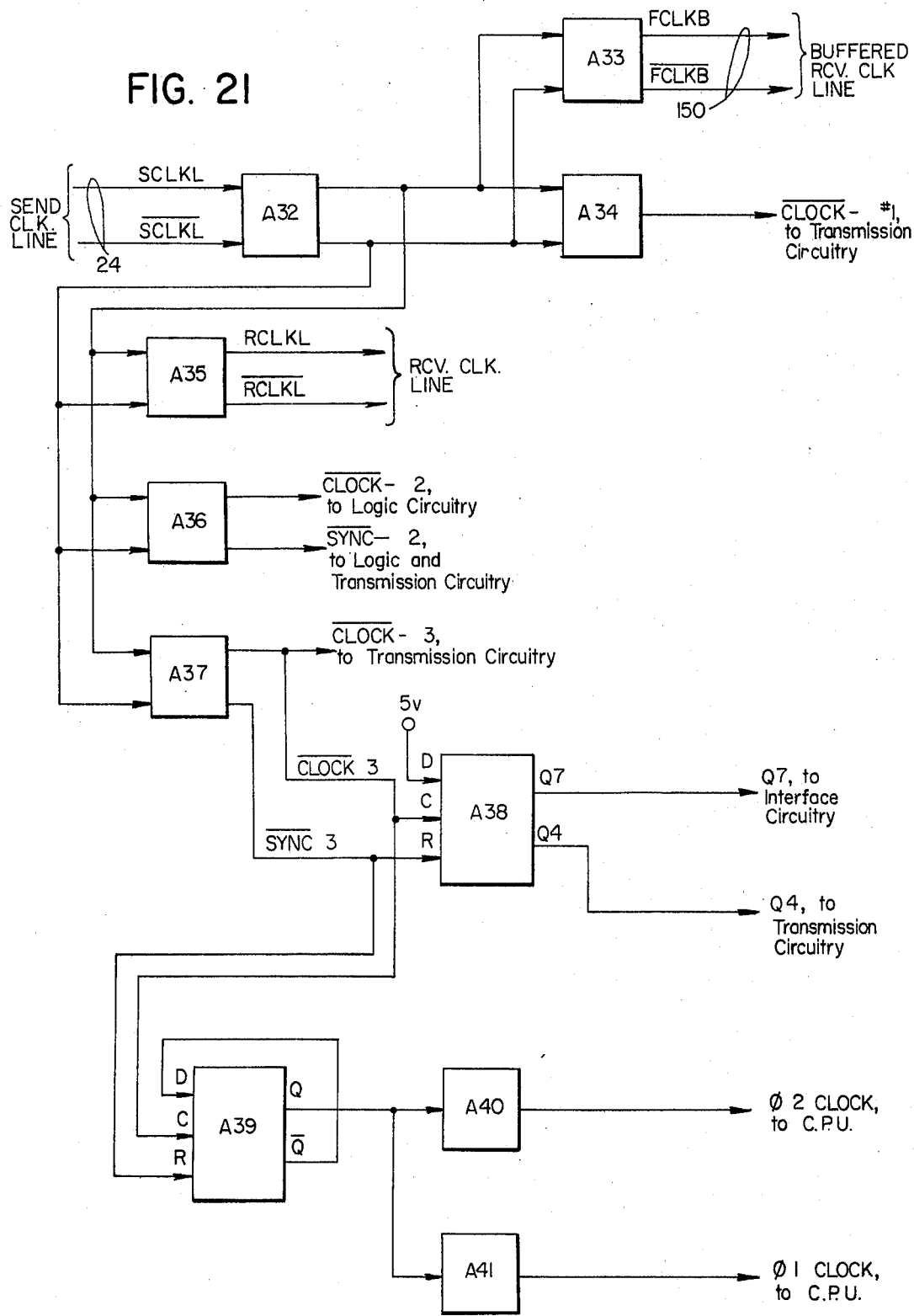

The clock circuitry 138 of FIG. 20 is shown in more detail in FIG. 21 to which reference is now made. The incoming clock signal from the send clock line 24 is balanced, with a low level of −0.5 volts and a high level of 0 volts. An input buffer A32 amplifies and reshapes the incoming signal, and delivers a balanced output with a low level of −8 volts and a high level of −3 volts. Signals at these levels are supplied to the buffered receive clock line 150 through an output buffer A33. Also, another output buffer A34 provides $\overline{\text{CLOCK}}$ - #1 signals at the same level for use by the transmission circuitry 142.

A line driver A35 delivers a balanced output to the receive clock line 26 at the same levels as the incoming signal on the send clock line 24. A36 and A37 are level changers. A36 delivers $\overline{\text{CLOCK}}$ - #2 and $\overline{\text{SYNC}}$ - #2 at a low level of 0 volts and a high level of +12 volts. A37 delivers $\overline{\text{CLOCK}}$ - #3 and $\overline{\text{SYNC}}$ - #3 at a low level of 0 volts and a high level of +5 volts. $\overline{\text{SYNC}}$ - #2 and $\overline{\text{SYNC}}$ - #3 are negative pulses which appear once in each commutation frame (following the last of the fifty-five clock pulses in each frame). They are generated, in the level changers A36 and A37, in response to the absence of a clock pulse.

$\overline{\text{CLOCK}}$ - #3 and $\overline{\text{SYNC}}$ - #3 are transmitted to a shift register A38. This shift register is a serial - input paralleloutput device which is advanced by the low-to-high transition at the trailing edge of $\overline{\text{CLOCK}}$ - #3. It is cleared by $\overline{\text{SYNC}}$ - #3. Its output $Q_4$, therefore, goes high following the fourth clock pulse in each frame and its output $Q_7$ goes high following the seventh clock pulse. Both $Q_4$ and $Q_7$ go low at the leading edge of $\overline{\text{SYNC}}$ - #3.

A flip-flop A39 is reset by $\overline{\text{SYNC}}$ - #3 and toggled by $\overline{\text{CLOCK}}$ - #3. Its Q output is therefore a square wave with a duty cycle ratio of 50%. The flip-flop A39 goes through 28 cycles in each commutation frame, and its output has a frequency of 350 KHz (28 times the 12.5 KHz frame rate). Receiving the Q output of the flip-flop A39 are two one-shot multi-vibrators A40 and A41. One of these one-shots is triggered by the low-to-high transition of the flip-flop Q output, and the other by the high-to-low transition. Together their two outputs make up a two-phase clock signal (at 350 KHz) transmitted to the CPU 58, as shown in FIG. 4.

Figure 22:
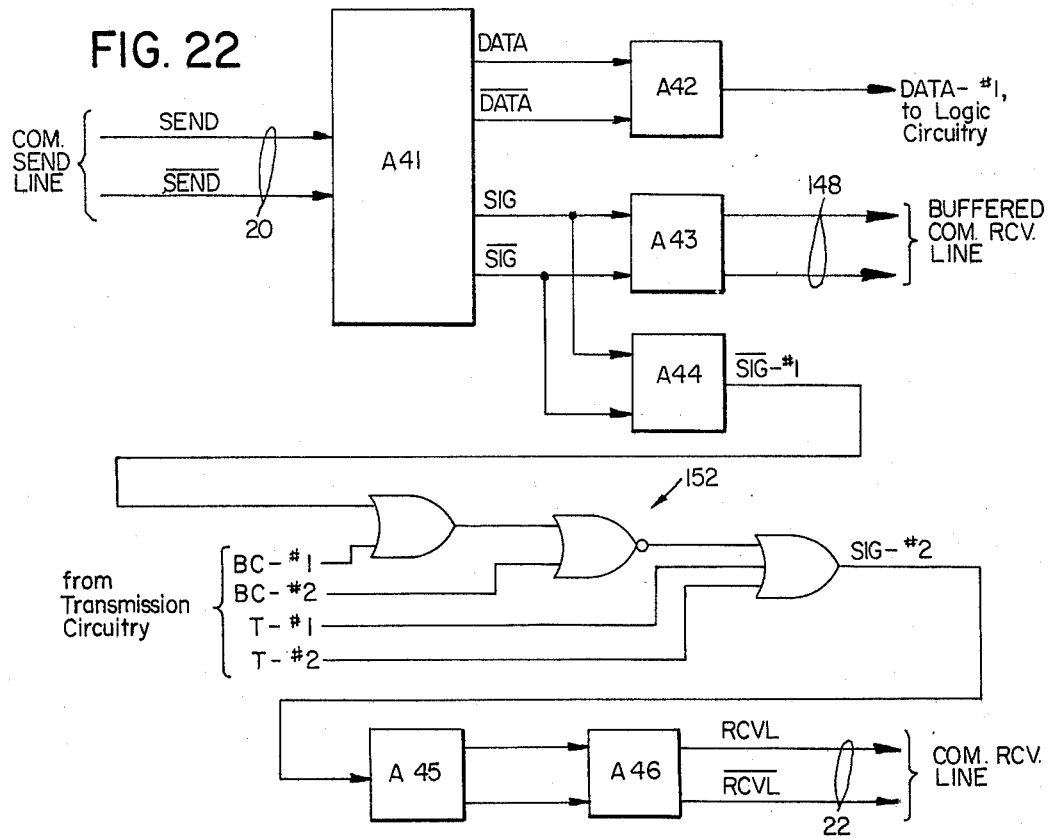
FIGS. 21 to 26 are block diagrams illustrating in more detail various ones of the components of the master repeater of FIG. 20.

The signal circuitry 140 of FIG. 20 is shown in more detail in FIG. 22. Referring to this figure, the incoming signal appearing on the communication send line 20 is balanced, with a low level of −0.5 volts and a high level of 0 volts. An input buffer A41 amplifies the incoming signal and delivers two balanced outputs with low levels of −8 volts and high levels of −3 volts. SIG and $\overline{SIG}$ are an amplified and levelshifted version of the incoming signal. DATA and $\overline{DATA}$ are an amplified, level-shifted, and stretched version of the incoming signal. If an incoming signal is present in a time slot, DATA is high (and $\overline{DATA}$ is low) for the full duration of that time slot. In the absence of an incoming signal, DATA remains low (and $\overline{DATA}$ remains high). DATA and $\overline{DATA}$ are transmitted to a level changer A42 which delivers $\overline{DATA}$ - #1. $\overline{DATA}$ - #1 appears with a low level of 0 volts and a high level of +12 volts. It is, otherwise, identical with $\overline{DATA}$.

SIG and $\overline{SIG}$ are transmitted to two buffers A43 and A44. The signal delivered to the buffered receive line 148 by the buffer A43 is always a balanced buffered version of SIG and $\overline{SIG}$, and it is not affected by the blocking signals or transmission signals as hereinafter described.

The buffer A44 produces $\overline{SIG}$ - #1 which is a buffered version of $\overline{SIG}$. $\overline{SIG}$ - #1 is transmitted to a gate circuitry, indicated generally at 152 also having as inputs thereto four signals from the transmission circuitry 142. With BC - #1, BC - #2, T - #1 and T - #2 all low, the output, SIG - #2, of the gate circuitry 152, is simply an inverted version of $\overline{SIG}$ - #1. In this case, the output of the illustrated associated line driver A46, fed by a buffer A45, is a replica, at the same levels, of the incoming signal on the communication send line 20. Forwarding of the incoming signal, from the communication send line 20 to the communication receive line 22, may be blocked by a blocking signal, BC - #1 or BC - #2, from the transmission circuitry. When such blocking does occur, the signal delivered by the line driver A46 to the communication receive line 22 is controlled by transmission signals, T - #1 and T - #2, from the transmission circuitry 142.

Figure 23:
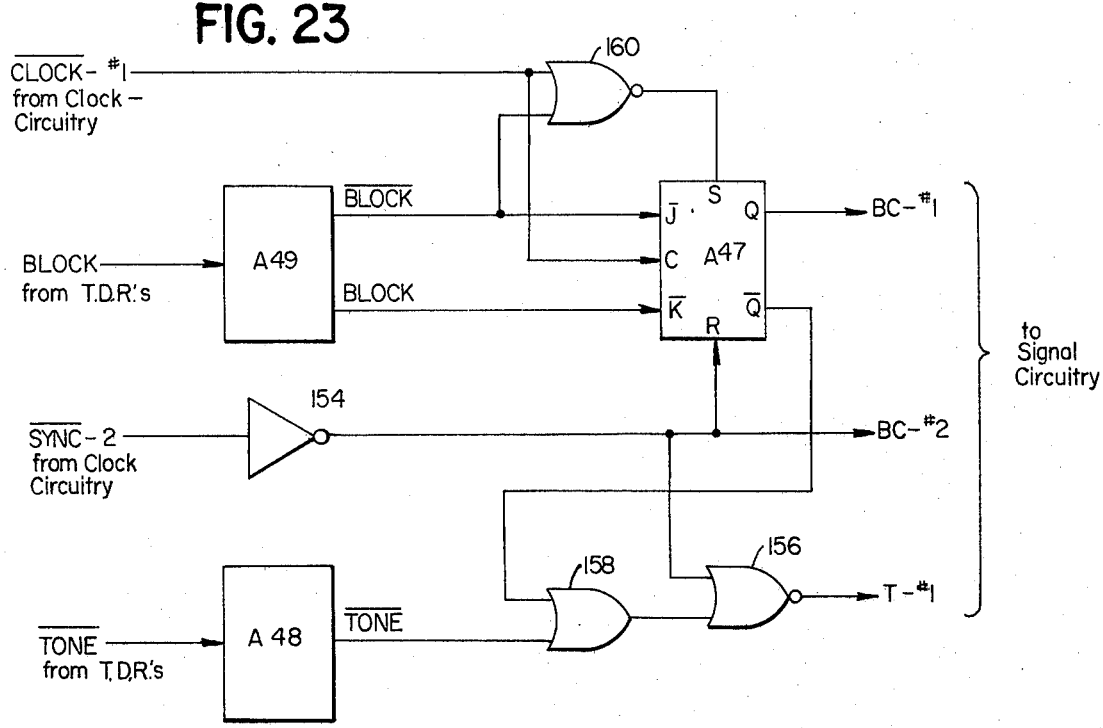
Figure 24:
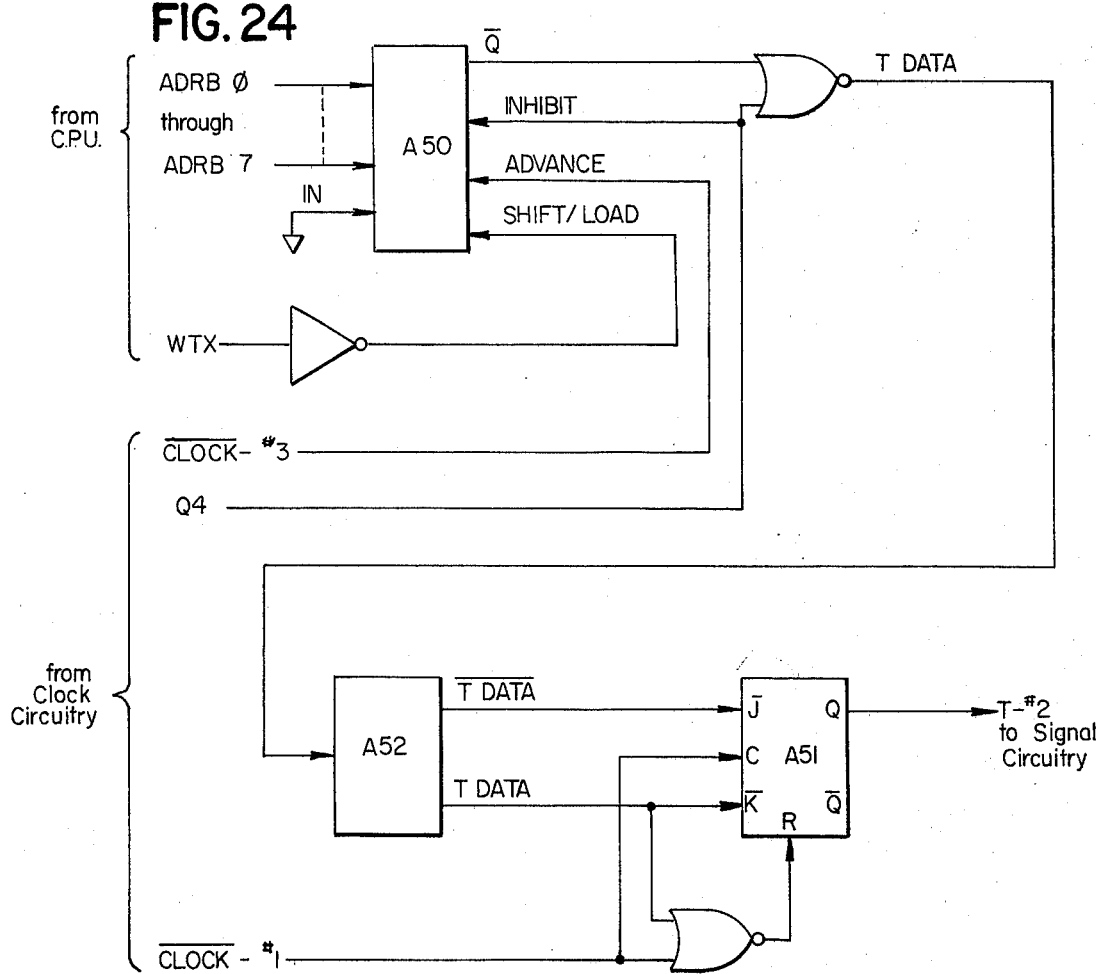

The transmission circuitry 142 of FIG. 20 is shown in more detail in FIGS. 23 and 24. Referring first to FIG. 23, the portion of the transmission circuitry there shown receives $\overline{SYNC}$ - #2 from the clock circuitry 138 and through the inverter 154 and NOR gate 156 produces BC - #2 and T - #1, BC - #2 being high and T - #1 being low during the interval (in each commutation frame) between the missing clock pulse and the first of the fifty-five clock pulses. During the remainder of the commutation frame, BC - #2 is low. When BC - #2 is low, BC - #1 and T - #1 are controlled by the illustrated flip-flop A47. When the flip-flop is set, BC - #1 is high and T - #1 is an inverted version of $\overline{TONE}$, the latter being supplied to the NOR gate 156, from the tone decoder/receivers, through a buffer A48 and OR gate 158. When the flip-flop A47 is reset, BC - #1 and T - #1 are both low.

A BLOCK signal is supplied to a buffer A49 from the tone decoder/receivers. Any one of the tone decoder/receivers may make BLOCK high. The combination of BLOCK high and $\overline{CLOCK}$ - #1 low, through NOR gate 160, sets the flip-flop A47 and prevents the master repeater from forwarding, on the communication receive line 22 the signals which arrive on the communication send line 20. The flip-flop A47 is reset by the low-to-high transition of $\overline{CLOCK}$ - #1 when BLOCK is again low, or by the next (negative) $\overline{SYNC}$ - #2 pulse. When the flip-flop A47 is set, a negative $\overline{TONE}$ pulse is inverted and sent to the signal circuitry as T - #1. It then appears at the output of the line driver A46 of the signal circuitry. If $\overline{TONE}$ remains high, T - #1 remains low.

Referring to FIG. 24 for a discussion of the remainder of the transmission circuitry, a shift register A50 is included in such circuitry and is advanced by the low-to-high transition of an ADVANCE input when a SHIFT-/LOAD input is high and INHIBIT input is low. In this mode it operates as a serial-input device with its input wired low. By making the illustrated input WTX high, the processor 58 loads eight bits in parallel from the address busses into the shift register A50. With WTX low, the shift register is advanced by the first four clock pulses in each commutation frame. The signal $Q_4$ from the clock circuitry, which goes high after the fourth clock pulse in each frame, prevents advance of the shift register by clock pulses after the fourth. With $Q_4$ low, TDATA is the inverse of $\overline{Q}$ (the shift register output). With $Q_4$ high, TDATA is always low.

TDATA and $\overline{TDATA}$ are supplied to a flip-flop A51 through a buffer A52. The flip-flop A51 is set, which makes T - #2 high, by the low-to-high transition of $\overline{CLOCK}$ - #1 if TDATA is high. It is reset, which makes T - #2 low, when TDATA and $\overline{CLOCK}$ - #1 are low. If the processor loads eight address bits into the shift register A50, these are transmitted on the receive line (four bits during each frame) during the command time slots of the next two commutation frames. If no new bits are loaded, TDATA remains low after all eight bits have been transmitted.

Figure 25:
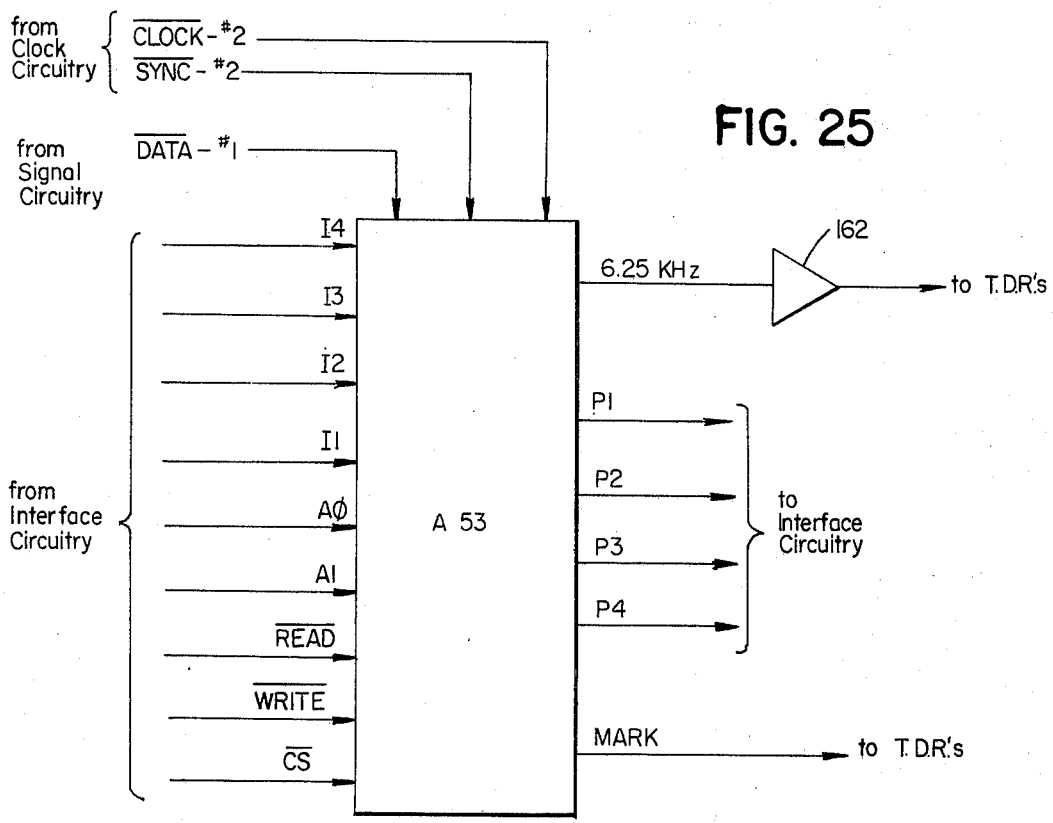

FIG. 25 shows in more detail the logic circuitry 144 of FIG. 20. With the exception of a single buffer amplifier 162, all of the logic circuitry is contained in one integrated circuit device A53.

The integrated circuit device A53 contains two counters, one having eight states, the other having seven. Both are reset by $\overline{SYNC}$ - #2 and advanced by $\overline{CLOCK}$ - #2. It also stores a double-hex address, which may or may not coincide with one of the fifty-six pairs of counter states. If the address coincides with a pair of counter states, the device A53 delivers a positive MARK pulse at one of its output terminals which is sent to all of the tone decoder/receivers 62, 62. The processor 58 is able to specify the double-hex address stored by the device A53. It can, therefore, control the generation of MARK signals. That is, by selecting an appropriate double-hex address, the processor may cause the MARK signal to appear (once during each commutation frame) during any desired clock pulse. Alternatively, by selecting a double-hex address which does not match any pair of counter states, the processor can inhibit the generation of MARK signals.

The lower half of a double-hex address is entered into A53 by making A$\phi$ high, A1 low, $\overline{WRITE}$ and $\overline{CS}$ low, and $\overline{READ}$ high. The four bits of the half-address are received on I1, I2, I3 and I4. The high half of an address is entered with A$\phi$ and A1 both high and with the other three control inputs the same as for the low half of the address.

By observing $\overline{DATA}$ - #1 during a particular time slot (over several commutation frames), the logic device A53 can determine the status (active, attention, or idle) of the peripheral device associated with that time slot. In the active state, the peripheral device transmits during every commutation frame. In the attention state, it transmits during alternate frames, and in the idle state it does not transmit. The device A53 observes $\overline{\text{DATA}}$-#1 during four time slots (zero through 3, 4 through 7, etc.), as specified by a "group number" which is stored by the logic circuitry. This group number is entered by putting the four-bit group number on I1, I2, I3, I4, making Aφ low, A1 high, $\overline{\text{WRITE}}$ and $\overline{\text{CS}}$ low, and $\overline{\text{READ}}$ high.

The status of the four devices specified by a group number is stored by the device A53 and is made available on the outputs P1, P2, P3 and P4. With Aφ high, A1 low, $\overline{\text{READ}}$ and $\overline{\text{CS}}$ low, and $\overline{\text{WRITE}}$ high, a high output indicates the attention state. With both Aφ and A1 high (and the other three control inputs as specified above), a high output indicates the active state.

Figure 26:
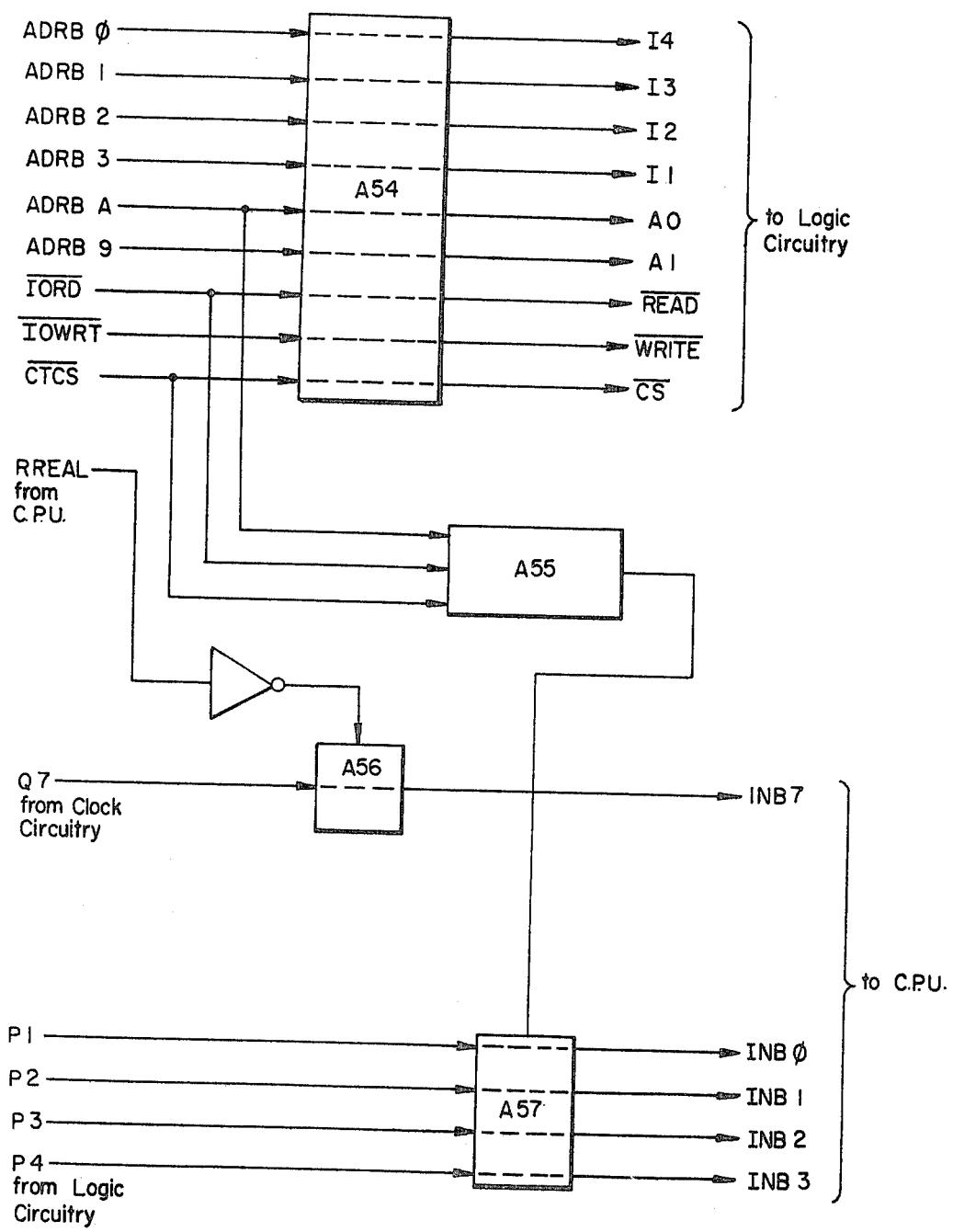

FIG. 26 illustrates in more detail the interface circuitry 146 of FIG. 20. Referring to FIG. 26, this interface circuitry includes a buffer A54, a decoder A55 and two tri-state buffers A56 and A57.

Through the illustrated components of the interface circuitry, the processor 58 can load a double-hex address into the logic device A53 in FIG. 25 to control generation of the MARK signal. It can also load a group number into the logic device A53 to control the inspection by the logic device, of the states of a group of four peripheral devices. Through the interface circuitry of FIG. 26, the processor 58 can also command the logic device A53 of FIG. 25 to display state information on its output lines P1 through P4. A command of this type automatically turns on the tri-state buffer A57 which connects the desired outputs of the logic circuitry to the appropriate processor input busses.

Through the interface circuitry of FIG. 26, the processor 58 can also read the state of $Q_7$ supplied by the clock circuitry 138. This allows the processor to schedule loading of the shift register A50 of the transmission circuitry 142 as shown in FIG. 24. For proper transmission of a command message, the shift register A50 must not be loaded during the first four time slots of a commutation frame.

TONE DECODER/RECEIVER

FIGS. 27 to 34

Each tone decoder/receiver 62 serves as a specialized interface through which the processor 58 may detect (and decode) two-tone dial signals appearing on the communication send line 20. It also, as a specialized interface, allows the processor to inject supervisory tones on the communication receive line 22. As many as seven tone decoder/receivers may be installed in the illustrated system. Each tone decoder/receiver is connected to the rest of the system as shown in FIG. 4. It is organized as shown in FIG. 27.

Figure 27:
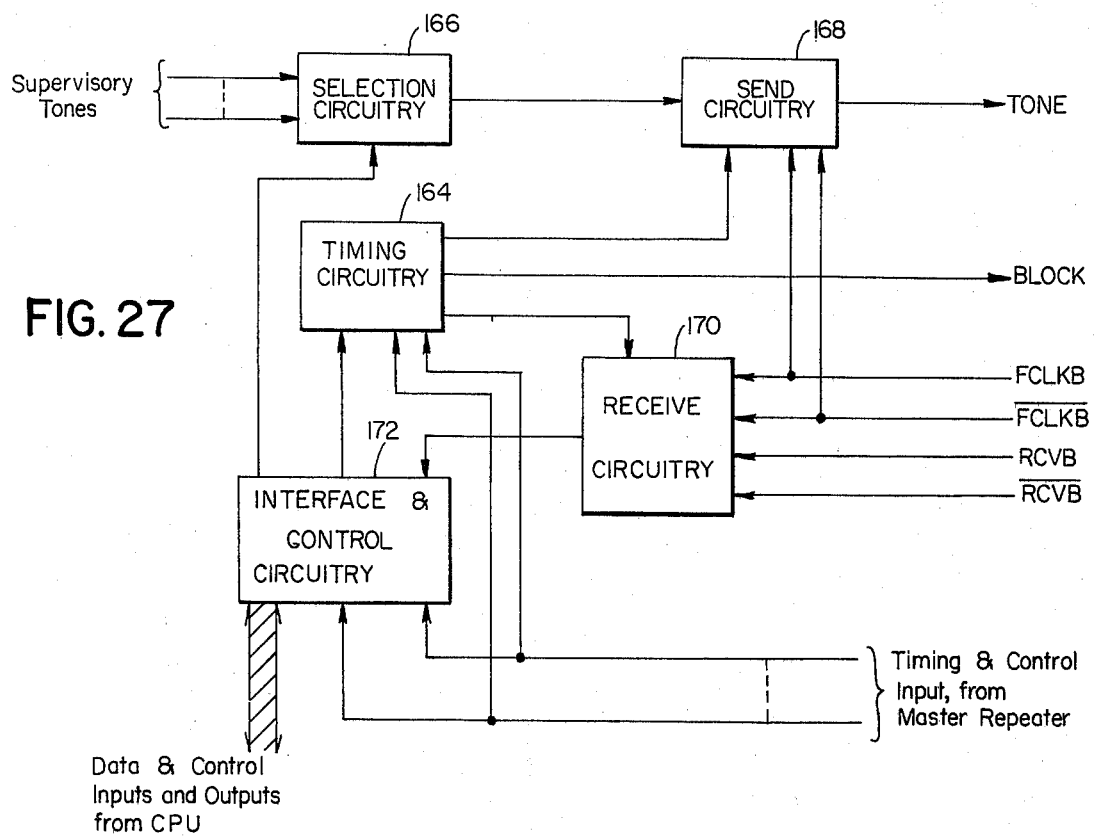
FIG. 27 is a block diagram showing in more detail the construction of one of the tone decoder/receivers of FIG. 4.
Figure 28:
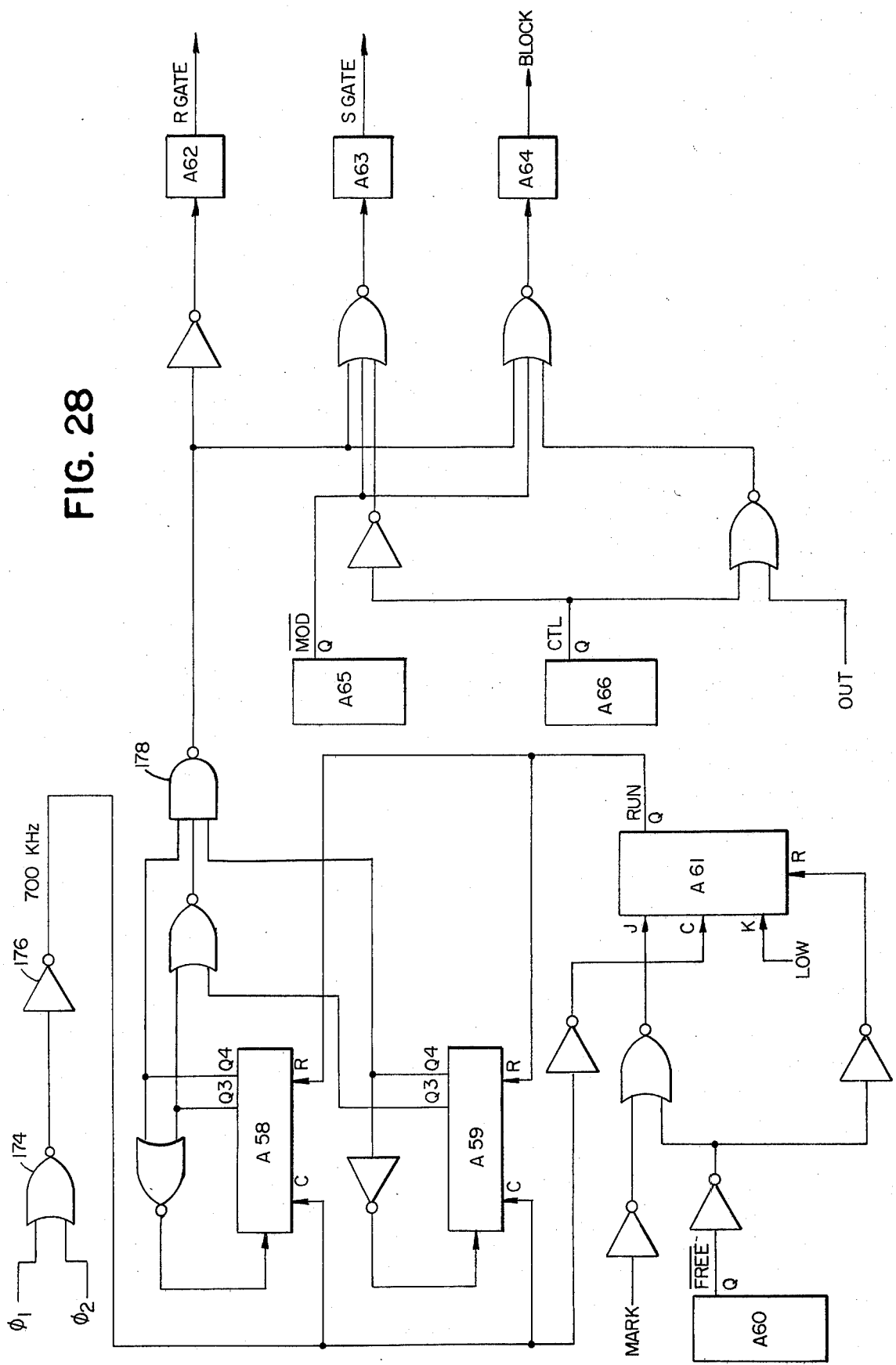
FIGS. 28 to 34 are block diagrams showing in more detail the construction of various ones of the components of the tone decoder/receivers of FIG. 27.

The timing circuitry 164 of FIG. 27 is shown in FIG. 28. Referring to FIG. 28, φ 1 and φ 2, clock signals at 350 KHz from the master repeater, are combined, by NOR gate 174 and inverter 176, to produce a single 700 KHz clock signal. This duplicates the clock signal on the communication send and receive lines at the master repeater, but unlike that signal it has no missing pulses. A58 and A59 are four-bit shift registers which advance at the leading (rising) edge of the 700 KHz clock signal. A58 sequences through a seven-state cycle, A59 through an eight-state cycle. Both are held in the reset state (each holding four zeros) as long as RUN is low.

When the tone decoder/receiver is assigned, a $\overline{\text{FREE}}$ latch A60 is set and $\overline{\text{FREE}}$ goes high. This enables the J input to a RUN flip-flop A61. When, subsequently, MARK is high during the trailing edge of a clock pulse, RUN goes high at the leading edge of the next clock pulse and the shift registers A58 and A59 are enabled. Fifty-five clock pulses after RUN goes high, $Q_3$ is low and $Q_4$ is high in each shift register. A NAND gate 178 therefore outputs a negative pulse exactly 56 pulses after the MARK pulse which released the shift registers. This pulse is repeated at the same point in each commutation frame until RUN is made low again by resetting the $\overline{\text{FREE}}$ latch, which resets the RUN flip-flop A61.

When the tone decoder/receiver is not assigned, $\overline{\text{FREE}}$ is low. In this situation, the output of NAND gate 178 is high and RGATE, SGATE and BLOCK are all low, the associated components A62, A63 and A64 being buffers.

When the tone decoder/receiver is assigned, $\overline{\text{FREE}}$ is high. In this situation, RGATE goes high once during each commutation frame. RGATE is not affected by the status of $\overline{\text{MOD}}$, CTL, or OUT. $\overline{\text{MOD}}$ and CTL are signals supplied respectively by a $\overline{\text{MOD}}$ latch A65 and a CTL latch A66. With $\overline{\text{FREE}}$ high and $\overline{\text{MOD}}$ low, it is possible for the tone decoder/receiver to modify signals arriving at the master repeater during a particular time slot. By making BLOCK high at the start of a time slot, the tone decoder/receiver prevents the master repeater from forwarding to the communication receive line 22 the incoming signal which arrives on the communication send line 20 in that time slot. By making SGATE high, the tone decoder/receiver enables its send circuitry and provides the master repeater with a replacement signal which is forwarded (by the master repeater) in place of the incoming signal. With $\overline{\text{FREE}}$ high and $\overline{\text{MOD}}$ low, generation of SGATE and BLOCK is controlled by CTL and OUT as described below. With $\overline{\text{FREE}}$ high and $\overline{\text{MOD}}$ high, SGATE and BLOCK remain low and modification of incoming signals (in the master repeater) does not occur.

With $\overline{\text{FREE}}$ high, $\overline{\text{MOD}}$ low, and CTL high, SGATE and BLOCK go high at the same time as RGATE. With $\overline{\text{FREE}}$ high, $\overline{\text{MOD}}$ low, and CTL low, SGATE remains low. In this condition, BLOCK goes high at the same time as RGATE if OUT is high and remains low if OUT is low.

Figure 29:
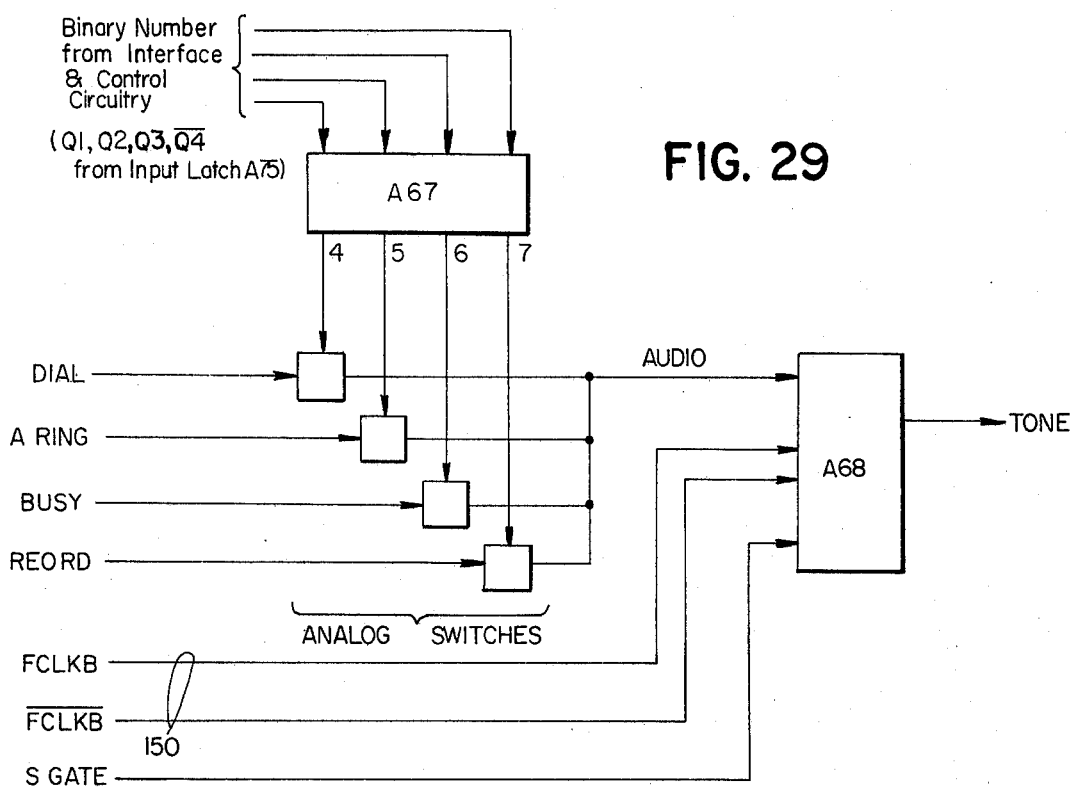

The selection circuitry 166 and the send circuitry 168 of FIG. 27 are shown in FIG. 29. Turning to this figure, if SGATE is high at the end of the balanced clock pulse on the buffered receive clock line 150, TONE goes high at that time. At the same time, a rising ramp is initiated in the sender A68. When, subsequently the ramp voltage equals the audio input voltage to the sender, TONE goes low again. TONE is then a positive pulse which appears in a time slot if SGATE is high at the start of that time slot (and TONE does not appear if SGATE is low at the start of the time slot). When TONE appears, it is width modulated by the audio input to the sender.

The audio input to the sender A68 is controlled by the binary number presented to a tone selection decoder A67 selectively controlling the illustrated four associated analog switches each supplied with different one of four supervisory tones from the tone generator 64. An input of 4, 5, 6 or 7 to the decoder A67 selects one of the four supervisory tones. Any other binary input (0 through 3, or 8 through 15) selects no tone, leaving the sender A68 with a constant DC voltage at its audio input. TONE, if it appears, is then unmodulated.

Figure 30:
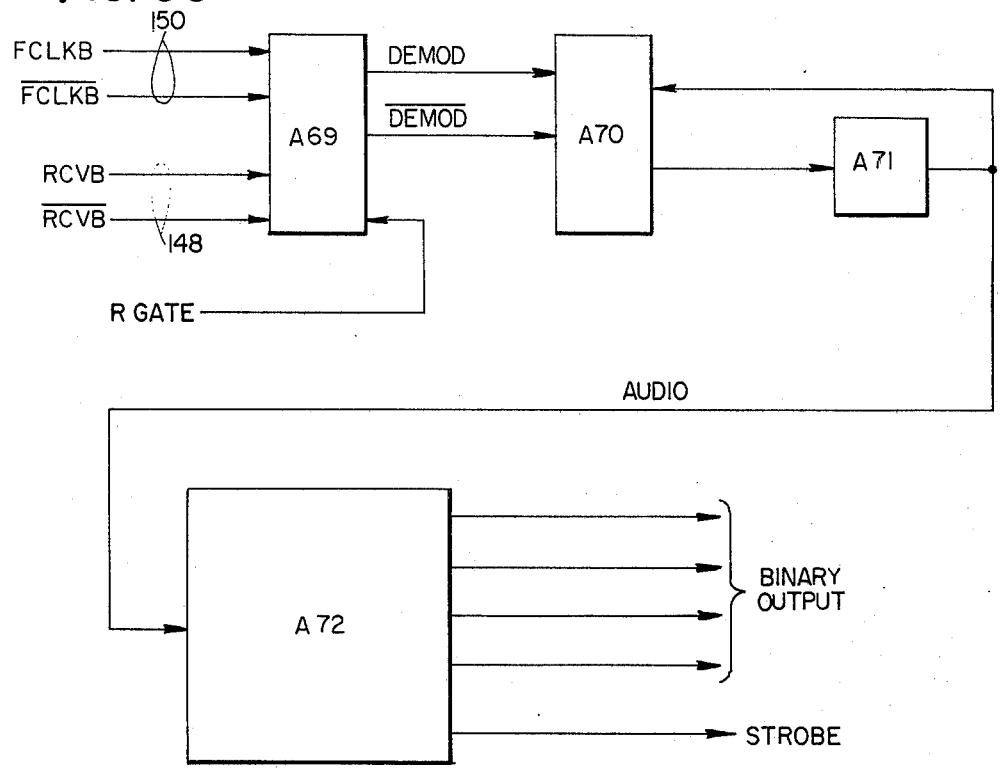

The receive circuitry 170 of FIG. 27 is shown in FIG. 30. Referring to FIG. 30, the components of the receive circuitry include a receiver A69, a demodulator A70, a filter A71 and a tone receiver A72. If RGATE is high at the end of the balanced clock pulse on the buffered receive clock line 150 a ramp is initiated at that time and terminated at the end of the balanced signal pulse on the buffered communication line 148. In the absence of a signal pulse on the line 148, the ramp is not initiated. A balanced version of the ramp voltage appears as DEMOD and $\overline{\text{DEMOD}}$, and is passed to the demodulator A70.

The demodulator A70 buffers and conditions its input signal, adjusts its output level, and delivers a single-ended version to the filter A71. The output of the filter, which is fed to the tone receiver A72, is the audio signal which is carried, as width modulation, by the signal in the selected time slot on the buffered communication receive line 148. A portion of the audio output of the filter A71 is returned to the demodulator A70 for the purpose of level adjustment.

When a valid tone pair is detected by the tone receiver A72, STROBE goes low and an identifying number appears on its binary output lines. Dial entries 1 through 9 are identified by binary numbers 1 through 9. Dial entries $\phi$, *, and # are identified by binary 10, 15 and zero. When the valid tone pair is no longer present, STROBE goes high again. The binary outputs remain unchanged until a new valid tone pair is detected, at which time new outputs are set up and STROBE again goes low.

Figure 31:
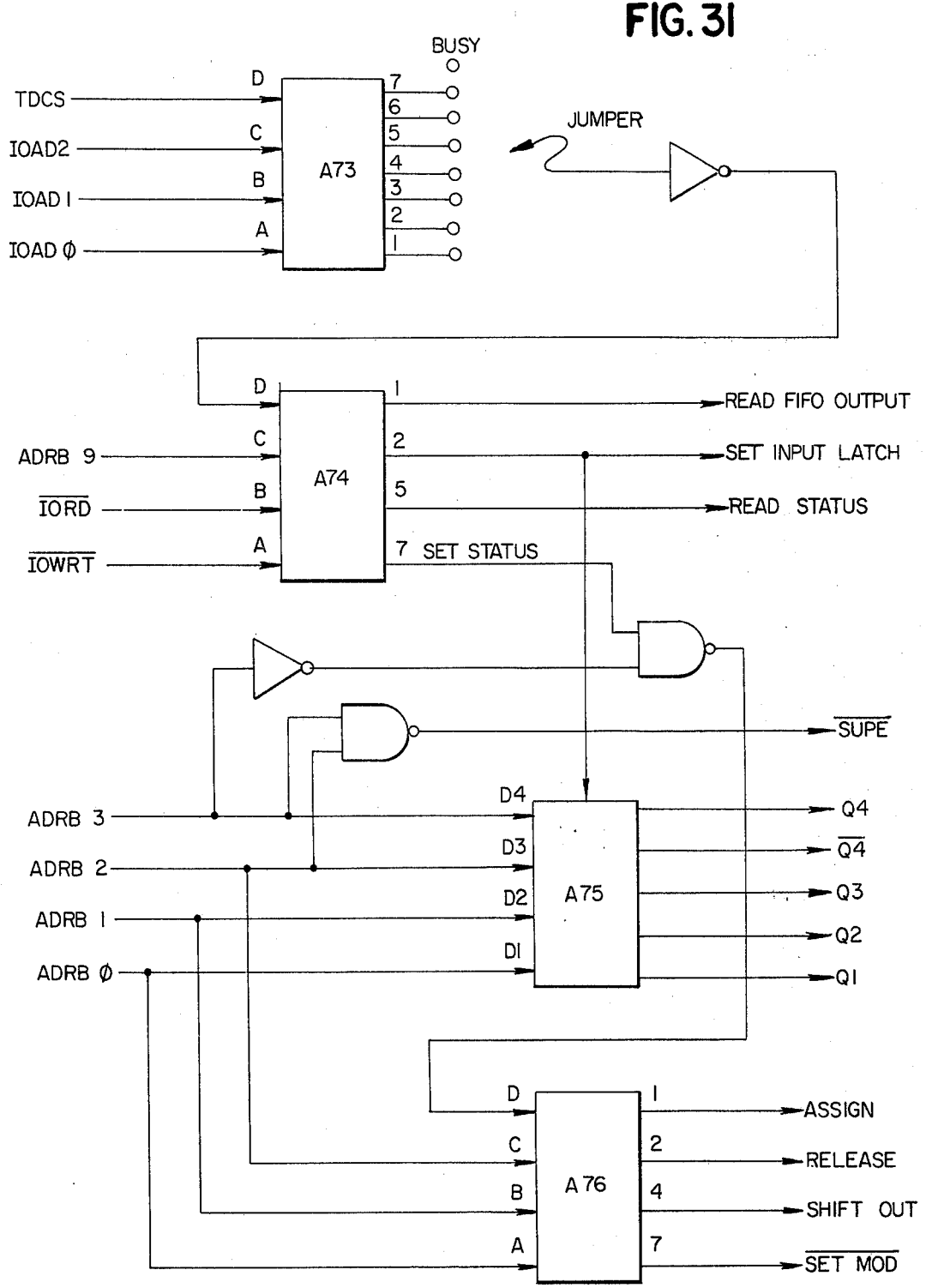

A portion of the interface and control circuitry 172 of FIG. 27 is shown in FIG. 31 to which attention is now directed. Components shown in this figure include an address decoder A73, a command decoder A74, an input latch A75 and a status decoder A76. The tone decoder/receiver may be given any allowed address (1 through 7) by connecting the illustrated jumper to the appropriate output of the address decoder A73. It may also be marked busy by an appropriate jumper connection. The effect of this connection is discussed later.

With $\overline{\text{TDCS}}$ low and the proper address on IOADR$\phi$, IOADR1, and IOADR2, the command decoder A74 is enabled. Appropriate levels on ADRB9, $\overline{\text{IORD}}$ and $\overline{\text{IOWRT}}$ are then decoded to develop four commands: READ FIFO, OUTPUT, SET INPUT LATCH, READ STATUS and SET STATUS. The command SET INPUT LATCH causes the clocked input latch A75 to read and hold the four bits which appear on ADRB$\phi$ through ADRB3. With ADRB3 high, the command SET STATUS has no effect. With ADRB3 low, the command SET STATUS enables the status decoder A76, which then decodes the levels on ADRB$\phi$, ADRB1 and ADRB2 to develop the commands ASSIGN, RELEASE, SHIFT OUT and SET $\overline{\text{MOD}}$.

Figure 32:
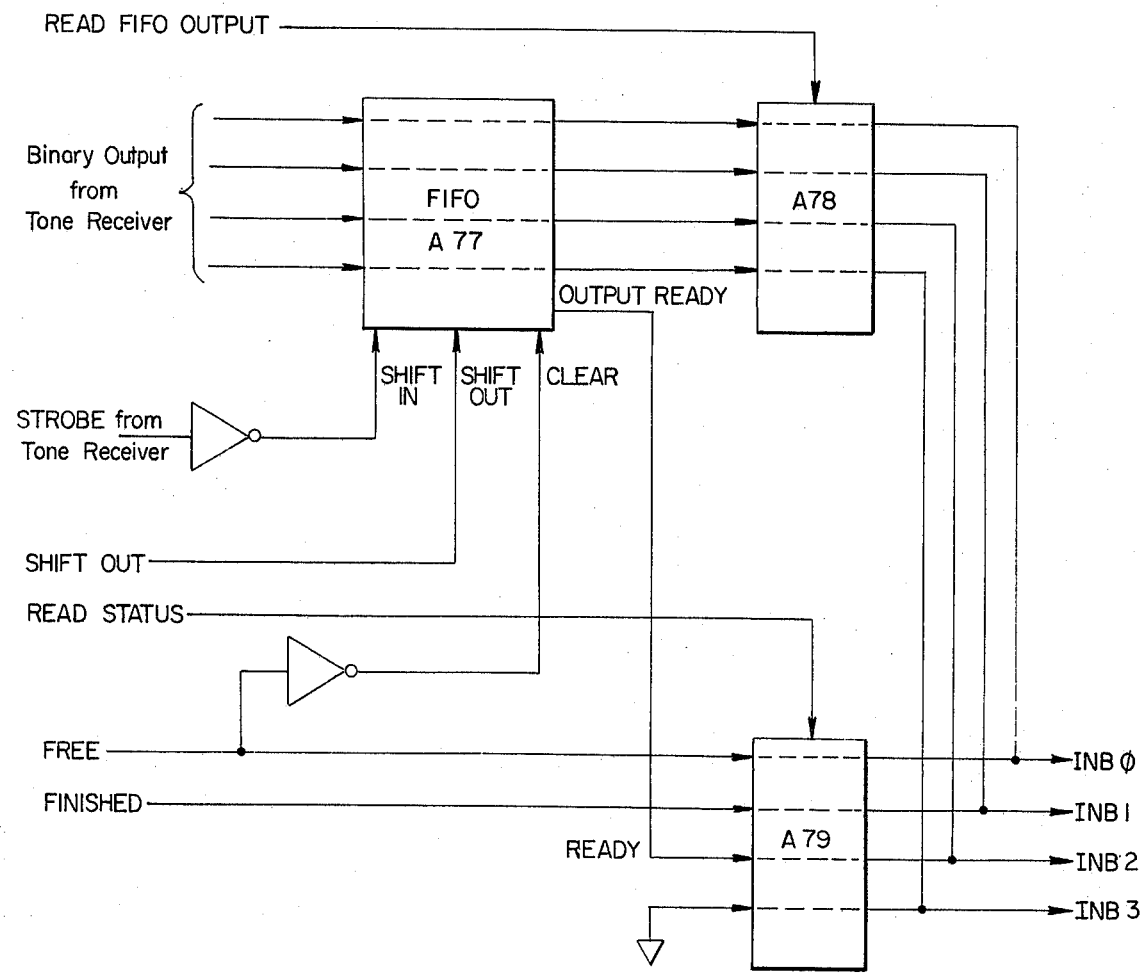

Another portion of the interface and control circuitry 172 of FIG. 27 is shown in FIG. 32. Referring to FIG. 32, the major components there shown are a FIFO store A77, and two tri-state buffers A78 and A79.

While FREE is high, the FIFO store A77 is cleared. It holds no data and OUTPUT READY is low. When the tone decoder/receiver is assigned, FREE goes low and the FIFO store A77 is enabled. A valid tone pair at the input of the tone receiver makes STROBE low and delivers a four-bit tone identifier to the data input of the FIFO store A77. When the valid tone pair disappears, STROBE goes high and the four-bit tone identifier is shifted into the FIFO store. OUTPUT READY goes high, and the tone identifier appears at the data output of the FIFO store.

The presence of data in the FIFO store A77 may be determined by setting up a READ STATUS command. OUTPUT READY (from the FIFO store) then appears on INB2. If this is high, a READ FIFO OUTPUT command puts the FIFO store output data on INB$\phi$ through INB3. After the FIFO store output has been read, a SHIFT OUT command brings new data (if there are any) to the output of the FIFO store, or makes OUTPUT READY go low if there are no new data. OUTPUT READY can then be read, and if it is high, the FIFO store output can be read again. The process can be repeated until the FIFO store is empty.

With the above background description, operation of a tone decoder/receiver, except for out-pulsing, can be described as follows. An address is selected, by the processor 58, and a READ STATUS command is issued. If the addressed tone decoder/receiver is unassigned, FREE is high. If it is assigned, FREE is low. If it is marked busy, or if it is not installed, there is no response to the command, but (because of a pull down resistor on INB$\phi$) the processor sees FREE low. In an unassigned tone decoder/receiver, the FIFO store A77 is held empty, and BLOCK, SGATE, RGATE are all low. When the unit is assigned, $\overline{\text{FREE}}$ and $\overline{\text{MOD}}$ go low and CTL goes high. The FIFO store is enabled. RUN remains low, and BLOCK, SGATE, RGATE are all low. Because RGATE remains low, no signal is presented to the tone receiver and no data are entered in the FIFO store.

When MARK appears, RUN goes high. BLOCK, SGATE, RGATE now go high once during each commutation frame. Modulation (by selected supervisory tone) of the TONE output, or no modulation, may be controlled by a SET INPUT LATCH command. Note that the inputs to the tone selection decoder (see FIG. 29) are $Q_1$, $Q_2$, $Q_3$ and $\overline{Q_4}$ (where $Q_1$, $Q_2$, $Q_3$, $Q_4$ are the four bits held by the input latch A75). Accordingly, $\overline{\text{SUPE}}$ is always low when a tone selection number is being entered in the input latch.

A RELEASE command sets $\overline{\text{FREE}}$ low and returns the tone decoder/receiver to unassigned status. When a tone decoder/receiver is strapped "busy", the unit will not accept any commands from the processor.

Figure 33:
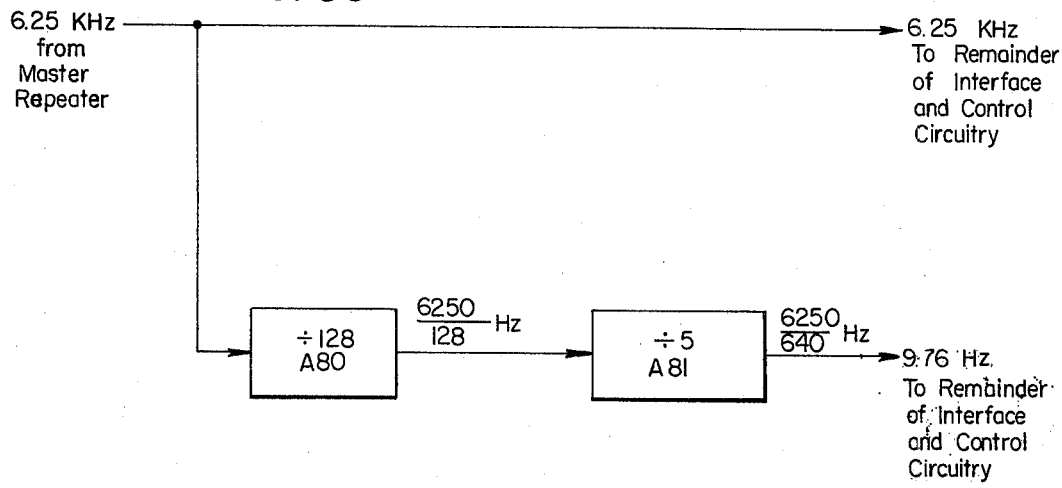

Another portion of the interface and control circuitry 172 of FIG. 7 is shown in FIG. 33. Referring to FIG. 33, the illustrated circuitry provides the illustrated timing signals to the outpulsing circuitry (included in the interface and control circuitry) and consists of a divide by 128 circuit A80 and a divide by 5 circuit A81.

Figure 34:
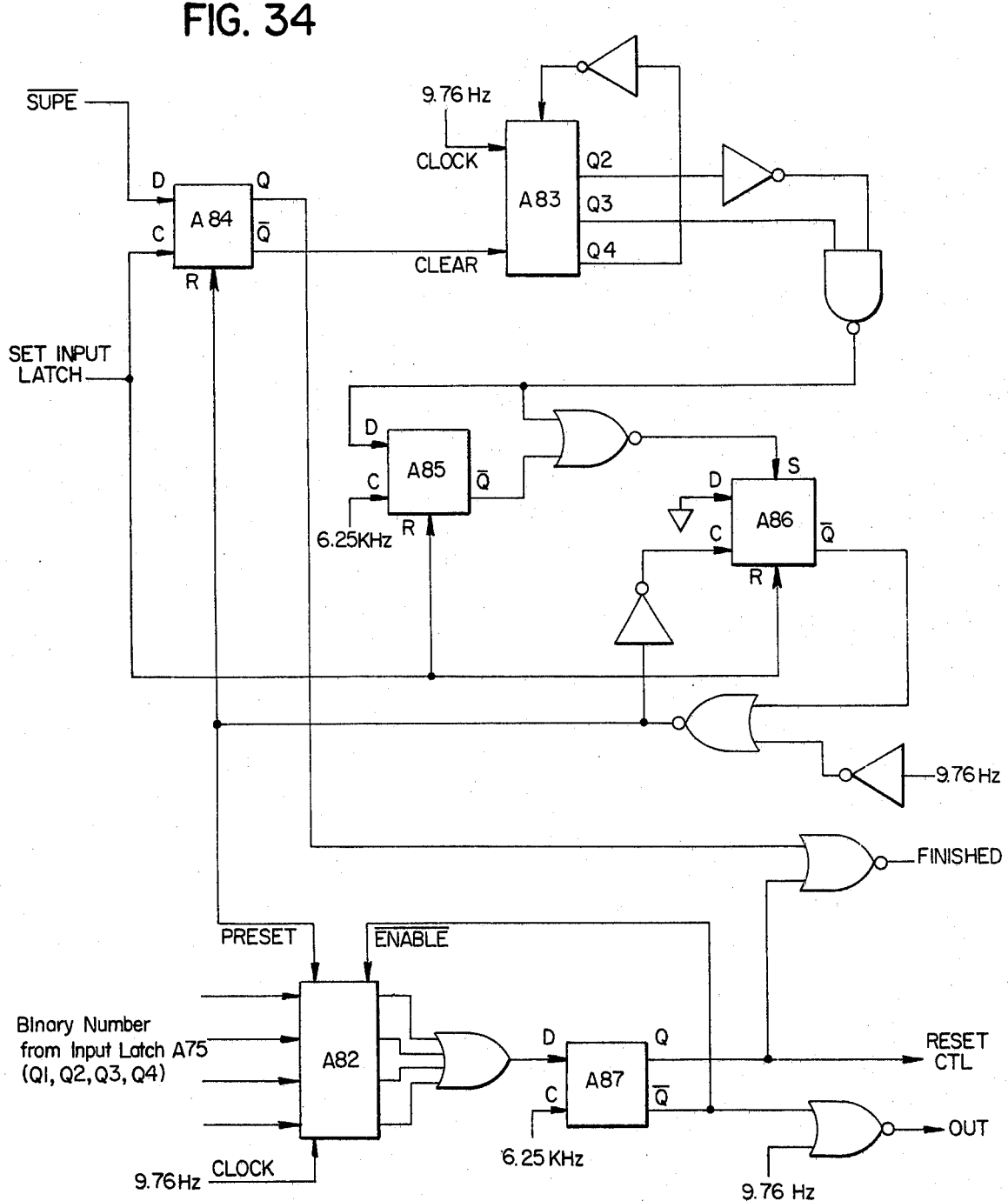

The remainder of the interface and control circuitry 172 of FIG. 7 is shown in FIG. 34, and all of which is involved with outpulsing. Turning to FIG. 34, the components there shown include a presettable down counter A82, a delay shift register A83, a time flip-flop A84, a wait flip-flop A85, a start flip-flop A86 and a $\overline{\text{DONE}}$ flip-flop A87.

The presettable down counter A82 accepts a four-bit input when PRESET is high (whether or not $\overline{\text{ENABLE}}$ is high). With both PRESET and $\overline{\text{ENABLE}}$ low, the counter counts down, being clocked by the 9.76 Hz signal. When PRESET goes high, the presettable down counter A82 accepts a four bit input. If all four bits are low, the data input to the $\overline{\text{DONE}}$ flip-flop A87 is low and it is reset by every positive-going transition of the 6.25 KHz signal. $\overline{\text{ENABLE}}$ remains high and the counter does not count. When PRESET returns to low, the counter holds zero and the flip-flop A87 remains reset. If, however, at least one of the four input bits is high, the data input to the $\overline{\text{DONE}}$ flip-flop A87 is high and that flip-flop is set by every positive-going transition of the 6.25 KHz signal so that $\overline{\text{ENABLE}}$ goes low. In this case, when PRESET returns to low the counter starts to count down, being clocked by the 9.76 Hz signal. When the counter reaches zero, the data input to the $\overline{\text{DONE}}$ flip-flop A87 goes low, the flip-flop is reset by the 6.25 KHz signal, $\overline{\text{ENABLE}}$ goes high, and counting stops.

During a SET INPUT LATCH command which is meant to select a supervisory tone, SET INPUT LATCH goes high and $\overline{\text{SUPE}}$ goes low. The time flip-flop A84, the wait flip-flop A85 and the start flip-flop A86 are all reset. The $\overline{Q}$ output of the time flip-flop A84 goes high and clears the shift register A83. The data input to the wait flip-flop A85 is high, and that flip-flop is set by the next positive-going transition of the 6.25 KHz signal. The start flip-flop A86, however, remains reset and the preset input to the down counter A82 remains low. Accordingly, this operation has no effect on either the down counter A82 or the $\overline{\text{DONE}}$ flip-flop A87.

During a SET INPUT LATCH command which is not meant to select a supervisory tone, SET INPUT LATCH goes high and $\overline{\text{SUPE}}$ goes high. The time flip-flop A84 is set, the wait flip-flop A85 and the start flip-flop A86 are reset. The data input to the wait flip-flop A85 is high, and that flip-flop is set by the next positive-going transition of the 9.76 Hz signal. At the sixth advance of the shift register A83, the data input to the wait flip-flop A85 goes low, which provides a forced set signal to the start flip-flop A86. The next positive-going transition of the 6.25 KHz signal resets the wait flip-flop A85 and terminates the forced set signal to the start flip-flop A86.

The start flip-flop A86 is reset shortly after the start of a positive pulse of the 9.76 Hz signal. For the remainder of that pulse the PRESET signal to the down counter A82 is high and a forced reset signal is supplied to the time flip-flop A84. Resetting that flip-flop clears the shift register A83, which makes the data input to the wait flip-flop A85 high. The wait flip-flop is then set by the 6.25 KHz signal, but no forced set signal is delivered to the start flip-flop A86. With a non-zero number in the down counter A82, the $\overline{\text{DONE}}$ flip-flop A87 is set by the 6.25 KHz signal. At the end of the positive pulse (of the 9.76 Hz signal), the start flip-flop A86 is reset so that everything except the down counter A82 and the $\overline{\text{DONE}}$ flip-flop A87 has been returned to precommand status. Subsequent pulses of the 9.76 Hz signal clock the down counter to zero, after which the $\overline{\text{DONE}}$ flip-flop A87 is reset by the 6.25 KHz signal.

FINISHED goes low when the time flip-flop A84 is set. The $\overline{\text{DONE}}$ flip-flop A87 is set when the time flip-flop A84 is reset, and FINISHED remains high (except for a brief transient) during that transition. FINISHED goes low again when the $\overline{\text{DONE}}$ flip-flop A87 is reset.

When the $\overline{\text{DONE}}$ flip-flop A87 is set, CTL is reset. This inhibits generation of SGATE (as explained earlier) and allows BLOCK to be controlled by OUT. With the $\overline{\text{DONE}}$ flip-flop A87 set, OUT is high when the 9.76 Hz signal is low. With the $\overline{\text{DONE}}$ flip-flop reset, OUT remains low.

A SET INPUT LATCH command which puts, say, a binary six in the down counter A82 makes FINISHED go low. After a delay of approximately 0.6 seconds, OUT goes high for the first of a set of six pulses. Each pulse lasts approximately 0.06 seconds, the interval between pulses is approximately 0.04 seconds. FINISHED goes high (again) at the end of the last pulse. The delay (of 0.6 seconds) allows a new number to be entered in the down counter as soon as FINISHED goes high (outpulsing of the new number will not start until after the delay).

SUPERVISORY TONE GENERATOR

FIGS. 35 to 44

Figure 35:
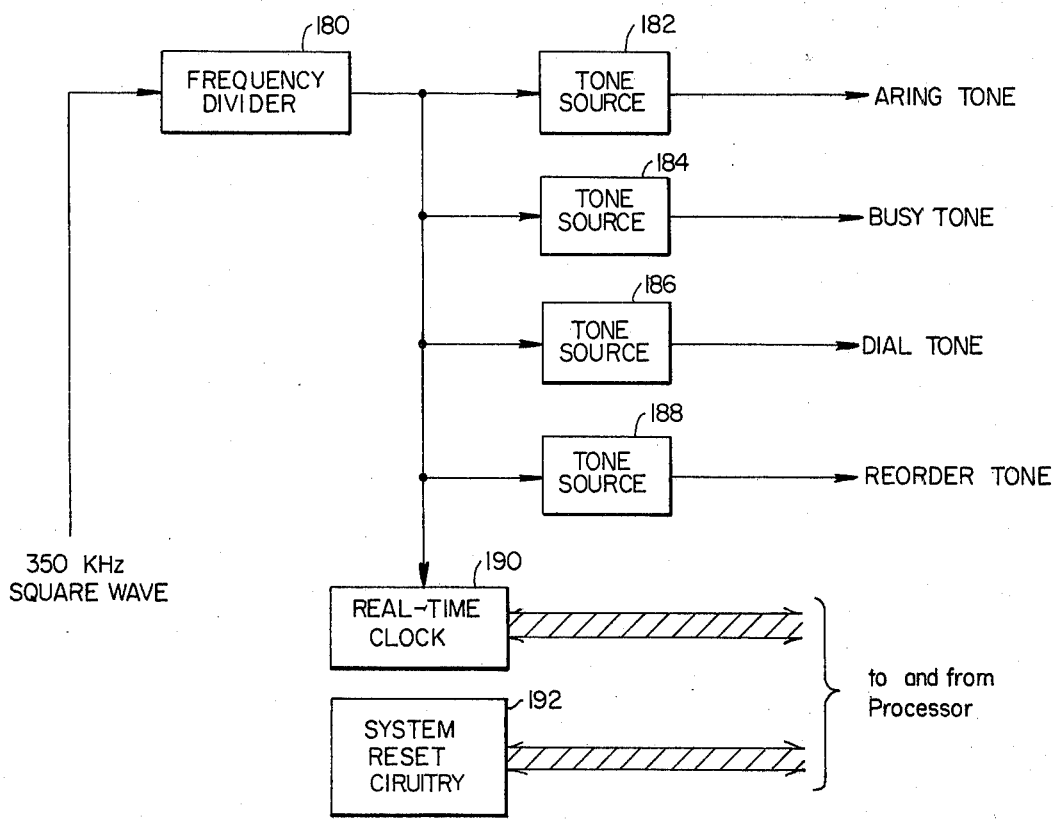
FIG. 35 is a block diagram showing in more detail the construction of the supervisory tone generator of FIG. 4.

The supervisory tone generator 64 accepts a 350 KHz square wave signal from the master repeater 56 and uses this to generate the four required supervisory tones. These tones are bussed to the tone decoder/receivers 62, 62. The supervisory tone generator also contains a real time clock, based on the same 350 KHz signal, whose output may be accessed by the processor 58. Still further, the supervisory tone generator contains circuitry for both manual and automatic "system reset", which interrupts the processor and returns it to the starting point of its operating program. A functional block diagram of the supervisory tone generator is shown in FIG. 35. Its basic units, as there shown, are a frequency divider 180, four tone sources 182, 184, 186 and 188, a real time clock 190 and a system reset circuit 192.

Figure 36:
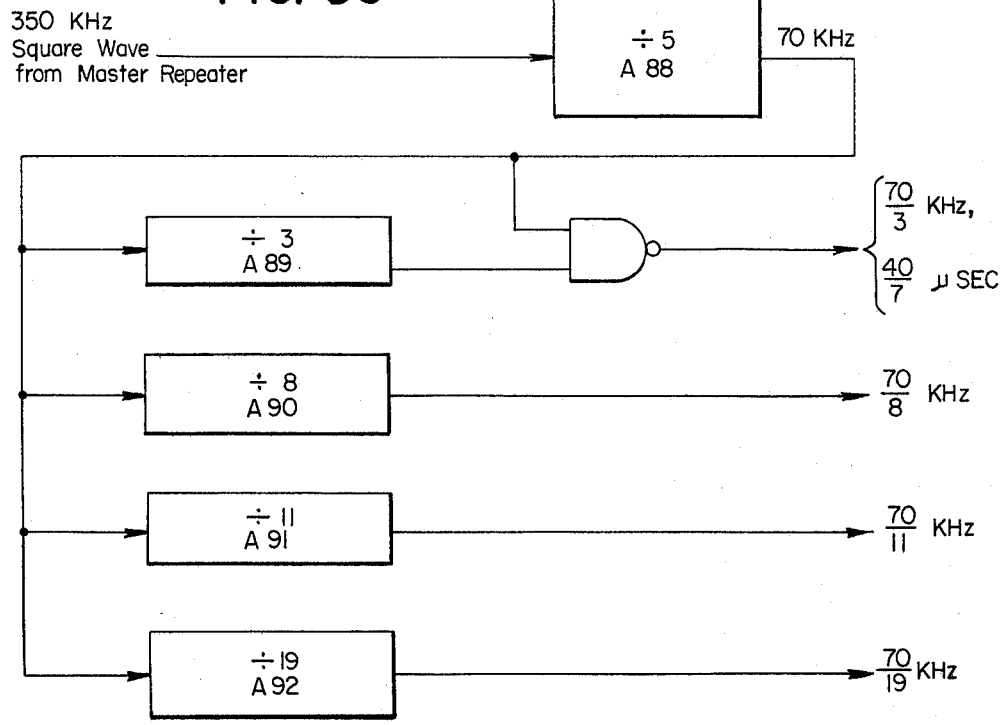

Reference is now made to FIG. 36 which shows a portion of the frequency divider 180 of FIG. 35. The 350 KHz square wave feeds a divide-by-five circuit A88 whose output is a 70 KHz square wave with a duty cycle ratio of 40%. This signal may, alternatively, be viewed as a train of pulses with a repetition rate of 70 KHz and with a pulse width of 40/7 microseconds. The 70 KHz signal feeds a divide-by-three circuit A89 whose output is ANDed with the 70 KHz signal. The result is a train of pulses with a repetition rate of 70/3 KHz and a pulse width of 40/7 microseconds. The 70 KHz signal also feeds divide-by-eight, divide-by-eleven, and divide-by-nineteen circuits A90, A91 and A92. The outputs of these dividers are pulse trains with repetition rates of 70/8, 70/11 and 70/19 KHz.

Figure 37:
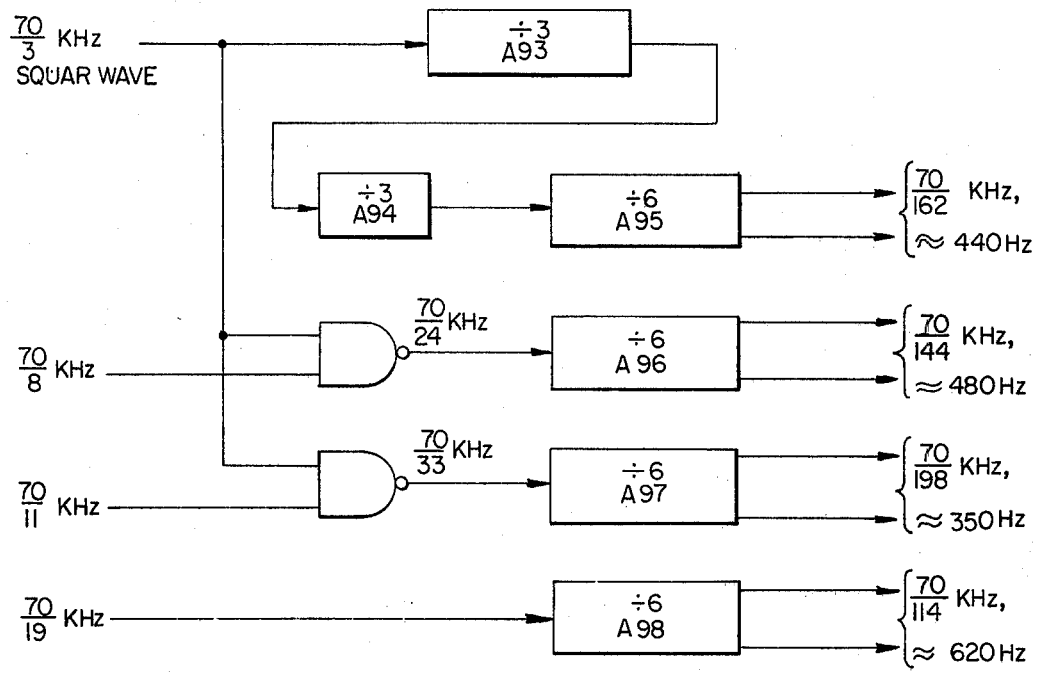

Another portion of the frequency divider 180 is shown in FIG. 37. Turning to this figure, A93 and A94 are divide-by-three circuits and A95, A96, A97 and A98 are divide-by-six circuits. Each of the four divide-by-six circuits A95, A96, A97 and A98 delivers two outputs. Each output is a square wave with a duty cycle ratio of 50%, and the two outputs from each divide-by-six circuit have a phase difference of 60°.

Figure 38:
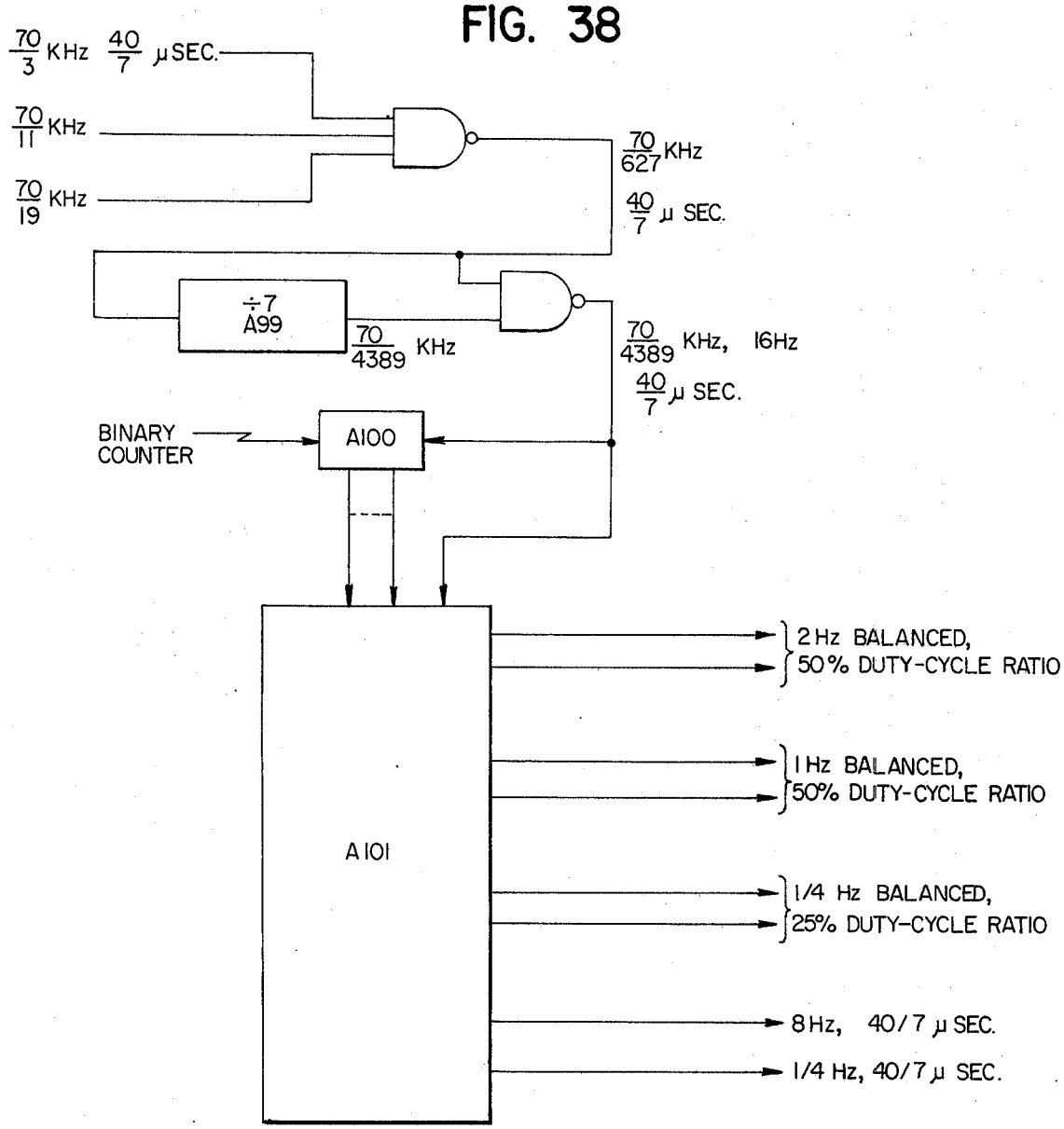

The remaining portion of the frequency divider 180 is shown in FIG. 38. Components shown in this figure include a divide-by-seven circuit A99, a binary counter A100 and a combining circuitry A101.

The dividing circuit A99 of FIG. 38 produces a train of pulses at a repetition rate of 16 Hz with a pulse width of 40/7 microseconds. These pulses are fed to the binary counter A100, whose six outputs are square waves (with duty cycle ratios of 50%) at 8, 4, 2, 1, ½ and ¼ Hz. The 16 Hz signal and the outputs of the binary counter A100 are fed to the combining circuitry A101, which produces the illustrated outputs.

Figure 39:
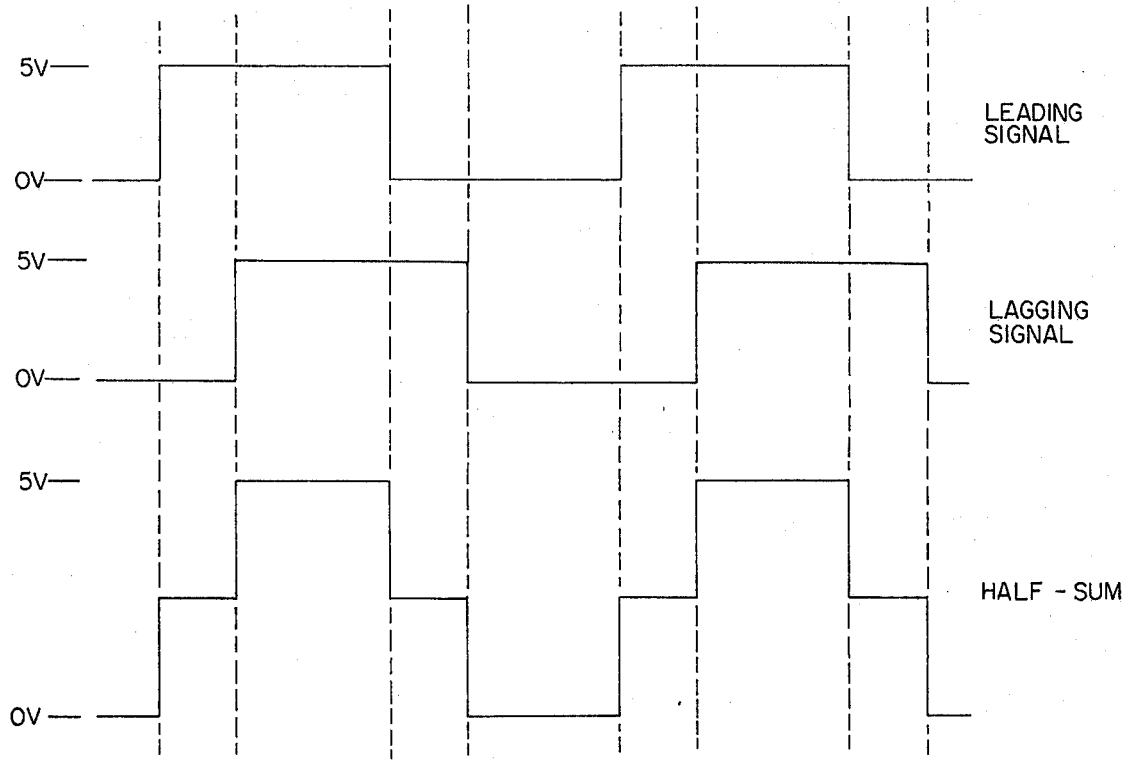
FIG. 39 is a diagram illustrating the way in which certain signals are combined in the supervisory tone generator of FIG. 35.

The four tone sources 182, 184, 186 and 188 of FIG. 35 are similar. In each case four square wave signals (two at each of two different frequencies) are summed at the input of an active low pass filter. The output of the filter is the desired supervisory tone. At each frequency, the two signals have duty cycle ratios of 50%. They differ in phase by 60%. The result of the summation is a better approximation of a sine wave than a single square wave signal, which eases the requirements on the filter. The scheme is shown in FIG. 39.

Figure 40:
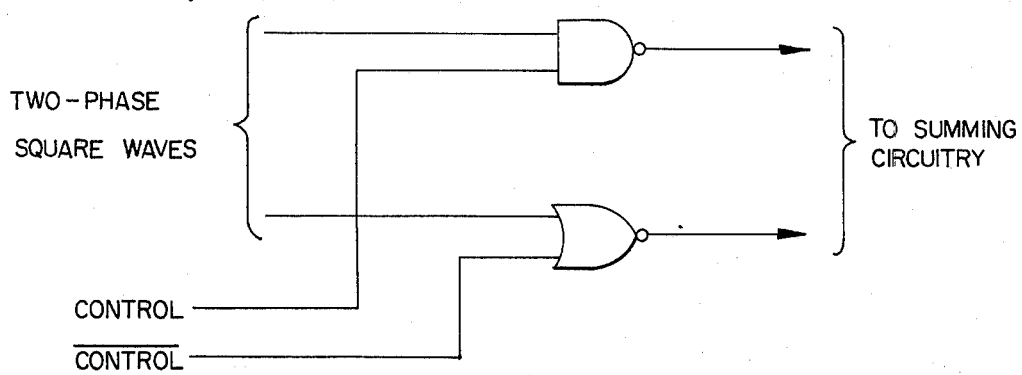

Except in the case of the dial tone source 186, the inputs are switched on and off by the circuit shown in FIG. 40. When CONTROL is high and $\overline{\text{CONTROL}}$ is low, the illustrated gates act as inverters and the switch in "on". When CONTROL is low and $\overline{\text{CONTROL}}$ is high, one gate output is latched at 5 volts, the other at zero, and the switch if "off". In the "off" mode, the half sum of the gate outputs is 2.5 volts, which is the same as the average value of the approximated sine wave (the half sum of the input signals) in the "on" mode.

The four tone sources 182, 184, 186 and 188 are shown, together with their respective inputs and outputs, in FIG. 41.

The real time clock 190 of FIG. 35 is shown in FIG. 42. It consists of two latches A102 and A103, each of which is set periodically by signals from the frequency divider. When a latch A102 or A103 is "set", its output goes high and remains high until the latch is "reset". When a latch A102 or A103 is "reset", its output goes low and remains low until the latch is "set". The "fast marker" latch A102 is set eight times a second. The "slow marker" latch A103 is set every 4 seconds.

The processor may, at any time, reset both latches A102 and A103 by making the WREAL bus high. When that bus is low it has no effect on the latches. The processor may also, at any time, read the outputs of the latches A102 and A103 by making the RREAL bus high. When that bus is low, the latches are disconnected from the INB$\phi$ and INB2 busses. When the system is operating, the processor reads the latch outputs at intervals of several milliseconds and resets the latches if either latch output is high. It, therefore, observes a high output from the fast marker latch A102 eight times every second, and a high output from the slow marker latch A103 once every four seconds.

The system reset circuitry 192 of FIG. 35 consists of two parts, a control section and an output section. The control section is shown in more detail in FIG. 43. Its purpose is to initialize the system when power is first turned on or when, for some reason, the processor fails to execute the operating program in a proper fashion.

Figure 43:
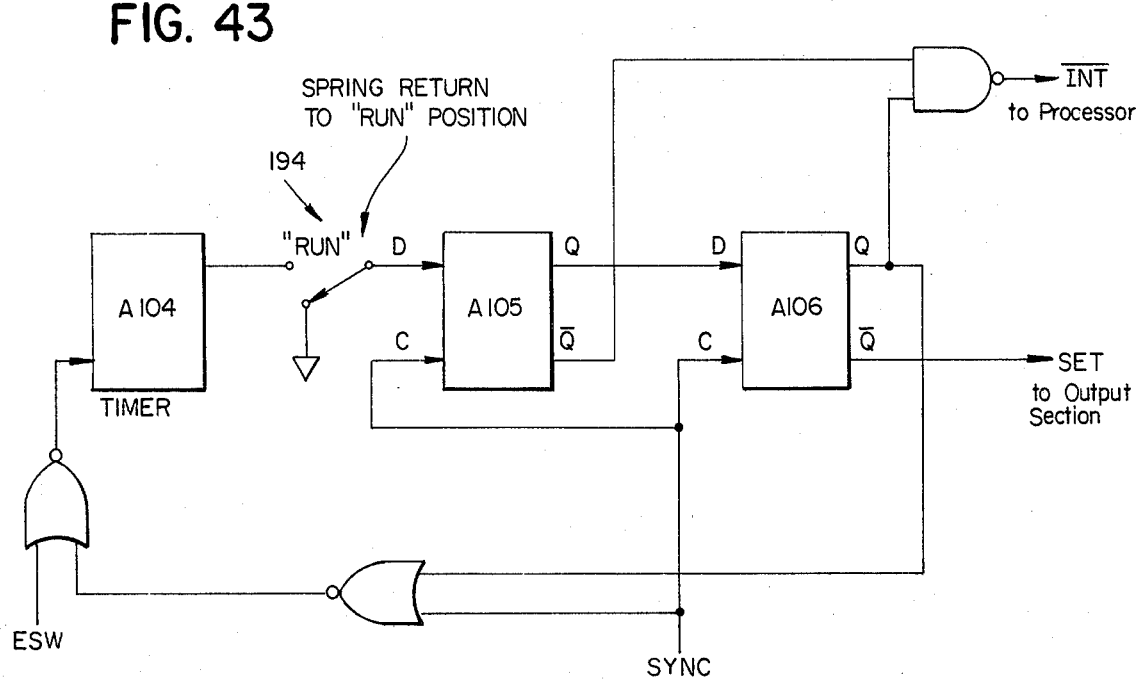

Referring to FIG. 43, the components of the system reset circuitry there shown include a timer A104, a flip-flop A105 and another flip-flop A106. SYNC is a 175 KHz square wave transmitted by the processor. ESW is a short positive pulse transmitted by the processor under control of the operating program. In normal operation, ESW appears approximately every fifth of a second. If the processor operates satisfactorily but, for some reason, fails to execute the operating program properly, ESW does not appear. In normal operation, the repeated appearance of ESW holds the timer A104 output high. Both flip-flops A105 and A106 are set, $\overline{\text{INT}}$ is high, and SET is low. If ESW fails to appear, or if the manual switch 194 is operated, the D input to the left-hand flip-flop A105 goes low. At the first SYNC signal after this, $\overline{\text{INT}}$ goes low, which sends an interrupt signal to the processor. At the second SYNC pulse, $\overline{\text{INT}}$ returns to its normal high level, and SET GOES high. The third SYNC pulse is passed to the timer A104 as a trigger signal.

If the restart was initiated by the absence of ESW signals (for example in connection with powering up), the third SYNC pulse drives the timer A104 output high. In this case the next two SYNC pulses return the control section to its normal state. (If ESW does not reappear before the timer runs out, the cycle is repeated.) If the restart was initiated manually, the control section is returned to its normal state by the first two SYNC pulses after release of the switch 194.

Figure 44:
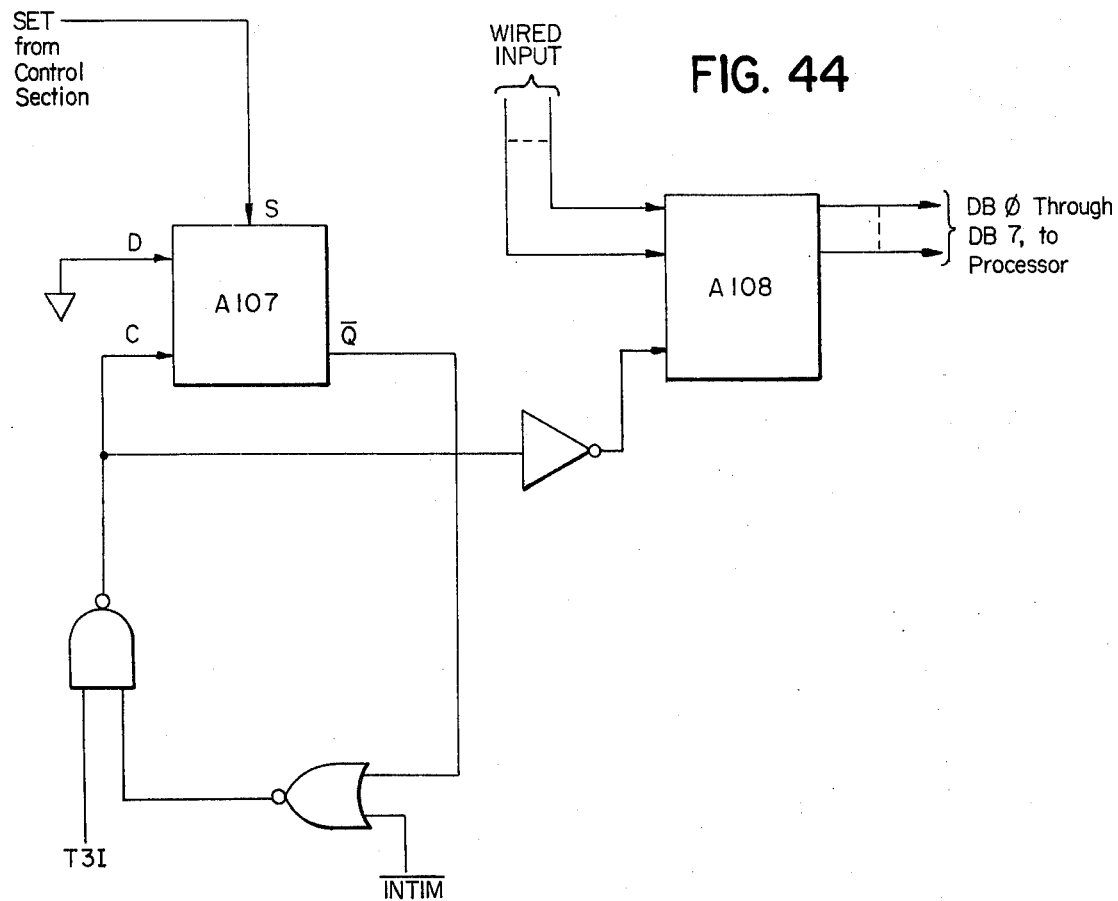

The output section of the system reset circuitry 192 of FIG. 35 is shown in more detail in FIG. 44. Turning to this figure, A107 is a flip-flop and A108 is a tri-state buffer. When the control section of the system reset circuitry goes through a reset cycle, it issues an interrupt signal to the processor and a SET signal to the output section (of the system reset circuitry), The interrupt signal does not stop the processor. Instead, it orders the processor to accept an instruction from the data bus. Following receipt of the interrupt signal, the processor makes T3I high, acknowledging the interrupt signal. The processor then makes $\overline{\text{INTIM}}$ low, indicating that it is ready to accept the instruction. At this time the tri-state buffer A108 is enabled, sending the appropriate instruction to the processor, and the flip-flop A107 is reset restoring the circuitry to its normal state.

PROCESSOR

FIGS. 45 to 52

The processor or CPU 58 is contained on a printed circuit board or card which includes an Intel #8008 microprocessor (component A109), which controls operation of the communication system, and all of the interface circuitry required to allow the processor to exchange information with the remainder of the system, including its associated memory 60. The microprocessor A109 and its busses are shown in FIG. 45. The functions of the various busses are described in the following brief discussion of the processor operation.

Execution of an instruction involves one, two or three machine cycles. There are four different types of machine cycles: instruction fetch, memory read, memory write and I/O command. As shown in FIG. 46, the first machine cycle of an instruction execution is always an instruction fetch cycle.

The processor is always in one of eight possible states: T1, T2, T3, T4, T5, T1I, wait or stopped. In a typical machine cycle, the processor moves through five states. In state T1, it outputs (on the data busses) a byte which is usually the eight least significant bits of a fourteen-bit address. In state T2, it outputs a second byte which is (usually) the six most significant bits of the address (on BD$\phi$ through DB5). At this time, DB6 and DB7 carry two control bits, CY$\phi$ and CY1. These bits indicate which of the four types of machine cycles is in process (00 for instruction fetch, 01 and 11 for memory read and memory write, 10 for I/O command). In state T3, the processor inputs or outputs one byte of data. States T4 and T5 are used for operation within the processor. State T5, or states T4 and T5 may be skipped if they are not required for a given machine cycle. If the READY bus is low, indicating that the external equipment involved in a data transfer is not ready to handle data, the processor moves from state T2 to the wait state. When the READY bus goes high, the processor moves to state T3 and resumes operation.

If, during an instruction fetch cycle, the processor (in state T3) inputs a HALT instruction, it goes from state T3 to the stopped state. It remains there until the INTERRUPT bus goes high, at which time it moves to state T1I (the INTERRUPT bus is then set low again). From this state, it moves to state T2, resuming normal operation.

The processor can be interrupted, without the use of a HALT instruction, by setting the INTERRUPT bus high. During the next instruction fetch cycle, the processor moves from state T3 to state T1I (at which time the INTERRUPT bus is set low again). The instruction fetch cycle is repeated with the processor outputting the earlier address during states T1I and T2. An alternative instruction may be entered during the T3 state by switching the data busses from the memory to another source of data. Subsequent operation of the processor is then controlled by the instruction which was "jammed in" following the interrupt. During each of the eight states, the processor outputs a "state code" on the three state busses S$\phi$, S1 and S2. The state codes are tabulated below:

| State | S0 | S1 | S2 | Decimal Equivalent |
|---|---|---|---|---|
| T1 | 0 | 1 | 0 | 2 |
| T1I | 0 | 1 | 1 | 6 |
| T2 | 0 | 0 | 1 | 4 |
| Wait | 0 | 0 | 0 | 0 |
| T3 | 1 | 0 | 0 | 1 |
| Stopped | 1 | 1 | 0 | 3 |
| T4 | 1 | 1 | 1 | 7 |
| T5 | 1 | 0 | 1 | 5 |

The processor generates a SYNC signal at one-half the clock frequency. Precise control of the timing of input and output signals is accomplished by using appropriate combinations of $\phi_1$, $\phi_2$, and SYNC for strobing and latching. An operating state lasts for one SYNC cycle, a non-operating state (wait or stopped) lasts for an integral number of SYNC cycles.

Figure 47:
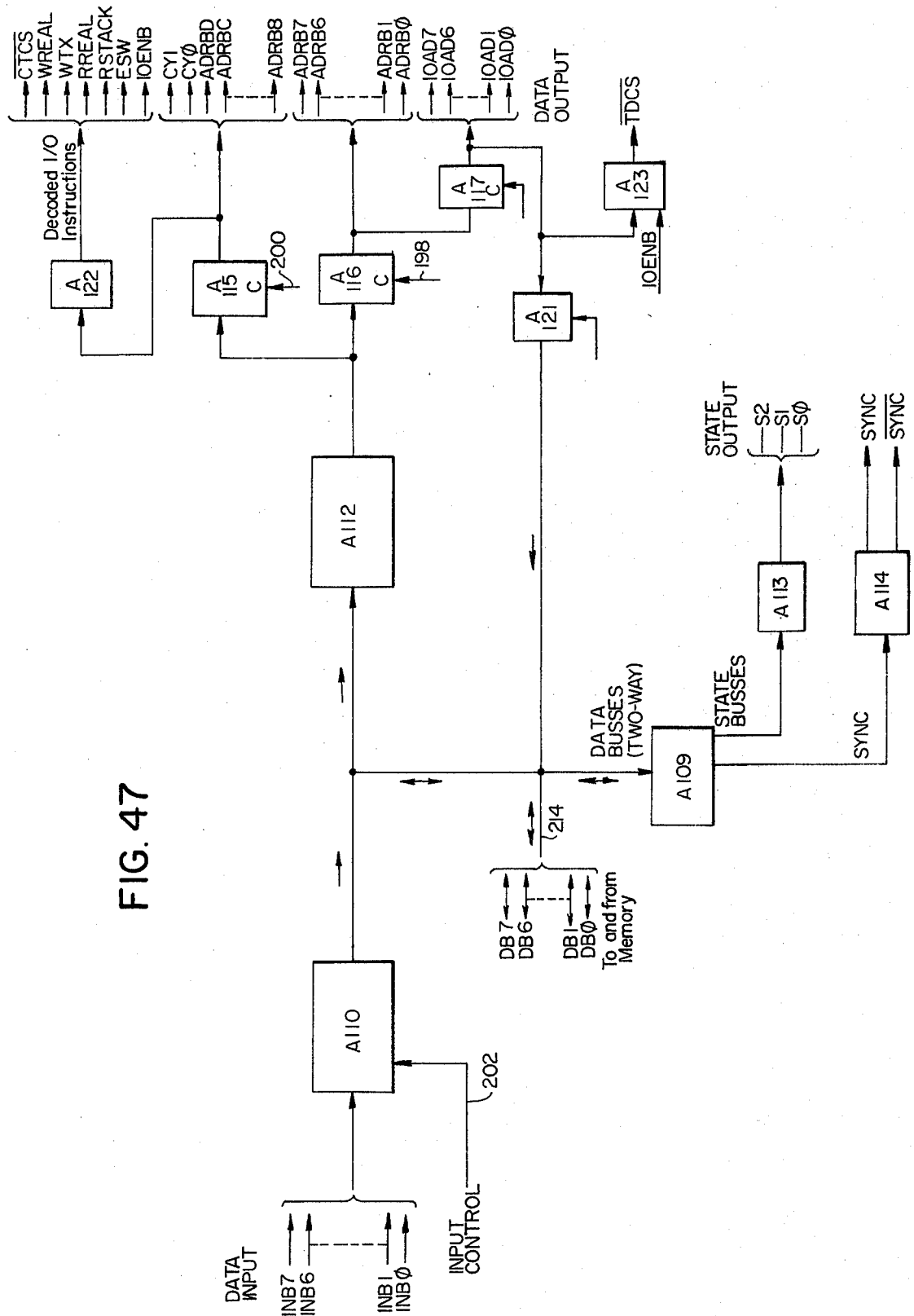
FIG. 47 is a block diagram showing in more detail a portion of the processor of FIG. 4.

The buffer circuitry which is directly connected to the processor is shown in FIG. 47. A110 is a tri-state input buffer and A112, A113 and A114 are output buffers. A115, A116 and A117 are latches. Buffered state code signals are sent to a decoder which outputs decoded state signals (a T1 line, for example, is normally high and goes low when the processor is in state T1).

Figure 48:
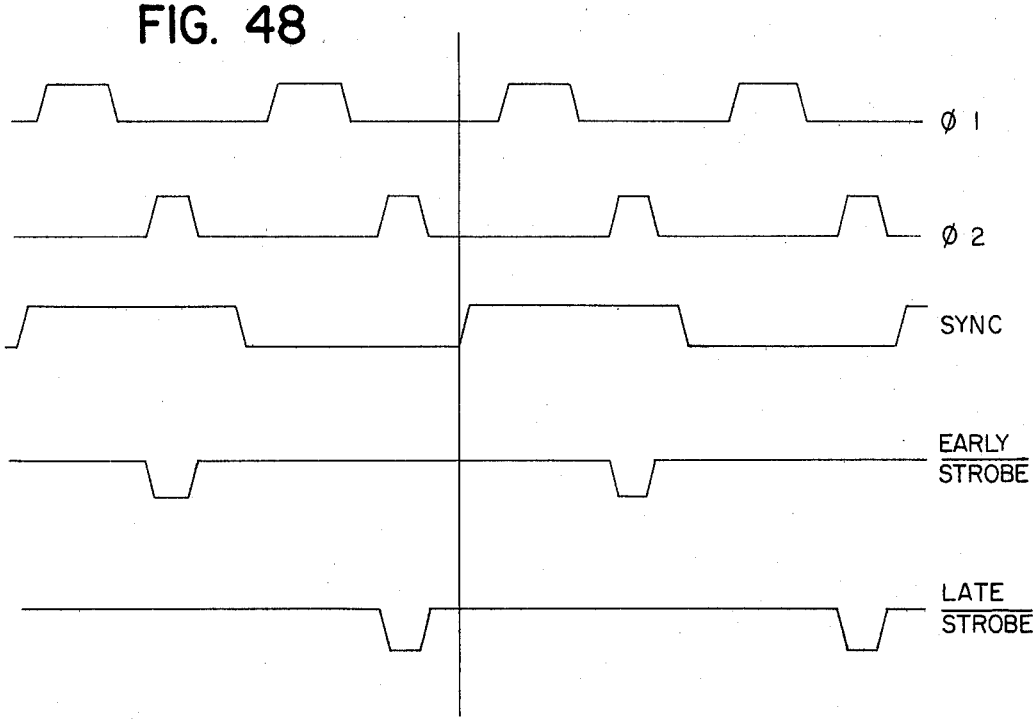
FIG. 48 is a diagram illustrating the phase relationship between certain signals used by the processor of FIG. 4.

Buffered SYNC and $\overline{\text{SYNC}}$ are combined with $\phi_2$ to generate EARLY $\overline{\text{STROBE}}$ and LATE $\overline{\text{STROBE}}$ signals. The time relation of these signals is shown in FIG. 48.

Figure 49:
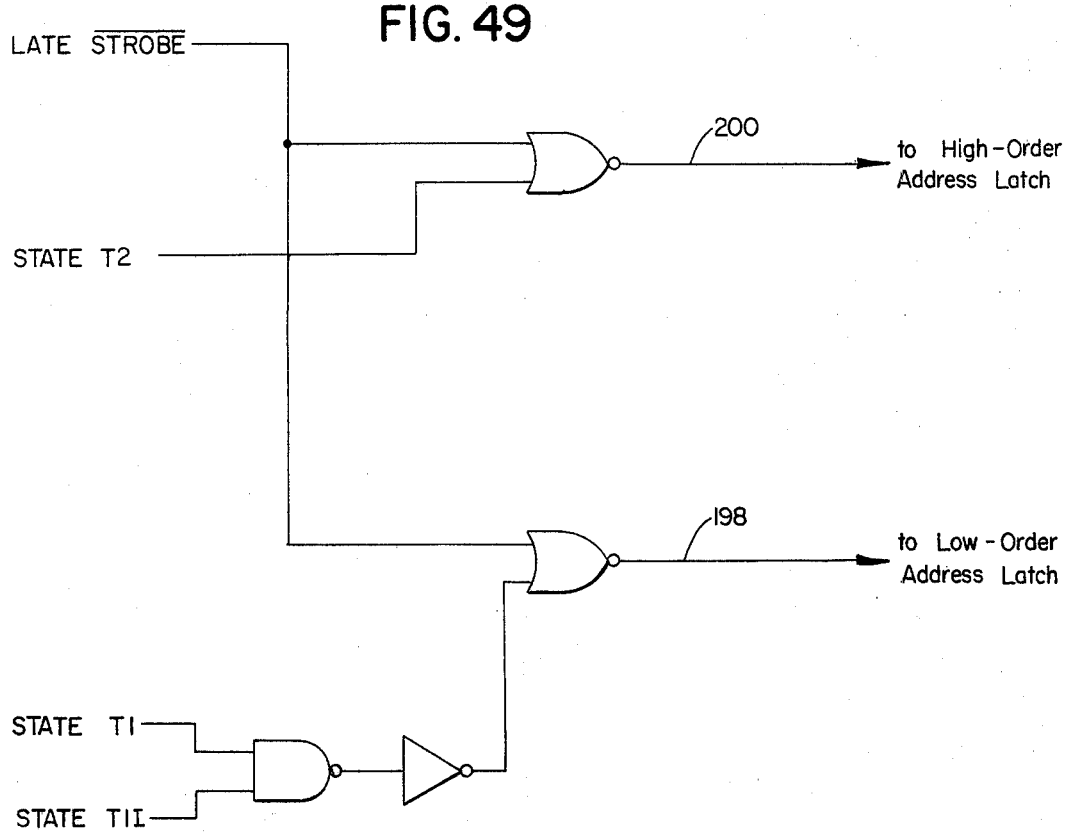
FIGS. 49 to 52 are block diagrams illustrating in more detail various other portions of the processor of FIG. 4.

During state T1 or T1I, information on the buffered data output busses, indicated at 196 in FIG. 47, is latched into a low order address latch A116 by LATE $\overline{\text{STROBE}}$. This latch feeds the low order address busses (ADRB$\phi$ through ADRB7) which run to the remainder of the system. During state T2, information on the buffered data output busses is latched (by LATE $\overline{\text{STROBE}}$) into the high order address latch A115 which feeds the high order address busses (ADRB8 through ADRBD) and the cycle code busses (CY$\phi$ and CY1). The logic circuitry involved in latching is shown in FIG. 49.

Memory operations (read or write during state T3) are controlled by three busses, $\overline{\text{WRTM}}$, $\overline{\text{INTIM}}$ and T3I. Memory output information is put on the unbuffered data busses (DB$\phi$ through DB7), by tri-state buffers in the memory, when CY$\phi$, $\overline{\text{INTIM}}$ and T3I are all low. Writing is accomplished by setting $\overline{\text{WRTM}}$ low.

Figure 50:
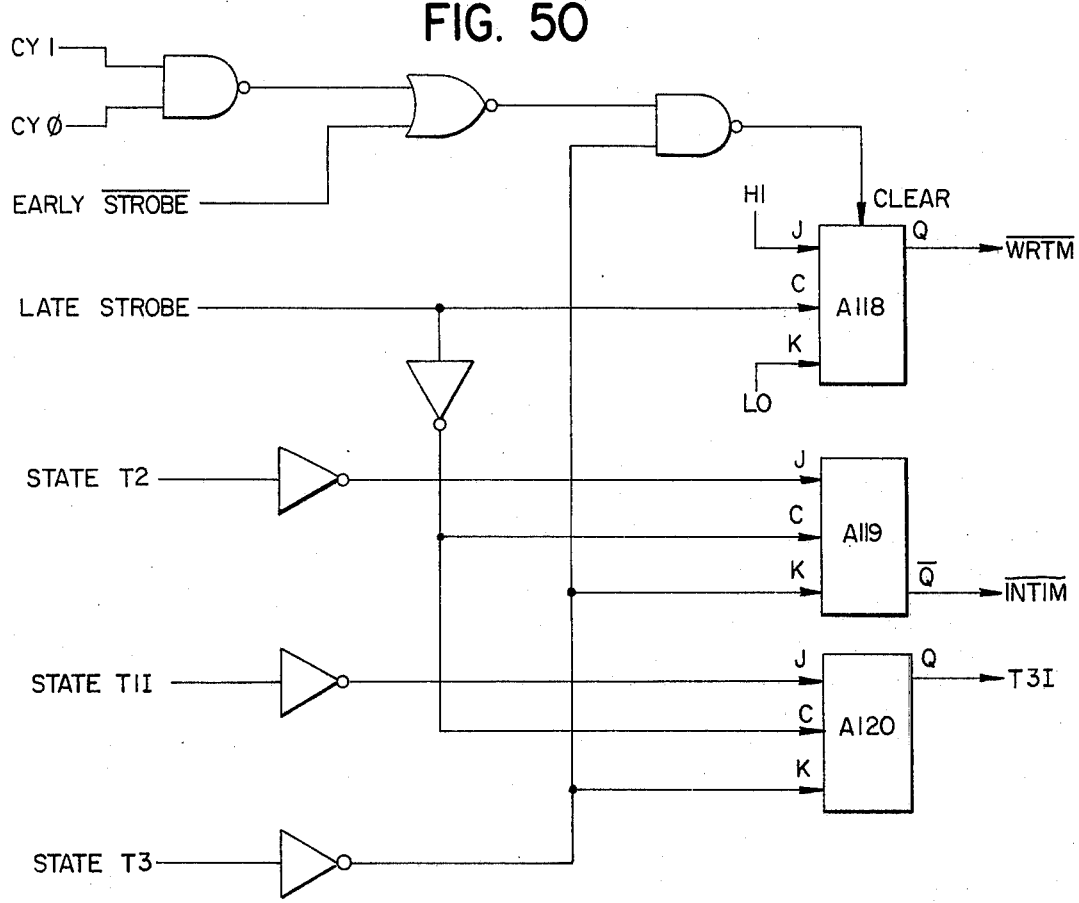

The logic circuitry involved is shown in FIG. 50, components A118, A119 and A120 being flip-flops.

Referring to FIG. 50, CY$\phi$ is set up on the high order address latch during state T2. It is low (after set up) during an instruction fetch or a memory read cycle, high during a memory write or an I/O command cycle. $\overline{\text{INTIM}}$ goes low at the end of LATE $\overline{\text{STROBE}}$ during state T2, and goes high again at the end of LATE $\overline{\text{STROBE}}$ during state T3. T3I is normally low. When, however, the processor goes to state T1I in response to an INTERRUPT signal, T3I goes high at the end of LATE $\overline{\text{STROBE}}$ (during state T1I). It goes low again at the end of LATE $\overline{\text{STROBE}}$ during state T3. The memory read operation is, therefore, inhibited during the first machine cycle following an INTERRUPT. An instruction may, then, be jammed in during state T3 by simply putting it on the unbuffered data busses. $\overline{\text{WRTM}}$ is the output of a flip-flop which is set by the start of LATE $\overline{\text{STROBE}}$ during each SYNC cycle. During a memory read machine cycle, $\overline{\text{WRTM}}$ goes low (the flip-flop is cleared) at the start of EARLY $\overline{\text{STROBE}}$ during state T3. It goes high again at the start of LATE $\overline{\text{STROBE}}$ during state T3.

An I/O operation always requires two machine cycles. The first is an instruction fetch cycle, during which an I/O instruction is retrieved from memory. The second is an I/O command cycle. During state T1, a single byte is transferred (from an internal register in the microprocessor A109) to the low order address latch A116 (FIG. 47). During state T2, the I/O instruction retrieved from memory during the preceding (instruction fetch) machine cycle is transferred to the high order address latch A115. State T3 may be either a read operation, during which information on the data input busses (INB$\phi$ through INB7) is transferred to the processor through the tri-state input buffer A110, or a write operation, during which information is transferred from the processor.

The processor board, as part of the interface circuitry, contains the I/O address latch A117 (FIG. 47) which drives the I/O address busses (IOAD$\phi$ through IOAD7). Information may be transferred from that latch to the processor, through an associated tri-state buffer A121, by an I/O read operation. Information may be transferred from the low order address latch A116 to the I/O address latch A117, so that it appears on the I/O address busses, by an I/O write operation.

Figure 51:
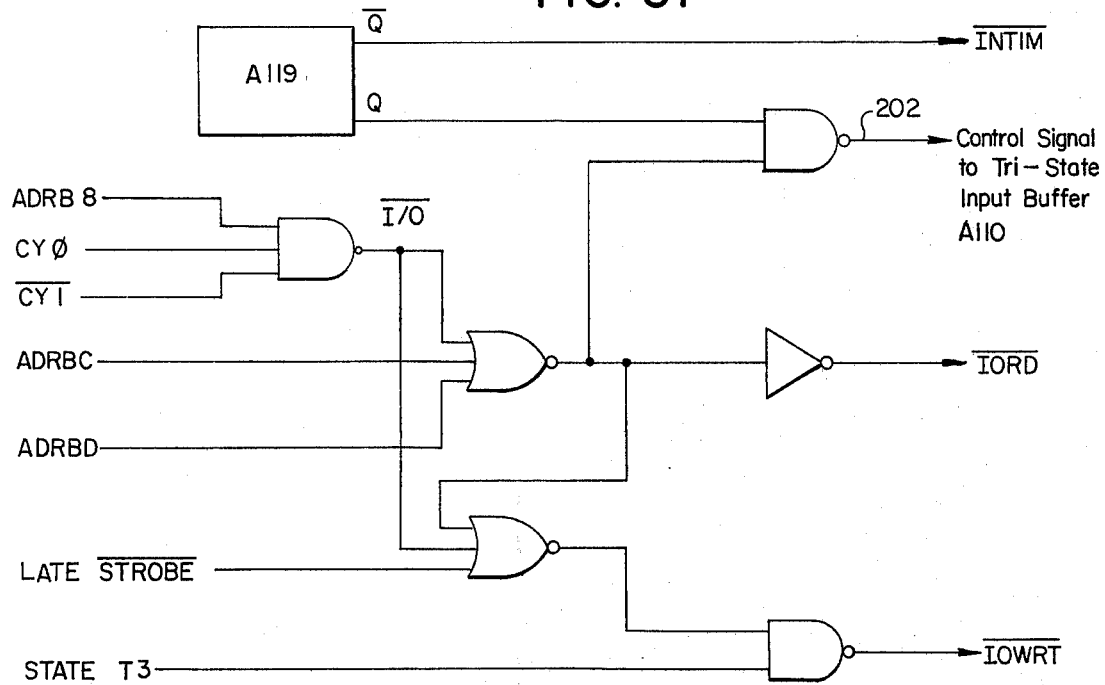
Figure 52:
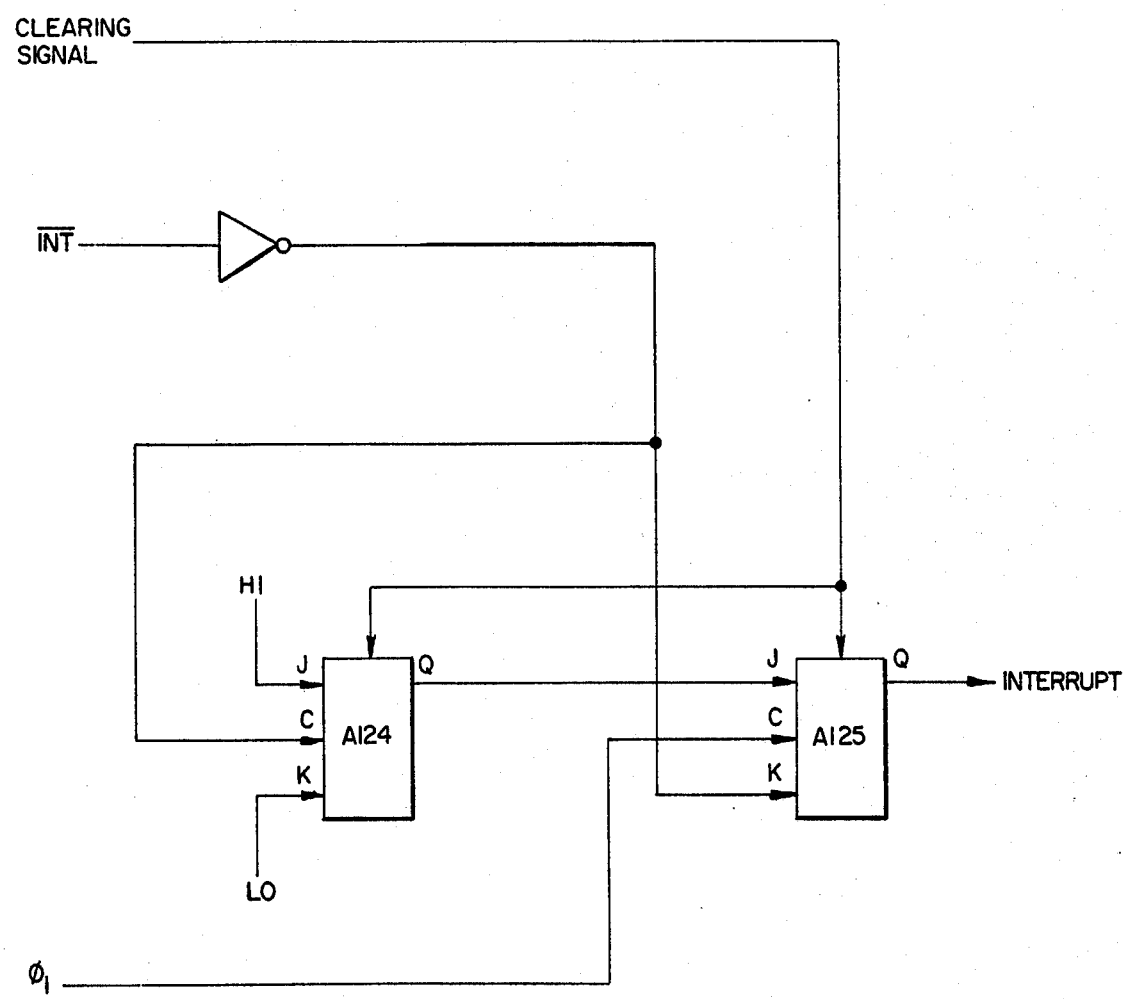

An I/O instruction is always of the form "01--,---1". The first eight I/O instructions, of the form "0100,---1", are I/O read (input) instructions, the remaining twenty-four are I/O write (output) instructions. Two busses, $\overline{\text{IORD}}$ and $\overline{\text{IOWRT}}$, are used to control an I/O operation as described below. The logic circuitry involved is shown in FIG. 51 to which reference is now made. $\overline{\text{IORD}}$ goes low as soon as an I/O input instruction is latched into the high order address latch A115, at the start of LATE $\overline{\text{STROBE}}$ during state T2 of the I/O command machine cycle (but only if the I/O instruction is a read instruction). It goes high again when a new byte is latched into the high order address latch (at the start of LATE $\overline{\text{STROBE}}$ during state T2 of the next machine cycle, which is necessarily an instruction fetch cycle in which CY$\phi$ is low). Data are transferred from the data input busses (INB$\phi$ through INB7) to the processor, through the tri-state input buffer A110, when $\overline{\text{IORD}}$ and $\overline{\text{INTIM}}$ are both low (which enables the buffer). $\overline{\text{IOWRT}}$ goes low at the start of LATE STROBE during state T3 of an I/O command machine cycle (if the I/O instruction held by the high order address latch is an I/O write instruction). It goes high again at the end of LATE STROBE during the same state (T3) of the same machine cycle.

A number of special control busses may be supplied with I/O instruction signals by the processor during I/O command operation to control the operation of other parts of the common control 56. These I/O instructions are generated by a decoder A122 which decodes the output of the high order address latch A115 to produce the instructions illustrated in FIG. 47, and by a decoder A123 which decodes the output of the low order output latch A116 to produce the instruction TDCS.

During an I/O read machine cycle, the following possibilities exist. In each case, the specified event occurs when IORD goes low and persists until IORD again goes high.

1. IORD goes low and the tri-state buffer A121 associated with the I/O address latch A117 is enabled, putting data held by the latch on the data busses (DBφ through BD7).

2. IORD goes low and IOENB goes high. If, when this happens, the data held by the I/O address latch A117 are of the form "0000,0---", TDCS goes low.

3. IORD goes low and CTCS goes low.

4. IORD and CTCS go low and RREAL goes high.

5. IORD and CTCS go low and RSTACK goes high.

6. IORD goes low and ESW goes high. This happens once during each execution of the operating program, approximately every fifth of a second.

During an I/O write machine cycle, the following possibilities exist. Transitions of the CTSC bus, the IOENB bus, and the TDCS bus, if they occur, are the same as those programmed during an I/O read machine cycle. That is, the level change occurs during state T2 of the I/O write machine cycle and persists until state T2 of the following machine cycle. Other events, level changes of the WREAL bus or the WTX bus, or latching of the I/O address latch, start when IOWRT goes low and persist until IOWRT again goes high.

1. IOWRT goes low and IOENB goes high. If, when IOENB is high, the I/O address latch holds "0000,0---", then TDCS goes low.

2. IOWRT goes low and data held by the low order address latch A116 are latched into the I/O address latch A117.

3. IOWRT goes low and WTX goes high.

4. IOWRT goes low and CTCS goes low.

5. IOWRT goes low, CTCS goes low, and WREAL goes high.

When the READY Input to the processor is low, the processor goes from state T2 to the wait state (as described earlier) and remains there. When the READY input goes high again, the processor goes to state T3 at the start of the next SYNC cycle. An exception occurs during an I/O read operation. In this case, the processor spends one SYNC cycle in the wait state (between states T2 and T3) to give an external device additional set up time.

During state T3 of an instruction fetch machine cycle, CYφ, CY1 and INTIM are all low. This condition is recognized by logic circuitry. At the same time, the instruction retrieved from memory appears on the data busses (DBφ through DB7) and on the buffered data busses 196. If the instruction is an I/O read instruction of the form "0100,---1", this condition is recognized by other logic circuitry. When both conditions are recognized, the clock input to a wait flip-flop is enabled by additional logic circuitry. This flip-flop is then set by the next positive going transition of $\phi_2$, at which time the READY input to the processor goes low.

During the following machine cycle, which is an I/O read cycle, the processor goes from state T2 to the wait state. The wait flip-flop is then reset by a signal from the state decoder, and the processor goes to state T3 at the start of the next SYNC cycle.

As explained earlier, the procesor may be interrupted by a high INTERRUPT signal, which causes it to go to state T1I at the conclusion of the current instruction operation. The INTERRUPT signal, however, must be returned to its normal low level as soon as the processor reaches state T1I. The problem is handled by the logic circuitry shown in FIG. 52, in which A124 and A125 are flip-flops. Referring to this figure, the external interrupt signal is a low level on INT. When this signal is removed (when INT returns to its normal high level), the left-hand flip-flop A124 is set. With the left-hand flip-flop A124 set, the right-hand flip-flop A125 is set at the end of the next positive going $\phi_1$ signal. The output of the right-hand flip-flop provides an INTERRUPT signal to the processor. Both flip-flops are cleared (and INTERRUPT goes low) at the start of EARLY STROBE in state T1I.

MEMORY

FIG. 53

Figure 53:
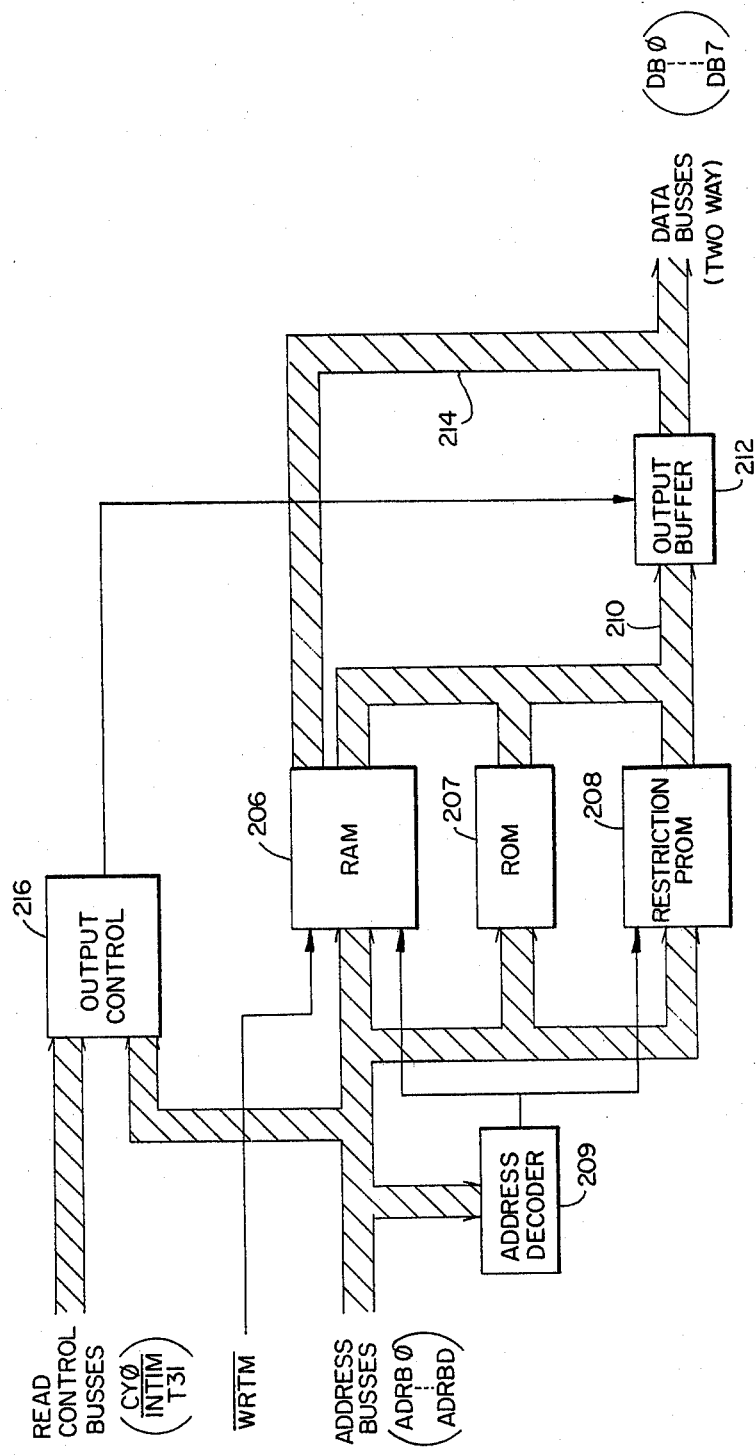
FIG. 53 is a block diagram showing in more detail the construction of the memory of FIG. 4.

The memory 60 of FIG. 4 is comprised of a printed circuit board or card carrying memory devices which store all of the information required to control operation of the communication system. It interfaces directly with the processor 58, and is organized as shown in FIG. 53. The memory 60 also contains decoder circuitry used by the processor.

Referring to FIG. 53, the memory is addressed by fourteen address busses, ADRBφ through ADRB9 and ADRBA through ADRBD. These carry a fourteen-bit memory address, with the most significant bit appearing on ADRBD. Data are carried to and from the memory by eight data busses, DBφ through DB7. The remaining inputs to the memory are the WRTM (write memory) control bus, the three read control busses CYφ, INTIM, and T3I.

The RAM 206, which is static, consists of eight 1K-by-1 chips. It is accessed by addresses of the form "1010--,--------". The four most significant bits are sent to the address decoder 209, which outputs an enabling signal to all eight chips of the RAM. The remaining ten address bits are presented to the RAM, where they specify the desired chip location. Each RAM chip contains a tri-state output buffer, and when the RAM is accessed, its output appears on the eight wide common busses 210 which feed the output buffer 212.

The ROM 207 consists of four 2K-by-8 chips. It is accessed by addresses of the form "0----, --------". The second and third (most significant) bits select one of the four ROM chips, and the zero in the most significant position enables the selected chip. The remaining eleven bits specify the desired chip location. In the ROM, each chip contains an eight-wide tri-state buffer, and when the ROM is accessed, the output of the selected chip appears on the common output busses 210.

The restriction PROM 208 contains two 256-by-8 chips, referred to as a day PROM and night PROM. The night PROM is an optional component, and may or may not be installed. The day PROM is accessed by addresses of the form "1000-0, --------" and the night PROM by addresses of the form "1000-1, --------". The six most significant bits of the address are sent to the address decoder 209 which outputs an enabling signal to the desired PROM chip. The remaining eight bits specify the desired chip location. Each PROM chip contains an eight wide tri-state output buffer, and when the PROM is accessed, the output of the selected chip appears on the common output busses.

Writing is accomplished by putting data on the eight wide data bus 214, accessing the RAM 206, and making the write control bus ($\overline{WRTM}$) low. The data are then entered in RAM at the specified location.

Reading is accomplished by making all three read control busses (CY$\phi$, $\overline{INTIM}$, T3I) low. If, at this time, the two most significant bits of the address are "00", "01" or "10", the output control circuitry 216 sends an enabling signal to the tri-state output buffer 212. Readout is inhibited when the two most significant bits of the address are "11".

TONE DECODER OPERATION AND HOLDING TIME

The tone decoder/receivers 62, 62 interface with the remainder of the system are generally shown in FIG. 4. A tone decoder/receiver (hereinafter TDR) is eigher free or assigned. When it is assigned, it is assigned to a specific time slot. TDRs are assigned and released (freed) by signals from the processor 58 which controls operation of the system. These signals are carried on the processor busses.

A free TDR is quiescent. It does nothing. A TDR which is assigned receives during the time slot to which it is assigned. It receives signals from the buffered send line 148 of FIG. 4. These are signals which arrive at the master repeater on the communication send line 20 and which are then forwarded on the buffered communication receive line 148. These signals are demodulated, and the recovered audio is inspected for the presence of valid two-tone dial signals. The presence of a valid dial signal is reported (by way of the processor busses) to the processor. The first task of a TDR then, is the detection and identification of two-tone dial signals.

A TDR, when it is assigned, may transmit a burst of blocking pulses to the master repeater 56. Blocking pulses are carried by the BLOCK signal bus shown in FIG. 4. When a TDR transmits blocking pulses, it transmits one such pulse in each commutation frame, just before the start of the time slot to which it is assigned. The effect of the blocking pulse is to prevent the master repeater from forwarding (on the communication receive line 22) any incoming signal which arrives on the communication send line 20 during the time slot to which the decoder is assigned. But note that the incoming signal is always forwarded on the buffered receive line 148 whether or not a blocking pulse is present.

Blocking pulses are generated, by a TDR, in response to a request from the processor. The processor may, for example, send signals to a particular TDR directing it to generate (say) six bursts of blocking pulses. Signals on the communication receive line 22, in the time slot to which that tone decoder is assigned, are then absent for a sequence of six short time intervals. During out-dialing on a rotary dial trunk, the dial entry made by a subscriber is detected and identified by a TDR, passed to the processor where it is checked against out-dialing restrictions, and then passed back to the TDR as an instruction for the generation of a sequence of bursts of blocking pulses. Circuitry in the trunk applique, through which the dialing subscriber's line is connected to a central office, then generates a sequence of rotary dial out pulsing signals (one out pulse for each burst of blocking pulses). The second task of a TDR then, is the generation of bursts of blocking pulses for the control of out pulsing (rotary dial out dialing) signals.

Each TDR is connected to a group of four tone busses on which it receives (as audio signals) four supervisory tones from the tone generator 64. These tones are dial tone, audible ring, busy signal, and reorder signal. An assigned TDR may be instructed, by the processor, to transmit blocking pulses and, in addition, to transmit signals on the TONE bus shown in FIG. 4. These signals (transmitted on the TONE bus) are width modulated pulses, modulated by one of the four supervisory tones, transmitted during the time slot to which the TDR is assigned. Signals arriving at the master repeater on the TONE bus are forwarded on the communication receive line 22 in place of incoming signals (arriving on the communication send line 20), which are not forwarded because of the presence of the blocking pulses which accompany the tone highway signals. The third task of a TDR, then, is the transmission of supervisory tone signals which, when transmitted, appear on the communication receive line 22.

TDRs are assigned as required to the attendant's console, to trunk appliques and to line appliques. The question of TDR holding time is discussed below, separately for each of these three classes of TDR users. The attendant's console communicates with the processor by sending two-tone signals. In the absence of a TDR, the console would be almost completely immobilized. One TDR, therefore, is dedicated to the attendant's console. This TDR is assigned to the console as required, and released when it is not needed. It is never, however, assigned to any time slot except the one on which the console transmits and is, therefore, not available for assignment to a line or a trunk. From the standpoint of holding time, it can be said that the attendant's console "holds" one TDR on a full time basis.

No TDR is assigned to a trunk in connection with setting up an outgoing call. The necessary out pulsing is controlled by a TDR assigned to the call originator, either the attendant's console or a line.

No TDR is assigned to a trunk in connection with setting up an incoming call. When an incoming call arrives (on a trunk), it is directed by the processor to an appropriate destination — the attendant's console, a particular line, a zone ringer, or the universal night ringer. If the call is not answered (if its destination is the console or a line) or captured (if its destination is a ringer), or if the call destination is busy (if it is a line), the call may be diverted to another destination. It may, in some cases, be diverted more than once. The trunk is not tripped, however, until the call is answered and (until the call is answered) the outside caller hears an audible ring signal supplied by the central office.

Although no TDR is assigned to a trunk in connection with the process of setting up a call (either outgoing or incoming), a TDR may be assigned to a trunk if, after a call has established, the trunk involved in that call is subsequently transferred. The TDR is, of course, required for the purpose of sending a supervisory tone to the outside party. The trunk is, necessarily, put on hold before transfer is attempted. If the new call destination (to which transfer is attempted) is busy, and if the processor does not divert the attempted transfer to an alternate nonbusy destination, the transfer is unsuccessful when attempted by a line applique, or leaves the trunk camped on when attempted by the console. In either case the trunk remains on hold and no TDR is assigned to it. A TDR is assigned (to a trunk) only in connection with attempted transfer to a nonbusy destination. No TDR is assigned in connection with transfer to a parking (call holding) orbit. The question of holding time, for a TDR assigned to a trunk applique, has no easy answer. The TDR is released when the transferred call is answered or captured, when the trunk is released by the outside caller, or when (in some situations) the trunk is released by the system. The unanswered transferred call may, however, be directed by the processor to an alternate destination or to a sequence of alternate destinations. Thus, holding time is affected by the call forwarding instructions stored by the system, and no simple statement can be made about it. Note that the redirection sequence may be interrupted at any point if the transferred call is answered or captured, or if the outside caller disconnects. In either case, the TDR is released.

In the foregoing discussion (covering the assignment of TDRs to trunks), the special case of trunk-to-trunk connection was avoided. This is considered now. If, after a trunk call (outgoing or incoming) has been established, the trunk is transferred to a line and immediately redirected (by a variable forward associated with that line) to an off-premises destination, a trunk-to-trunk connection is set up. The TDR already assigned to the transferred trunk (in connection with the process of call transfer) is used to control outpulsing on the second trunk. The TDR is released when out dialing is completed. Supervisory tones are then returned to the outside caller (on the transferred trunk) by the central office associated with the second trunk.

A similar situation arises if an incoming trunk call is directed (before it is answered) to a line and immediately redirected to an off premises destination. In this case, the trunk (on which the incoming call appears) is tripped, a TDR is assigned to that trunk for control of outpulsing and a trunk-to-trunk connection is set up. As before, the TDR is released when out dialing is completed.

The question of holding time for a TDR assigned to a line applique is now considered. When an on hook line goes off hook, a TDR is assigned and the subscriber hears a dial tone. The TDR is released in any of the following situations, whichever occurs first.

(a) When the line returns to on hook status.

(b) When the subscriber makes a hook flash. This situation is discussed in more detail below. For the present, it is sufficient to say that if a tone decoder is assigned, it is released at the start of the hook flash. (Generally, but not always, a new TDR assignment is made at the conculsion of the hook flash.)

(c) If more than 15 to 18 seconds pass before a character is entered as part (or all) of a dial entry, if more than 15 to 18 seconds elapse after entry of a character when a valid dial entry requires the entry of one or more additional characters, or if an invalid or not permitted dial entry is made, a reorder signal is sent to the line for 15 seconds and the TDR is then released. No new TDR assignment is made until the line is put in on hook status and subsequently returned to off hook status, either by a hook flash or with a longer on hook interval.

(d) On a call to the attendant's console, the TDR is released when the attendant answers.

(e) On a call to a zone ringer, the TDR is released when the call is captured, or after 60 seconds of ringing. In the latter case no new TDR assignment is made until after an on hook interval.

(f) If a call-capturing or call pick-up dial entry is made, the TDR is released on completion of the dial entry if call-capture or call pick-up is successful. An unsuccessful attempt is treated as an invalid dial entry.

(g) On a call to another line, the TDR is released when the called line answers, or after a ringing time of 48 seconds, or after a busy signal of 15 seconds. In the latter cases, release is preceded by 15 seconds of reorder signal. As before, no new TDR assignment is made until after an on hook interval.

(h) On an outside call (through a trunk), the TDR is released 8 seconds after out pulsing is completed on a rotary dial trunk, 8 seconds after the complete out dialing dial entry is made on a two tone trunk. If more than 8 seconds elapse between trunk seizure and the first of the succeeding dial entries, the TDR is released after 15 seconds of reorder signal.

If, while a busy signal is received on an attempted line-to-line call, a subscriber enters a camp-on request, he then receives a dial tone. The situations in which the assigned TDR is subsequently released are those described above.

If in the course of an established two-party call (with no TDR assigned to either party) one party disconnects, a TDR is assigned to the remaining party (who then receives dial tone) if that party is a line. The situations in which the assigned TDR is subsequently released are those described above.

If, in the course of an established call, a subscriber makes a hook flash, a TDR is assigned to that subscriber's line. The situations in which the assigned TDR is subsequently released are generally the same as those described above. Certain additional possibilities, as follows, arise because the line has a call on hold.

(a) Another hook flash releases the TDR and produces a conference call. In this case, no new TDR assignment is made at the conclusion of the second hook flash.

(b) A dial entry which picks up a call from the hold cue simultaneously releases the assigned TDR.

(c) A dial entry which attempts to transfer the on hold call does not release the TDR. The subscriber hears a dial tone if the transfer destination is free, a busy signal if it is busy, and a reorder if the attempt is not valid. In all three cases, subsequent release of the TDR is as already described.

If a line is put on hold (by another line or by the attendant's console) and an attempt is then made to transfer the on hold line, a TDR is assigned to the transferred line if the transfer destination is free. (No tone decoder is assigned, however, in connection with transfer to a parking orbit.)

(a) The TDR (assigned to the transferred line) is always released if the transferred line goes to on hook status, either momentarily or for an extended period.

(b) If the transfer destination is another line, the TDR is released when the call is answered, or after 48 seconds of ringing followed by 15 seconds of reorder signal.

(c) If the transfer destination is a zone ringer, the TDR is released when the call is captured, or after 60 seconds of ringing.

(d) If the transfer destination is a trunk, the TDR is released as described earlier in connection with a line-to-trunk call. (This transfer can only be made by the attendant).

(e) If the tranfer destination is the attendant's console, the TDR is released when the attendant answers.

SYSTEM OPERATION IN LINE-TO-LINE CALL

Having now described the system of this invention in some detail, it may be helpful to a better understanding of it to consider its operation in the establishment and subsequent disconnection of a simple line-to-line communication path. For the purposes of this discussion, it is assumed that line station #27 calls line station #32.

At the start of the procedure, station #27 goes off-hook and thus causes its applique to transmit in its assigned time slot on alternate frames as a service request signal directed to the master repeater.

When subsequently the master repeater is directed by the processor to observe the four stations of which #27 is one (the master repeater operates to inspect station status in groups of four), it discovers and notes that station #27 is in the service request or attention state.

Subsequently, the master repeater is interrogated by the processor about the states of the four stations of the inspected group (there being actually two interrogations — one to inquire which of the observed group of four stations are at attention and the second to inquire which of the observed group of four stations are active) and it reports to the processor that station #27 is in the attention state.

The processor then sends a command message to station #27 and tells it to listen to the quiet slot of the communication receive line 22. Therefore, station #27 goes to the active state because it now has a listening order in its listening order register and it transmits on every frame. The processor verifies this the next time it interrogates the master repeater about the master repeater's observation of the group of four stations to which station #27 belongs.

If a TDR is available, the processor now tells the master repeater to issue (on the buffered receive line 148) a MARK signal in station #27's time slot and issues an assignment signal to an available TDR which then goes to an assigned state and observes the MARK signal. While the assignment order stays high, the TDR finds out what time slot it is assigned to by listening to the MARK signal. The processor then stops the assignment order and the TDR remains assigned to the time slot of station #27.

The processor now instructs the assigned TDR to transmit dial tone, on the communication receive line 22 and in its assigned time slot, and by a command message instructs station #27 to listen to its own time slot, so that the subscriber at station #27 now hears the dial tone.

The subscriber now presses the first digit (3) of his touch dial pad which causes two tone-coded dial tones to be transmitted on his time slot to the assigned TDR. The TDR decodes the dial tones into a binary 3 and when the subscriber's finger is lifted from the touch dial pad, raises a flag. When the TDR is subsequently interrogated by the processor, it reports that a "3" has been dialed and the processor stores that digit and instructs the TDR to turn off dial tone.

The subscriber now presses the second digit (2) of his touch dial pad, which causes another pair of tone coded dial tones to be transmitted to the assigned TDR which in turn decodes them into a binary 2, and when the subscriber takes his finger off of the touch dial pad a flag is raised. The TDR, when subsequently interrogated by the processor, reports this dialed digit "2" to the processor which stores it and then interprets "32" as a completed dial entry.

The dial entry "32" is now decoded into the address of the called station and the processor inspects its status list (stored in the memory 60) to find out whether the called station is busy or not. If it is busy, the processor instructs the TDR to transmit a busy signal which is received by the subscriber station #27.

Assuming that station #32 is not busy, the processor instructs the TDR to transmit audible ring to station #27. Further, the processor sends station #32 command messages instructing it to listen to the quiet slot. These command messages are such that some have and some do not have "1's" in the ring bit thereby causing also the applique at station #32 to turn its associated electronic ringer off and on.

The processor now pays attention to the status of station #32, its status being periodically checked as part of the processor's continuing interrogation of the master repeater about station status in sequential groups of four. If station #32 exists, its applique now has a listening order in its listening order register and while on-hook will transmit in its time slot during alternate frames to indicate an attention status. If station #32 is not now found to be at attention, it doesn't exist and the processor ceases transmission of ringing order command messages to it and instructs the TDR to stop sending audible ring to station #27 and to instead start sending a reorder tone. If station #32 is found to be at attention by the processor, nothing is done.

When station #32 subsequently goes off-hook, it shifts to the active state and transmits during every frame. When the processor is informed of this active condition of station #32, it does three things:

(1) It sends a command message to station #32 ordering it to listen to the time slot of station #27, (2) It sends a command message to station #27 ordering it to listen to the time slot of station #32, and (3) It sends a message to the TDR to release it.

The call is now made and will persist until it is terminated as discussed below by one of the parties hanging up. For the purpose of this discussion, assume that the party at station #27 hangs up first.

When station #27 hangs up, it goes to the attention state and its applique transmits during alternate frames.

The going on-hook of station #27 may be either a request for a disconnect or a hook flash. Therefore, the processor initially instructs both stations to listen to the quiet slot, and station #32 is marked as being put on hold by station #27 and the time of the real time clock is noted by the processor. If station #27 now goes back off-hook within a predetermined short time (comes back to the attention state) the processor interprets this as a hook flash and gives station #27 a TDR and dial tone in the usual fashion, and station #32 remains on hold in station #27's hold que. On the other hand, if station #27 does not go back to attention within the predetermined time, its going on-hook is interpreted as a request for disconnect. At this point, the processor sends station #27 a command message with no "1's" in the register words (a "don't listen" order), which drops station #27 back to idle state.

Also, the processor now takes station #32 out of the hold que and gives station #32 a TDR and dial tone in the usual fashion. If station #32 now goes on-hook and remains on-hook for the predetermined time, the TDR assigned to it is released and the processor sends station #32 a "don't listen" command message, thereby returning station #32 to idle state.

We claim:

1. A communication switching system for establishing two-way communication paths between a plurality of peripheral devices, said switching system comprising: a common control, a communication send line having one end connected to said common control, a communication receive line having one end connected to said common control, a plurality of peripheral devices each having transmitting access to said communication send line and having communication receive access to said communication receive line, means time dividing the usage of said communication send line and said communication receive line into repetitive frames each having a fixed plurality of time slots with said plurality of time slots in turn consisting of a group of command time slots and a group of audio time slots, means in each of said peripheral devices for producing first signals representing messages to be transmitted to at least one other of said peripheral devices and at other times second signals representing information to be transmitted only to said common control, means in each of said peripheral devices assigning said peripheral device only a dedicated one of said audio time slots for the sending of both said first and second signals on said communication send line, means in said common control for passing said first signals from said communication send line to said communication receive line and for blocking the transmission of said second signals from said communication send line to said communication receive line, means in said common control responsive to said second signals received from one of said peripheral devices on said communication send line for formulating command messages injected into said command time slots on said communication receive line for use by said peripheral devices in establishing and disestablishing communication paths between said peripheral devices, and means in each of said peripheral devices responsive to said command messages sent to said peripheral device by said common control in said command time slots and on said communication receive line to select on which of said audio time slots of said communication line said peripheral device is to receive.

2. A communication switching system as defined in claim 1 further characterized by each of said peripheral devices having a receiving circuitry adapted to receive on all of said command time slots of said communication line, each of said command messages including a plurality of address bits comprising an address and a plurality of listening order bits, one for each of said audio time slots, each of said peripheral devices having a listening order register for storing the listening order bits of a command message, said receiving circuitry of a peripheral device being responsive to the appearance of its address in a command message to load the listening order bits of such message in its listening order register, said receiving circuitry of a peripheral device further including means for determining from the bits stored in said listening order register on which of said audio time slots of said receive line to receive.

3. A communication switching system as defined in claim 2 further characterized by each command message further including a ring order bit, and at least some of said peripheral devices having ringers and each of such peripheral devices having means for controlling the operation of its ringer in response to the ring order bit of the command messages addressed to it.

4. A communication switching system as defined in claim 2 further characterized by each of said peripheral devices having a part with an on-hook condition and an off-hook condition, and each of said peripheral devices having means for varying the frame-by-frame pattern of the sending of signals in its dedicated audio time slot of said send line in accordance with the on-hook or off-hook condition of said part and whether or not the bits stored in its listening order register instruct it to receive on any of said audio time slots of said receive line, and said common control having means for periodically investigating the frame-by-frame transmission pattern on all of said audio time slots of said communication send line and for utilizing the information so derived in establishing and disestablishing two-way communication paths between said peripheral devices.

5. A communication switching system as defined in claim 4 further characterized by said means of each peripheral device for varying its frame-by-frame transmission pattern being such that, (1) said peripheral device sends no pulse in any frame when its part is in on-hook condition and the bits stored in its listening order register instruct it to receive on no audio time slots, (2) said peripheral device sends pulses in every frame when its part is in off-hook condition and the bits stored in its listening order register instruct it to receive on at least one audio time slot, and (3) said peripheral device sends pulses in less than every frame when said part is in off-hook condition and the bits stored in its listening order register instruct it to receive on no audio time slot or when said part is in on-hook condition and the bits stored in its listening order register instruct it to receive on at least one audio time slot.

6. A communication system as defined in claim 1 further characterized by said means time dividing the usage of said communication send line and said communication receive line comprising a loop clock for providing clock pulses, a clock send line extending from said loop clock to said common control and running parallel to said communication send line, and a clock receive line having one end connected to said common control and running parallel to said communication receive line, each of said peripheral devices having a send clock terminal connected to said send clock line for timing its sending access to said send clock line and each of said peripheral devices having a receive clock terminal connected to said receive clock line for timing its receiving access to said communication receive line, and means in said common control functionally connecting said send clock line to said receive clock line so that all clock pulses received by said common control on said receive clock line are retransmitted by said common control onto said receive clock line.

7. A communication switching system as defined in claim 1 further characterized by each of said peripheral devices having a number of different operating states, and said means for producing said first and second signals including means for effecting, as said second signals, the injection and non-injection of pulses into said one dedicated audio time slot in different frame-byframe patterns to correspond to said different operating states of said peripheral device.

8. A communication switching system as defined in claim 1 further characterized by each of said peripheral devices having a number of different operating states, and each having a touch-dial pad for generating dialing tones, each of said peripheral devices having a number of different operating states, and said means for producing said first and second signals including, as to said second signals, a means for effecting the injection and non-injection of pulses into said one dedicated audio time slot in different frame-by-frame patterns corresponding to said different operating states of said peripheral device and means for injecting into said one dedicated audio time slot pulses modulated by said dialing tones when said dialing tones are generated by operation of said touch-dial pad.

9. A communication switching system for establishing two-way communication paths between a plurality of peripheral devices, said switching system comprising: a common control, a communication send line having one end connected to said common control, a communication receive line having one end connected to said common control, a plurality of peripheral devices each having transmitting access to said communication send line and having communication receive access to said communication receive line, means time dividing the usage of said communication send line and said communication receive line into repetitive frames each having a fixed plurality of time slots with said plurality of time slots in turn consisting of a group of command time slots and a group of audio time slots, means in each of said peripheral devices assigning said peripheral device a dedicated one of said audio time slots for the sending of signals on said communication send line, means in each of said peripheral devices responsive to command messages sent to said peripheral device by said common control in said command slots and on said communication receive line to select on which of said audio time slots of said communication line said peripheral device is to receive, said common control including a master repeater and a supervisory tone generator, said master repeater including blocking means operable to either block or not block through transmission from said send line to said receive line of a signal appearing in any selected audio time slot of said communication send line, and means for conditionally injecting a supervisory tone from said supervisory tone generator into a time slot of said communication receive line when said blocking means blocks transmission from said send line to said receive line of the signal appearing in the corresponding time slot of said send line.

10. A communication switching system for establishing two-way communication paths between a plurality of peripheral devices, said switching system comprising: a common control, a communication send line having one end connected to said common control, a communication receive line having one end connected to said common control, a plurality of peripheral devices each having transmitting access to said communication send line and having communication receive access to said communication receive line, means time dividing the usage of said communication send line and said communication receive line into repetitive frames each having a fixed plurality of time slots with said plurality of time slots in turn consisting of a group of command time slots and a group of audio time slots, means in each of said peripheral devices assigning said peripheral device a dedicated one of said audio time slots for the sending of signals on said communication send line, means in each of said peripheral devices responsive to command messages sent to said peripheral device by said common control in said command slots and on said communication receive line to select on which of said audio time slots of said communication line said peripheral device is to receive, said common control including a master repeater, a supervisory tone generator, a processor with an associated memory, and a plurality of tone decoder/receivers, said master repeater including blocking means operable to either block or not block through transmission from said send line to said receive line of a signal appearing on any selected audio time slot of said communication send line, means under control of said processor for assigning said tone decoder/receivers on a one-to-one basis to said audio time slots, each of said tone decoder/ receivers having means for decoding coded dial tone pairs received by said common control on said communication send line in its assigned time slot into binary dialing information for use by said processor and also including means for injecting under the control of said processor supervisory tones from said supervisory tone generator into its assigned time slot of said communication receive line when said blocking means blocks through transmission from said send line to said receive line of the signal appearing in the time slot to which said tone decoder/receiver is assigned.

11. A communication switching system as defined in claim 10 further characterized by at least one of said peripheral devices being a trunk applique for interfacing a rotary dial trunk line with the remainder of said system, means under the control of said processor for supplying to a selected one of said tone decoder/receivers spaced bursts of blocking signals which produce equivalent spaced absences of pulses on said communication receive line in the time slot to which said selected tone decoder/receiver is assigned, and means in said trunk applique for converting such spaced absences of pulses received by said trunk applique from said receive line into out-dialing pulses for said rotary dial trunk line.

12. A communication switching system for establishing two-way communication paths between a plurality of peripheral devices, said switching system comprising: a common control, a communication send line having one end connected to said common control, a communication receive line having one end connected to said common control, a plurality of peripheral devices each having transmitting access to said communication send line and having communication receive access to said communication receive line, means time dividing the usage of said communication send line and said communication receive line into repetitive frames each having a fixed plurality of time slots with said plurality of time slots in turn consisting of a group of command time slots and a group of audio time slots, means in each of said peripheral devices assigning said peripheral device a dedicated one of said audio time slots for the sending of signals on said communication send line, means in each of said peripheral devices responsive to command messages sent to said peripheral device by said common control in said command slots and on said communication receive line to select on which of said audio time slots of said communication line said peripheral device is to receive, at least some of said peripheral devices being line appliques for interfacing touch-dial pad-equipped telephones with the remainder of the system, each of said line appliques including sending circuitry for injecting into its dedicated sending time slot of said send line pulses width modulated by voice and dialing audio signals from its associated telephone, said common control also including a master repeater, a supervisory tone generator, a processor with an associated memory, and a plurality of tone decoder/receivers, said master repeater including blocking means operable to either block or not block through transmission from said send line to said receive line of a signal appearing on any selected audio time slot of said communication send line, means under control of said processor for assigning said tone decoder/receivers on a one-to-one basis to said audio time slots, each of said tone decoder/receivers including receiving circuitry for demodulating pulse width modulated pulses received in its assigned time slot from said send line and a decoding circuitry for decoding the demodulated signal into binary dialing information for use by said processor, each of said tone decoder/receivers further including a sending circuit for injecting under the control of said processor pulses width modulated by audio signals from said supervisory tone generator into its assigned time slot of said communication receive line when said blocking means blocks through transmission from said send line to said receive line of the signal appearing in the time slot to which said tone decoder/receiver is assigned, and each of said line appliques having a receiving circuitry for demodulating pulse width modulated pulses received from an audio time slot of said receive line into an audio output signal for use by its associated telephone.

13. A communication switching system as defined in claim 12 further characterized by at least one of said peripheral devices being a trunk applique for interfacing a rotary dial trunk line with the remainder of said system, means under the control of said processor for supplying to a selected one of said tone decoder/receivers spaced bursts of blocking signals which produce equivalent spaced absences of pulses on said communication receive line in the time slot to which said selected tone decoder/receiver is assigned, and means in said trunk applique for converting such spaced absences of pulses received by said trunk applique from said receive line into out-dialing pulses for said rotary dial trunk line.

14. A communication switching system as defined in claim 12 further characterized by said audio time slots of each frame including one quiet slot to which no one of said peripheral devices has sending access but on which each of said peripheral devices may be directed to receive by a command message.

15. In a communication switching system for establishing two-way communication paths between a plurality of peripheral devices, the combination comprising: a common control, a communication send line and a communication receive line each having one end connected to said common control, a plurality of peripheral devices each having a communication send terminal connected to said communication send line and a communication receive terminal connected to said communication receive line, means time dividing the usage of both said communication send line and said communication receive line into repetitive frames each including a plurality of audio time slots, means in each of said peripheral devices assigning it to transmission on said communication send line in a dedicated one of said audio time slots, means in each peripheral device providing an audio signal, means in each peripheral device for producing pulses modulated by said audio signal and for injecting said modulated pulses into its said dedicated one of said audio time slots for transmission over said communication send line and said communication receive line to other of said peripheral devices, means in each peripheral device for extracting from said communication receive line the modulated pulses appearing in a given audio time slot and for demodulating such extracted pulses to recreate the audio signal which modulated them, means in each peripheral device for varying the frame-by-frame pattern by which said modulated pulses are injected or not injected for transmission in its said dedicated one of said audio time slots in accordance with the conditions of parts of said peripheral device, and means in said common control for inspecting the pattern of the frame-by-frame appearance of pulses in the audio time slot dedicated to each of said peripheral devices on said communication send line and for utilizing such information in establishing and disestablishing communication paths between said peripheral devices.

16. The combination defined in claim 15 further characterized by each of said frames including at least one command time slot dedicated to use by said common control for transmitting command messages to said peripheral devices over said communication receive line, each of said peripheral devices having a part with an on-hook condition and an off-hook condition, and each of said peripheral devices having a listening order register which stores a plurality of listening order bits derived from said command messages instructing said peripheral device on which of said audio time slots of said receive line to receive, said means in each peripheral device for varying its frame-by-frame transmission pattern being responsive to the on-hook or off-hook condition of said part and to whether or not the listening order bits stored in its listening order register instruct the device to receive on any of said audio time slots of said receive line and said means being such that, (1) said peripheral device sends no pulse in any frame when its part is in on-hook condition and the listening order bits of its listening order register instruct it to receive on no audio time slots, (2) said peripheral device sends pulses in every frame when its part is in off-hook condition and the listening order bits of its listening order register instruct it to receive on at least one audio time slot, and (3) said peripheral device sends pulses in less than every frame when said part is in off-hook condition and the listening order bits of its listening order register instruct it to receive on no audio time slots or when said part is in on-hook condition and the listening order bits of its listening order register instruct it to receive on at least one audio time slot.

17. The combination defined in claim 15 further characterized by said means in each peripheral device for varying its frame-by-frame transmission pattern including means for varying said frame-by-frame transmission between at least three different patterns representing at least three different conditions of the parts of said peripheral device.

18. The combination defined in claim 15 further characterized by said means in each peripheral device for varying its frame-by-frame transmission pattern including means for injecting none of said modulated pulses into said dedicated one of said audio time slots as it reappears frame-by-frame when said peripheral device is in one condition, for injecting one of said modulated pulses into said dedicated one of said audio time slots only during alternate frame-by-frame appearances thereof when said peripheral device is in a second condition, and for injecting one of said modulated pulses into said dedicated one of said audio time slots during every frame-by-frame appearance thereof when said peripheral device is in a third condition.

* * * * *